United States Patent
Jarvis et al.

(10) Patent No.: US 10,446,817 B2
(45) Date of Patent: Oct. 15, 2019

(54) ENERGY STORAGE DEVICE AND RELATED METHODS

(71) Applicant: ALCOA INC., Pittsburgh, PA (US)

(72) Inventors: Glenn W. Jarvis, Allison Park, PA (US); Robert E. Dick, Cheswick, PA (US); Hasso Weiland, Lower Burrell, PA (US); Joseph M. Fridy, Pittsburgh, PA (US); David J. McNeish, Greensburg, PA (US); John W. Cobes, Lower Burrell, PA (US); Rabindra K. Bhattacharyya, Export, PA (US); John M. Krish, Apollo, PA (US); David M. Ference, New Kensington, PA (US); Brock Watters, Livonia, MI (US); Gregory Catrambone, Lemont, IL (US)

(73) Assignee: Arconic Inc., Pittsburgh, PA (US)

( * ) Notice: Subject to any disclaimer, the term of this patent is extended or adjusted under 35 U.S.C. 154(b) by 60 days.

(21) Appl. No.: 15/283,830

(22) Filed: Oct. 3, 2016

(65) Prior Publication Data
US 2017/0170439 A1    Jun. 15, 2017

Related U.S. Application Data

(60) Provisional application No. 62/236,512, filed on Oct. 2, 2015.

(51) Int. Cl.
*H01M 2/12*    (2006.01)
*H01M 2/34*    (2006.01)
*H01M 10/0525*   (2010.01)

(52) U.S. Cl.
CPC ........... *H01M 2/1241* (2013.01); *H01M 2/12* (2013.01); *H01M 2/345* (2013.01); *H01M 10/0525* (2013.01); *H01M 2200/20* (2013.01)

(58) Field of Classification Search
CPC .. H01M 2200/20; H01M 2/12; H01M 2/1241; H01M 2/345
See application file for complete search history.

(56) References Cited

U.S. PATENT DOCUMENTS

| | | | |
|---|---|---|---|
| 4,803,136 A * | 2/1989 | Bowsky | B65D 83/70 216/54 |
| 4,943,497 A | 7/1990 | Oishi et al. | |

(Continued)

FOREIGN PATENT DOCUMENTS

| | | |
|---|---|---|
| CA | 2099657 | 2/1994 |
| EP | 1835251 | 12/2011 |

(Continued)

OTHER PUBLICATIONS

Al-Hallaj, S., "Safety and Thermal Management for Li-ion Batteries in Transportation Applications", EV Battery Forum, Europe 2012, Barcelona.

(Continued)

*Primary Examiner* — Carlos Barcena
(74) *Attorney, Agent, or Firm* — Greenberg Traurig, LLP

(57) ABSTRACT

The present disclosure relates to energy storage devices having: a sealed container configured to house a plurality of energy storage devices and enable electrical communication via terminals of the sealed container and a vent located on a periphery of the sealed container. The vent generally comprises a vent panel; a countersink located adjacent the vent panel; at least one score located in the countersink; a buckling initiator at least partially located on the countersink, where the buckling initiator is configured to intersect with the at least one score; and a hinge portion attached to the vent panel, where the hinge portion is positioned opposite the buckling initiator.

15 Claims, 50 Drawing Sheets

(56) References Cited

U.S. PATENT DOCUMENTS

| | | |
|---|---|---|
| 5,567,544 A | 10/1996 | Lyman |
| 5,609,972 A | 3/1997 | Kaschmitter et al. |
| 5,871,861 A | 2/1999 | Hirokou et al. |
| 6,521,373 B1 * | 2/2003 | Suzuki ................ H01M 2/0222 429/124 |
| 6,605,382 B2 | 8/2003 | Ruth et al. |
| 6,653,017 B2 | 11/2003 | Satoh et al. |
| 8,088,509 B2 | 1/2012 | Shen et al. |
| 8,233,267 B2 | 7/2012 | Miura et al. |
| 8,568,916 B2 | 10/2013 | Nakai et al. |
| 2001/0010878 A1 * | 8/2001 | Nakanishi ............. H01M 2/105 429/120 |
| 2003/0049537 A1 | 3/2003 | Wadley et al. |
| 2003/0131880 A1 * | 7/2003 | Marubayashi ...... H01M 2/1241 137/68.27 |
| 2008/0318121 A1 * | 12/2008 | Takagi ................ H01M 2/1072 429/120 |
| 2009/0068548 A1 * | 3/2009 | Kaplan ............... H01M 2/0215 429/56 |
| 2010/0255359 A1 | 10/2010 | Hirakawa et al. |
| 2010/0316897 A1 | 12/2010 | Kozuki et al. |
| 2011/0223455 A1 | 9/2011 | Naoki et al. |
| 2012/0003508 A1 | 1/2012 | Narbonnne et al. |
| 2012/0015218 A1 * | 1/2012 | Lee ..................... H01M 2/1223 429/53 |
| 2013/0004809 A1 * | 1/2013 | Rigobert ............. H01M 2/1241 429/56 |
| 2016/0028057 A1 * | 1/2016 | Kanamori ........... H01M 2/0473 429/56 |
| 2016/0056418 A1 * | 2/2016 | Yang ..................... H01M 2/024 429/82 |

FOREIGN PATENT DOCUMENTS

| | | |
|---|---|---|
| EP | 2793295 | 10/2014 |
| WO | WO2009/141348 | 11/2009 |
| WO | WO2013/122448 | 8/2013 |
| WO | WO2014/059348 | 4/2014 |

OTHER PUBLICATIONS

International Search Report and Written Opinion, dated Feb. 1, 2017, from correspondence International Patent Application No. PCT/US2016/055153.

* cited by examiner

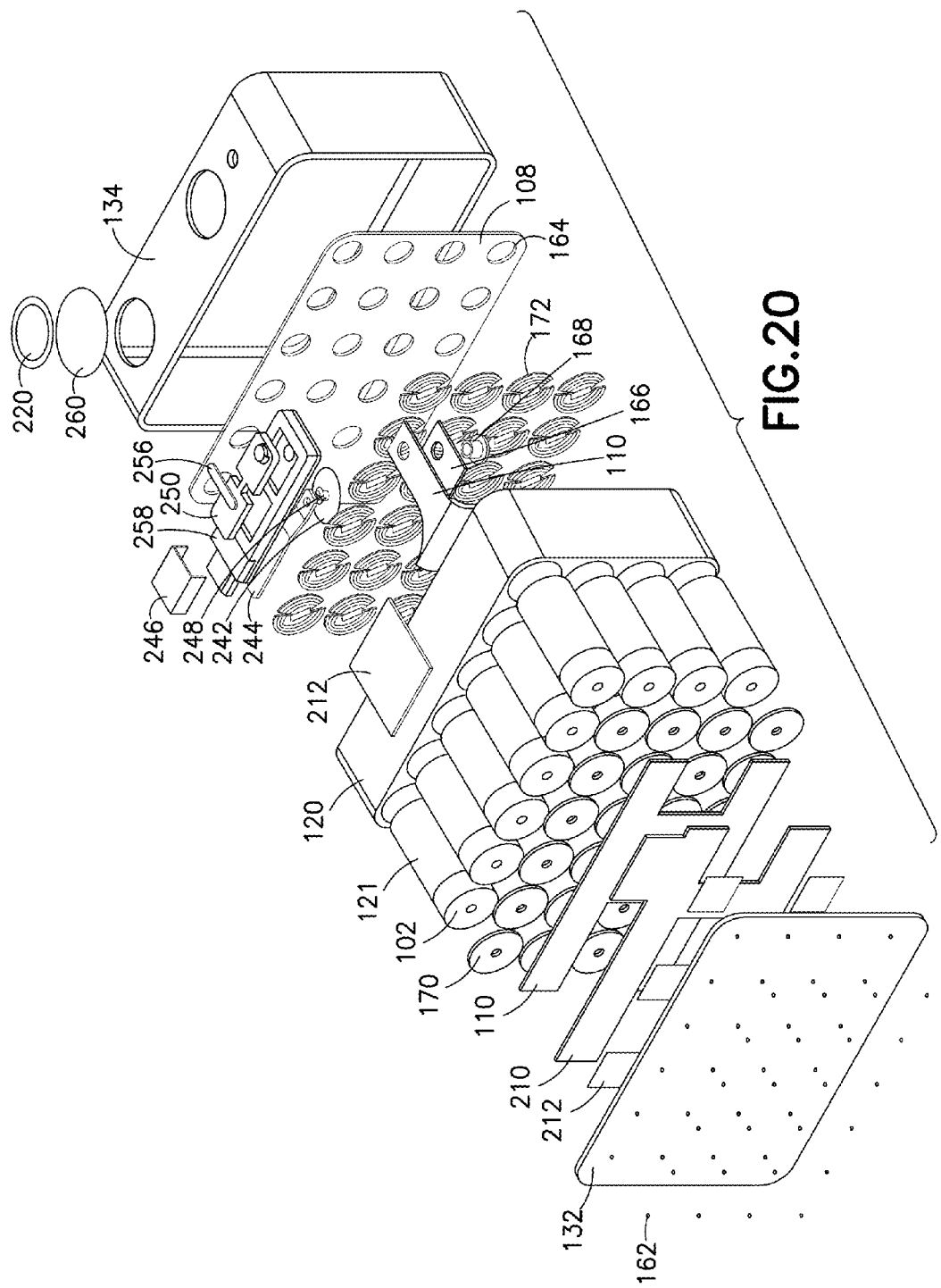

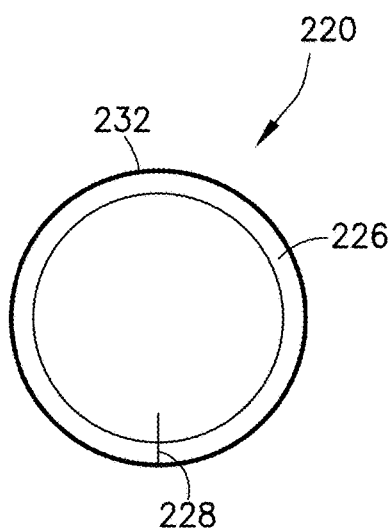
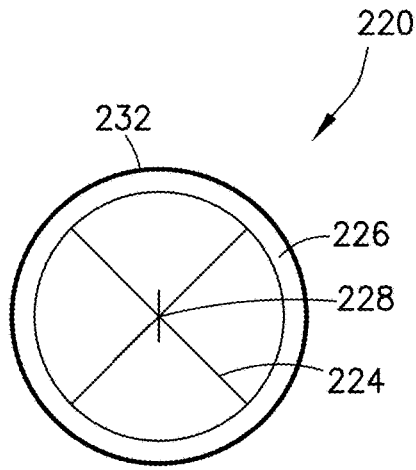

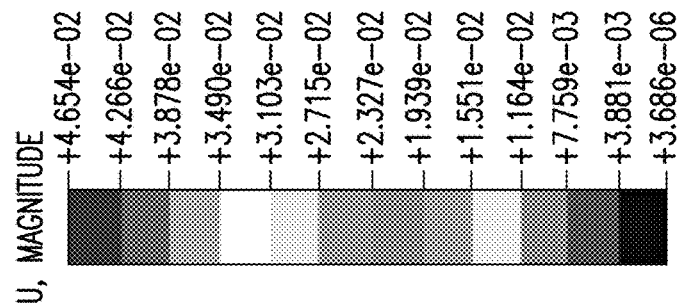
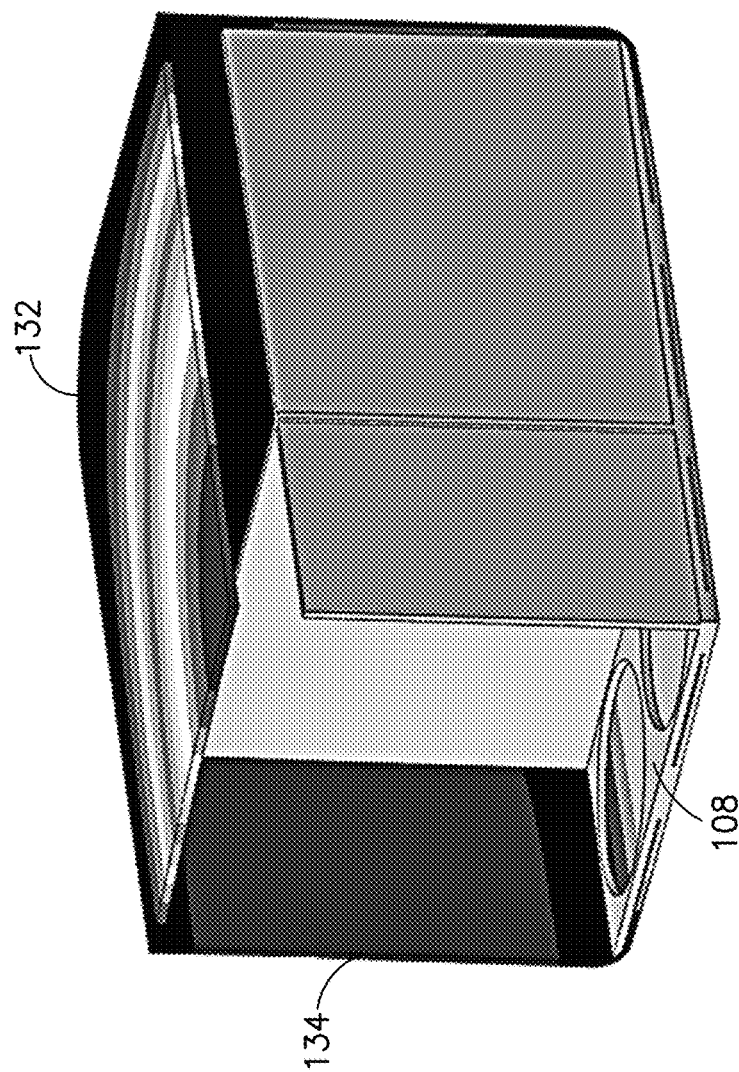
FIG. 35

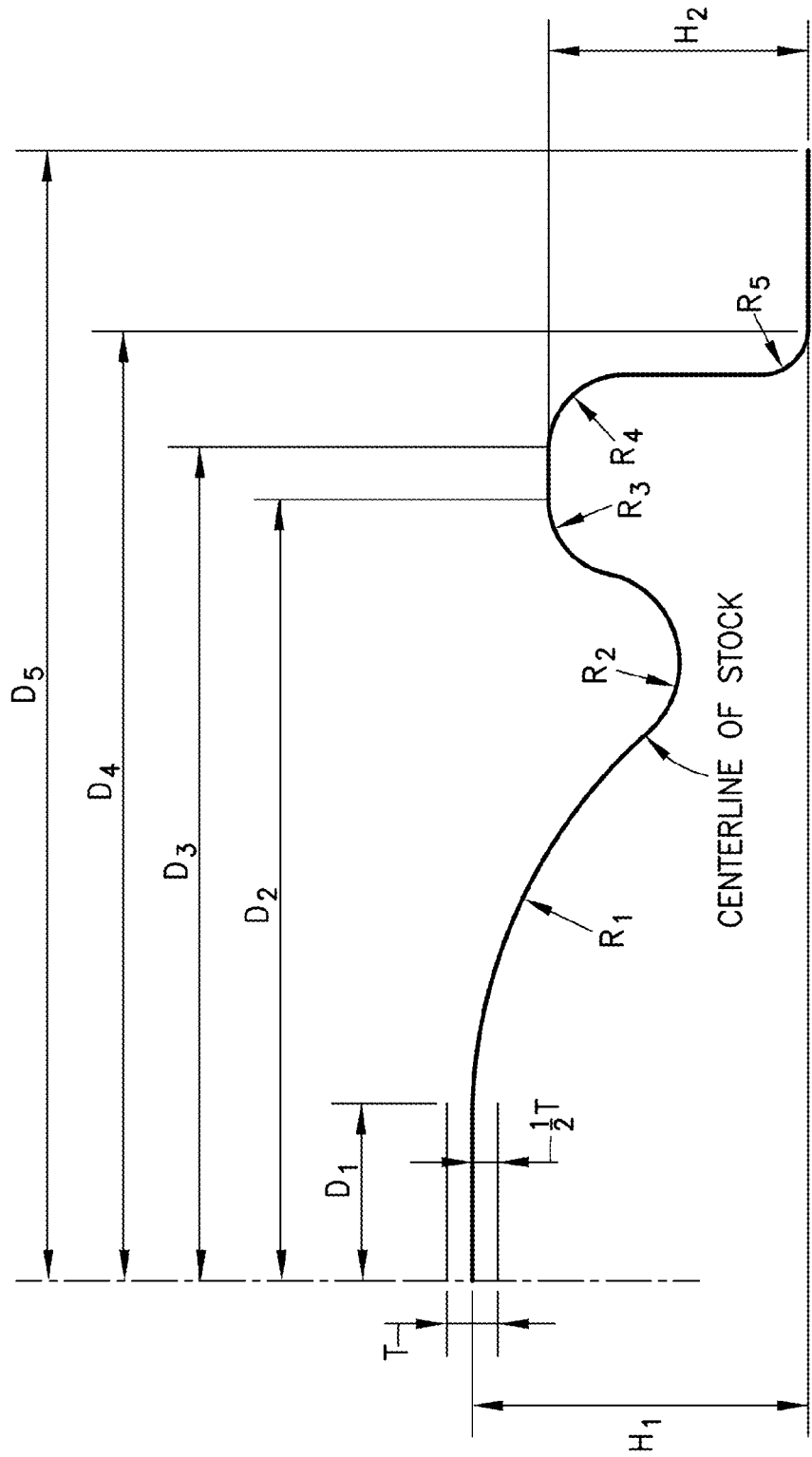

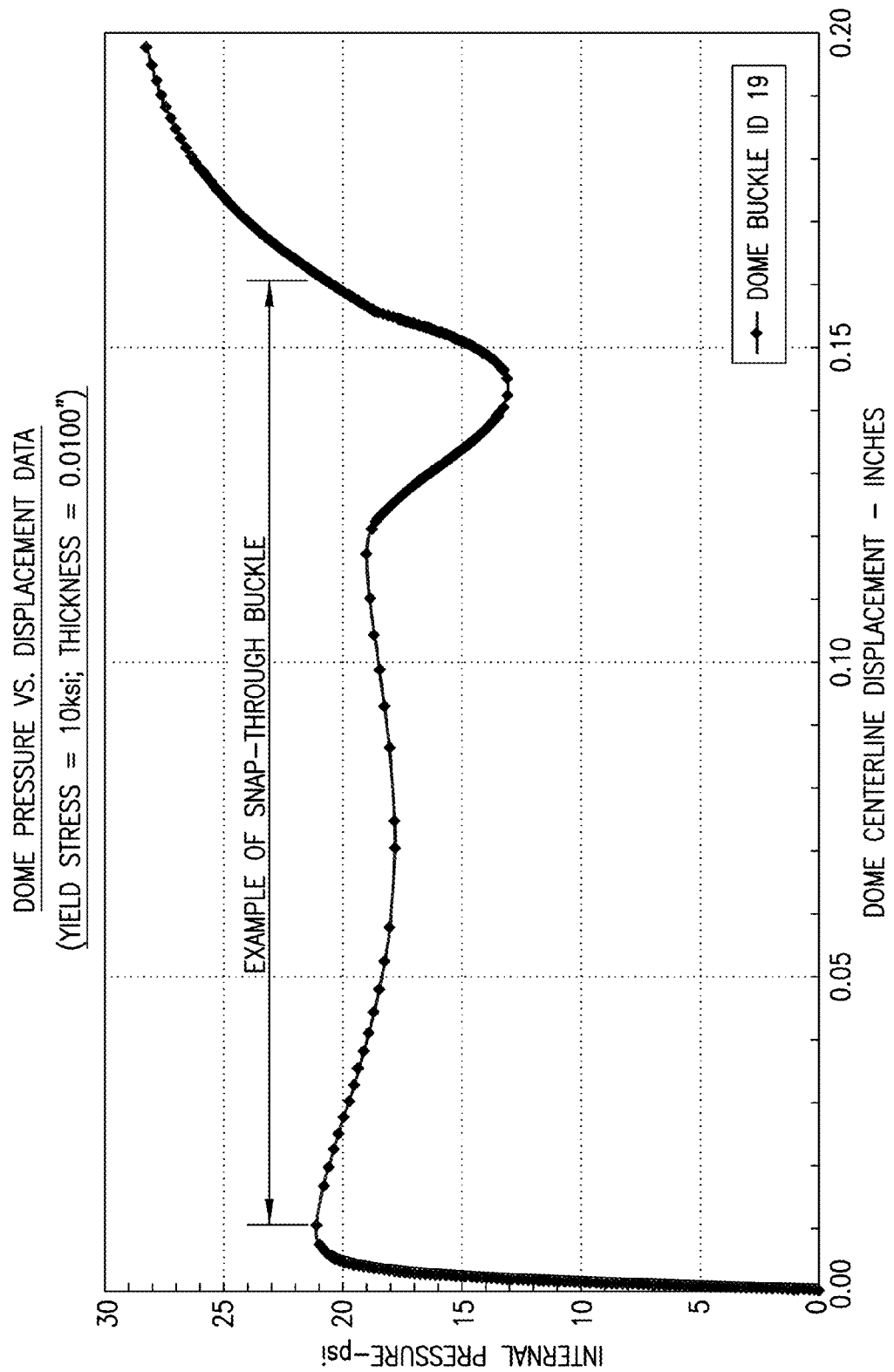

ENERGY STORAGE DEVICE AND RELATED METHODS

CROSS-REFERENCE TO RELATED APPLICATIONS

This patent application is a non-provisional of and claims priority to U.S. Provisional Patent Application No. 62/236,512 filed Oct. 2, 2015, which is incorporated herein by reference in its entirety.

GOVERNMENT FUNDING STATEMENT

This invention was made with government support under Contract No. DE-AR0000392, awarded by the U.S. Department of Energy. The government has certain rights in this invention.

FIELD OF THE INVENTION

Broadly, the instant disclosure is directed towards energy storage assemblies for energy storage devices, where the assembly is configured to reduce, prevent, and/or eliminate failures attributable to pressurization within the energy storage device(s) or energy storage assembly (e.g. which can cause thermal events and/or fires). More specifically, the instant disclosure is directed towards various embodiments of energy storage device assemblies configured with a sealed housing/enclosure and configured to retain individual energy storage devices. In one or more embodiments of the instant disclosure, the energy storage assembly is configured with at least one of: a sealed (e.g. hermetically sealed) housing, configured with a forming operation (e.g. double seam); a current interrupt device, configured with a dome actuator, and/or a pressure vent, configured with a scored pattern to define a vent path and a countersink. In some embodiments, the energy storage assembly is configured with failure mechanisms to prevent pressure from building within the sealed housing, which is configured to house a plurality of energy storage devices.

BACKGROUND

Energy storage devices (e.g. batteries, super capacitors, etc) can undergo thermal events in which a highly exothermic reaction occurs, which can result in a runaway thermal reaction and/or fire. This can cause damage to the underlying device/product in which the energy storage device resides or is attached to (and safety issues for device/product users or bystanders). One such example of an energy storage device is a lithium ion core member (lithium ion cell).

As lithium ion battery assemblies are packaged more densely than other battery or power delivery systems, there is a risk that a failure of one cell in an assembly from abuse may lead to propagating (cascading) runaway in the entire system with explosion and fire risk. In some instances, this abuse can come from external events, such as crash and fire, and also from internal events such as inadvertent overcharge (e.g. due to charging electronics failures or internal shorts due to metal particulates from the manufacturing process).

SUMMARY OF THE DISCLOSURE

Energy storage assemblies, including batteries (e.g. lithium ion batteries), suffer from two failure mechanisms, both of which release a significant amount of thermal energy. Upon impact to the battery cell/module (e.g. jellyroll), the energy storing cells can be punctured, releasing significant amounts of thermal energy. Also, it is possible for the chemical components of the energy storage device to degrade, releasing a high rate of thermal energy in a thermal run away event (which can trigger a chain reaction thermal runaway in other energy storage devices in that energy storage assembly (e.g. battery pack).

Broadly, the present disclosure relates various embodiments for a protection apparatus (i.e. protection from pressure increases, initiated by e.g. charging discrepancies, energy storage device defects, impact events, and/or thermal events) usable in conjunction with a battery assembly in order to reduce, prevent, and/or eliminate failure modes of energy storage assemblies (e.g. rechargeable cells, lithium-ion core members, and/or battery cells).

More specifically, the present disclosure relates to various embodiments for an energy storage assembly configured with the following components: a sealed housing/container (e.g. sealed via a weld or a forming operation); a current interrupt device configured with the housing to electrically disconnect the energy storage assembly from communicating current through its components; a vent component/device configured to vent pressurized gases within the housing upon a predetermined pressure; and an energy absorbing material (e.g. sometimes referred to as a thermal agent) positioned in the housing and between the outer sidewall of the sealed inner can(s) are configured in order to (1) electrically disconnect when the inside of the energy storage assembly reaches a predetermined pressure; (2) vent when the inside of the energy storage assembly reaches a predetermined pressure; (3) absorb energy (kinetic energy) from an impact event (i.e. crash, drop, etc) to reduce, prevent, and/or eliminate a pressure event or thermal event and/or (4) absorb thermal energy and/or extinguish/arrest a flame in order to reduce, prevent, and/or eliminate fire damage to adjacent cells in a battery cell and/or the product form/device in which the battery resides.

In some embodiments, the instant disclosure relates to various embodiments for a protection apparatus (e.g. current interrupt device and/or vent/vent area) which is configured to prevent pressure increases above a predetermined level, when used in conjunction with a sealed housing/enclosure housing a plurality of energy storage devices (e.g. battery cells, sealed or unsealed).

In one embodiment, the energy storage assembly includes: a sealed housing, the seal comprising a weld; and a thermal agent positioned in the outer can and between the outer sidewall of the sealed inner can(s), where at least one of: (a) the sealed housing (i.e. material, material thickness, current interrupt device, and/or vent); and or other configurations (e.g. partition walls and/or energy absorbing materials or flame arresting materials present in the assembly) are specifically designed to and/or are configured to cooperate such that the prevention apparatus: (1) electrically disconnects the energy storage assembly from electrically communicating with other energy storage assemblies and/or the product form/device to which it is in electrical communication with (2) vents when it reaches a predetermined pressure (e.g. indicative of a battery defect, charging issue/overcharge, an impact event and/or thermal event); (3) absorbs energy from an impact event (i.e. crash, drop, etc) to reduce, prevent, and/or eliminate a pressure event or thermal event and/or (4) allows the prevention apparatus to absorb and/or extinguish/arrest a flame during a pressure event (e.g. via the vent configured with flame arrestor) to reduce, prevent, and/or eliminate fire damage to adjacent energy storage assemblies in a module (multiple energy storage assemblies configured to power a product form or device) and/or the product form/device that the energy storage assembly electrically communicates with/contacts.

In one aspect, an apparatus is provided, comprising: a sealed (e.g. hermetically sealed) container configured to: house a plurality of energy storage devices (e.g. rechargeable batteries, e.g. li-ion core members) and enable electrical communication across the container (e.g. from a position inside the container to a position external to the container); a vent device configured along a portion of the container, the vent device comprising: a circular countersink extending perimetrically adjacent to an edge of a substrate to define a central panel, the countersink, and an outer edge, and a score configured on an outer surface of the substrate and positioned within the countersink, such that the container is configured to vent via a snap-through buckling event triggered by the countersink, where the countersink is configured to fracture the score along the score region when the pressure in the container exceeds a predetermined value; and a current interrupt device comprising: an actuator configured with: a dome having a perimetrical countersink, wherein the dome is positioned on the container such that the dome extends towards the inside of the container so that the interior pressure of the container acts upon an inner surface of the dome; a flexible member attached via a first end to at least one of: a first terminal and the container and attached at a second end to the outer surface of the dome, wherein the flexible member is configured to electrically communicate with the first terminal; and a connecting member (e.g. rivet) configured to attach the flexible member at its second end to the outer surface of the dome to retain the flexible member on the dome; and a fuse element (e.g. comprising a metallic member of reduced cross sectional thickness), wherein the fuse element is in electrical communication with the second terminal, further wherein the fuse element is positioned at a predetermined distance from the actuator (e.g. a distance not greater than the displacement distance of the dome and not less than a distance sufficient to prevent electrical arching between the fuse element and the flexible member), wherein the dome is specifically designed to undergo a snap-through buckling event initiated by the interior pressure of the container exceeding a predetermined value, wherein the snap-through buckling event (e.g. dome reversal, dome displacement) is configured to move the flexible member into electrical communication with the fuse element, thus initiating an electrical short in the container.

In one aspect, an apparatus is provided, comprising: a container (e.g. metallic container) including: a body and a cover sealed via a forming operation (e.g. double seam), wherein the container is configured to house a plurality of energy storage devices (e.g. rechargeable batteries, e.g. li-ion core members), wherein the container is configured to enable electrical communication between the plurality of energy storage devices and two terminals located on/external to the container (e.g. or where the terminals are part of the container, with appropriate electrical insulation between the terminals having opposing polarization), including a first terminal and a second terminal, wherein the two terminals are configured with opposite polarizations; and a current interrupt device comprising: an actuator configured with: a dome having a perimetrical countersink, wherein the dome is positioned on the container such that the dome extends towards the inside of the container, wherein the dome is configured to communicate with the interior of the container such that internal pressure acts upon an inner surface of the dome; a flexible member attached via a first end to at least one of: a first terminal and the container and attached at a second end to an outer surface of the dome, wherein the flexible member is configured to electrically communicate with the first terminal; and a connecting member (e.g. rivet) configured to attach the flexible member at its second end to the outer surface of the dome in order to retain the flexible member on the dome; and a fuse element (e.g. comprising a metallic member of reduced cross sectional thickness), wherein the fuse element is in electrical communication with the second terminal, further wherein the fuse element is positioned at a predetermined distance from the actuator (e.g. a distance not greater than the displacement distance of the dome and not less than a distance sufficient to prevent electrical arching between the fuse element and the flexible member), wherein the dome is specifically designed to/configured to undergo a snap-through buckling event initiated by the interior pressure of the container exceeding a predetermined value, wherein the snap-through buckling event (e.g. dome reversal, dome displacement) is configured to move the flexible member into electrical communication with the fuse element to initiate an electrical short in the container (e.g. via melting the fuse element).

In one aspect, an apparatus is provided, comprising: a sealed (e.g. hermetically sealed) container configured to: house a plurality of energy storage devices (e.g. rechargeable batteries, e.g. li-ion core members) and enable electrical communication across the container (e.g. from a position inside the container to a position external to the container); and a vent device configured along a portion of the container, the vent comprising: a substrate having two generally opposed surfaces, including a first surface configured to communicate with the interior of the container and a second surface configured on the outside of the container the panel configured with a circular countersink extending perimetrically around the substrate to define a central panel; and a score configured on the outer surface of the substrate and positioned within the countersink, such that the container is configured to vent via a snap-through buckling event triggered by the countersink, where the countersink is configured to fracture the score along the score region when the pressure in the container exceeds a predetermined value.

In some embodiments, the score is configured to extend along a portion of the countersink to define a scored portion and an unscored portion (e.g. hinge or flap).

In some embodiment, the vent device is configured with a buckling initiator on the first surface of the substrate.

In some embodiments, the buckling initiator is configured on the countersink

In some embodiments, the buckling initiator is configured to intersect with the countersink region having a score.

In some embodiments, the vent device is hermetically sealed to the container.

In some embodiments the vent devices is attached to the container via a welding operation.

In some embodiments the vent device is integral with the container.

In some embodiments, the container is configured to retain: a plurality of li-ion batteries/li-ion core members.

In some embodiments, the container is configured to retain: a support matrix wherein the support matrix is configured to house a plurality of li-ion batteries and maintain the batteries in spaced relation from each other.

In some embodiments, the support matrix includes: at least one of: an energy absorbing material (e.g. kinetic energy and/or thermal energy).

In some embodiments, the support matrix includes: a flame arresting material.

In some embodiments, the apparatus further comprises: corresponding electrical connections (e.g. positive bus bar and negative bus bar, wiring/tabs or electrical connections between individual li-ion batteries and the terminals) configured to connect the li-ion batteries to the terminals and promote electrical communication between the li-ion batteries and the terminals (e.g. to a product form/device or charging source external to the metallic container).

In one aspect, an apparatus is provided, comprising: a metallic container including: a body, the body including a bottom and at least one perimetrical sidewall connected to and extending in an upward direction from the base to define an open upper end having a perimetrical rim/edge and a closed lower end; a cover having a perimetrical edge, the cover configured to be positioned into (e.g. fit over) the open upper end and cooperate with the perimetrical rim/edge; and a seal configured between the cover and the perimetrical rim/edge, the seal including a hermetic seal configured via a forming operation; wherein the metallic container is configured with electrical terminals (e.g. positive and negative terminals) on at least one of: the body and the cover of the container; further wherein the metallic container is configured to retain: a plurality of li-ion batteries/li-ion core members; a support matrix configured to house the plurality of li-ion batteries and maintain the batteries in spaced relation from each other (wherein support matrix includes at least one of: an energy absorbing material (e.g. kinetic energy and/or thermal energy) and a flame arresting material); and corresponding electrical connections (e.g. positive bus bar and negative bus bar, wiring/tabs or electrical connections between individual li-ion batteries and the terminals) configured to connect the li-ion batteries to the terminals and promote electrical communication between the li-ion batteries and the terminals (e.g. to a product form/device or charging source external to the metallic container).

In one aspect, an apparatus is provided, comprising: a metallic container including: a body, the body including a bottom and at least one perimetrical sidewall connected to and extending in an upward direction from the base to define an open upper end having a perimetrical rim/edge and a closed lower end; a cover having a perimetrical edge, the cover configured to be positioned into (e.g. fit over) the open upper end and cooperate with the perimetrical rim/edge; and a seal configured between the cover and the perimetrical rim/edge, the seal including a hermetic seal configured via a double seam forming operation; wherein the metallic container is configured with electrical terminals (e.g. positive and negative terminals) on at least one of: the body and the cover of the container; further wherein the metallic container is configured to retain: a plurality of li-ion batteries/li-ion core members; a support matrix configured to house the plurality of li-ion batteries and maintain the batteries in spaced relation from each other (wherein support matrix includes at least one of: an energy absorbing material (e.g. kinetic energy and/or thermal energy) and a flame arresting material); and corresponding electrical connections (e.g. positive bus bar and negative bus bar, wiring/tabs or electrical connections between individual li-ion batteries and the terminals) configured to connect the li-ion batteries to the terminals and promote electrical communication between the li-ion batteries and the terminals (e.g. to a product form/device or charging source external to the metallic container).

In one aspect, an apparatus is provided, comprising: a hermetically sealed metallic container configured house a plurality of batteries (e.g. li-ion core members); the metallic container configured with a positive terminal and a negative terminal, wherein the positive and negative terminals are configured to electrically communicate current to and from the metallic container (and the contents therein); and a current interrupt device configured to attach to at least one terminal including: the metallic container configured to attach to the other terminal, wherein the current interrupt device and its respective terminal attachment are electrically insulated from the container and its respective terminal attachment.

In some embodiments, the container includes a body, the body including a bottom and at least one perimetrical sidewall connected to and extending in an upward direction from the base to define an open upper end having a perimetrical rim/edge and a closed lower end; and a cover having a perimetrical edge, the cover configured to be positioned into (e.g. fit over) the open upper end and cooperate with the perimetrical rim/edge; and a seal configured between the cover and the perimetrical rim/edge, the seal including a hermetic seal configured via a double seam forming operation.

In some embodiments, the metallic container is configured to retain: a plurality of li-ion batteries/li-ion core members; a support matrix configured to house the plurality of li-ion batteries and maintain the batteries in spaced relation from each other (wherein support matrix includes at least one of: an energy absorbing material (e.g. kinetic energy and/or thermal energy) and a flame arresting material); and corresponding electrical connections (e.g. positive bus bar and negative bus bar, wiring/tabs or electrical connections between individual li-ion batteries and the terminals) configured to connect the li-ion batteries to the terminals and promote electrical communication between the li-ion batteries and the terminals (e.g. to a product form/device or charging source external to the metallic container).

In one aspect, an apparatus (e.g. current interrupt device) is provided, including: an actuator comprising: a dome configured to attach to a wall of a [hermetically] sealed container, the dome configured in a first position such that the dome extends into an inner volume of the sealed container; wherein the dome is configured with a perimetrical countersink, such that the dome is configured to undergo snap-through buckling upon the inner volume of the sealed container reaching or exceeding a predetermined threshold, (e.g. into a second position wherein snap-through buckling results in a permanent displacement of the dome in a direction towards the outside of the sealed container, and into contact with a fuse having an opposite polarization from that of the dome (e.g. displacement of the dome); and a flexible member/leg having two generally opposing ends, wherein a first end is in electrical communication with a polarized portion of the hermetically sealed container (e.g. negative or positively polarized) and the second end is attached (e.g. mechanically attached, adhered, glued, brazed, and combinations thereof) to an configured as an actuator, actuates (displaces) upon increase in pressure.

In some embodiments, the flexible member is attached to the dome via a rivet.

In one aspect, an apparatus is provided, comprising: a) a sealed container configured to house energy storage devices, wherein the container is configured with two terminals (a first terminal and a second terminal, wherein the terminals are oppositely polarized) such that the container is configured to promote electrical communication from the inside of the container to the outside of the container, wherein the container is electrically insulated from the first terminal, and wherein at least a portion of the container is at least a component of the second terminal, or is electrically connected to the second terminal; and b) at least one current interrupt device attached to an in electrical communication with the container, the current interrupt device including: i) an actuator including a dome configured with a perimetrical countersink to promote snap-through buckling; and ii) a flexible member configured with two ends, the first end configured to attach to at least one of: the second terminal and the container and the second end configured with a contact member and configured to attach to and extend from the surface of the dome in a direction facing the first terminal; and wherein the actuator is configured to undergo a displacement (e.g. dome displacement, e.g. snap-through buckling) to contact the contact member with a fuse (e.g. reduced thickness bridge of material) positioned in the first terminal when the pressure inside the sealed container is greater than a predetermined value, whereby a current flow into and out of the container (e.g. including the energy storage devices therein) is interrupted.

In some embodiments, the first terminal is a negative terminal and the second terminal is a positive terminal.

In some embodiments, the dome of the actuator is attached (e.g. sealed) onto the container.

In one aspect, an apparatus (e.g. fuse) is provided, comprising: an actuator configured for electrically communicating with other components and having a first polarization; a member having a second polarization, wherein the first polarization and second polarization are oppositely polarized (e.g. positive and negative polarization); the actuator comprising a dome configured with a perimetrical countersink, the dome configured to have: a first position and a second position; wherein the first position comprises the dome configured to extend away from the member and having a distance from the member to prevent electrical arching; and wherein the second position comprises the dome in a displaced position and in contact with the member to yield an electrical short (e.g. by contacting two oppositely polarized components); wherein the fuse is actuated via a pressurization event initiating a snap-through buckling of the dome to displace the dome from the first position to the second position.

In one aspect, an apparatus (e.g. fuse) is provided, comprising: an actuator configured for electrically communicating with other components and having a first polarization; a member having a second polarization, wherein the first polarization and second polarization are oppositely polarized (e.g. positive and negative polarization); the actuator comprising a dome configured with a perimetrical countersink, the dome configured to have: a first position and a second position; wherein the first position comprises the dome configured to extend away from the member and having a distance from the member to prevent electrical arching; and wherein the second position comprises the dome in a displaced position and in contact with the member to yield an electrical short (e.g. by contacting two oppositely polarized components); wherein the fuse is actuated via a pressurization event initiating a snap-through buckling of the dome to displace the dome from the first position to the second position.

In one aspect, a method is provided, comprising: operating an energy storage assembly, wherein the energy storage assembly is sealed and is configured to operate with an internal pressure not exceeding a predefined pressure, P1; interrupting the current to a to the energy storage assembly as the internal pressure of the energy storage device exceeds P1, the internal pressure above operating pressure defined as P2; and venting the internal pressure of the energy storage assembly as the internal pressure of the energy storage assembly exceeds a threshold vent pressure defined as P3.

In some embodiments, the interrupting step further comprises: electrically disconnecting the energy storage assembly from electrically communicating with at least one of: a product form and another energy storage assembly, the electrical disconnection configured via a current interrupt device.

In some embodiments, the venting step further comprises propagating a perforation of a scored vent via a snap-through buckling event of a dome configured proximate to the scored vent.

In some embodiments, the method further comprises venting the energy storage assembly via a position between a wall and a lid of the energy storage assembly when the internal pressure of the energy storage device exceeds a housing failure pressure defined as P4.

In some embodiments, the cover is sealed to the body via a forming operation.

In some embodiments, the cover is sealed to the body via a welding operation.

In one aspect, a method is provided, comprising: forming a housing via a forming operation; attaching a current interrupt device onto a portion of the housing; configuring a vent into a portion of the housing; inserting a support matrix into the housing; configuring li-ion storage devices in the support matrix; attaching the li-ion storage devices to the housing to enable electrical communication between the housing and the li-ion storage devices; and sealing the housing to enclose the li-ion storage devices, support matrix, and electrolyte therein.

In one embodiment, sealing comprises sealing the lid and the housing via a forming operation.

In one embodiment, configuring the li-ion storage devices further comprises: positioning each li-ion storage device into a via in the support matrix; and priming the li-ion storage device with electrolyte. As used herein, "energy storage device" means": a device that stores energy to perform useful processes at a later time. Non-limiting examples of energy storage devices include: batteries, primary batteries, lead acid batteries, secondary (rechargeable) batteries, lithium ion batteries, lithium ion core members, and combinations thereof.

As used herein, "energy storage assembly" means: one or more energy storage devices and related components to assemble the energy storage devices. A non-limiting example of an energy storage devices is a battery assembly (e.g. housing a plurality of lithium ion core members).

As used herein, "battery cell" refers to: an individual electrochemical cell (e.g. including electrodes and electrolyte) configured to supply electricity in electrical equipment. In some embodiments, the battery cell is a lithium ion battery cell. In some embodiments, the battery cell is a lithium ion core member. For example, battery assemblies of the instant disclosure can be quantified in terms of amp hours available/produced, where an amp-hour (Ah) is a unit of electric charge, equal to the charge transferred by a steady current of one ampere flowing for one hour, or 3600 coulombs. In some embodiments, battery assemblies of the instant disclosure are configured for a 25 Ah application to a 200 Ah application.

As used herein, "battery assembly" means: a plurality of battery cells (e.g. lithium ion core members) configured to electrically communicate and provide electricity to one or more product forms/devices. In some embodiments, the battery assembly is configured with electrical wiring (and related, corresponding connections) and housing configured to fit into/onto a product form or product device.

As used herein, "rechargeable battery" means: (of a storage battery) capable of being charged repeatedly. In some embodiments, a rechargeable battery a type of electrical battery which can be charged, discharged into a load, and recharged many times.

As used herein, "double seaming" means: attaching two components together using a forming operation, in which a particular pattern of edge folding retains the two components (e.g. a top or bottom to a sidewall of a can) together. In some embodiments, double seamed joints can withstand significant internal pressure and intimately tie and hermetically seal the top and sidewall together. In some embodiments, the flanges are configured to be of sufficient thickness such that the two components are capable of bending in a severe angle to create the double seam forming closure. In some embodiments, double seaming is completed with substrates that are sheets (e.g. aluminum, aluminum alloys, copper, copper alloys, nickel, nickel alloys, polymers, and combinations thereof). In some embodiments, the thickness of each sheet at the double seam is not greater than 0.5 mm. In some embodiments, the thickness of each sheet at the double seam is not greater than 0.75 mm. In some embodiments, the thickness of each sheet at the double seam is not greater than 1 mm. In some embodiments, the thickness of each sheet at the double seam is not greater than 1.5 mm. It is noted that thicker sheets/substrates are capable of being configured in a double seem with variations in process equipment, tool design and process speed.

In some embodiments, the flange/lip of the double seam is coined, machined, ironed, etc, in order to locally thin the flange and configure the flange for sealing with the lid/cover via a forming operation (e.g. double seam, or crimp).

As used herein, "vent" means: an area configured in an object or device capable of opening in order to permit air, gas, and/or liquid to pass through it (e.g. out of or into a confined space).

In some embodiments, a vent area is configured to form a vent at a predetermined pressure. In some embodiments, the vent is configured to exhaust flammable gases and/or release pressure built-up inside the battery assembly.

In some embodiments, the vent area includes a score and a score initiation site. In some embodiments, the vent area comprises a score on a substrate, wherein the score is configured with a residual thickness sufficient to cause the substrate to tear/fracture along the substrate once a vent initiating event occurs (e.g. pressure increase). In some embodiments, the vent is configured with a score.

In some embodiments, the vent area substrate is configured to attach to the housing (e.g. lid and/or body). In some embodiments, the vent is configured to open in a predetermined manner such that the substrate tears/separates along a predetermined path across/around at least a portion of the substrate. In some embodiments, the vent is configured to enable an opening to occur in the substrate material upon an overpressure event. Positioned along a generally planar portion of the housing (e.g. positioned away from joints in the housing and/or terminal areas).

In some embodiments, the vent is sufficiently sized and configured to promote venting of off-gas in a pressurization event.

In some embodiments, the vent is sufficiently sized and configured such that the vent does not contribute to dimensional instability (e.g. causing unplanned venting events during ordinary operating pressure and/or movement in a product form in ordinary course of usage).

In some embodiments, the vent is sufficiently sized and configured to prevent flashback of flammable off-gases in a venting event (which can result in ignition of the apparatus).

In some embodiments, the vent is sufficiently sized and configured (e.g. large enough and opens to a wide enough vent) in order to promote gas venting at a velocity less than the velocity of atomization and ignition of the gas stream (e.g. preventing formation of a highly reactive gas stream).

In some embodiments, the vent is configured to vent at an elevated pressure. In some embodiments, the vent is configured to remain intact during ordinate and customary usage of the product form. In some embodiments, the vent is configured to promote venting and reduce, prevent and/or eliminate the risk of flashback during venting.

In some embodiments, the substrate comprises a vent configured to release and vent pressure at a predetermined pressure.

In some embodiments, the vent comprises a vent panel (e.g. an area having a reduced thickness, as compared to the body and/or cover, such that the vent area/vent panel is configured to tear/rupture at the location of reduced thickness.

In some embodiments, the vent includes a score.

As used herein, "score" means: a notch or line cut or scratched into a surface. In some embodiments, the vent includes a score in order to identify a predetermined initiation/propagation site for a fracture/vent to occur in the vent. In some embodiments, the score is in a score pattern (e.g. so that upon venting, the substrate fractures/disconnects, perforates, tears, and/or ruptures at the score pattern in a predetermined way.

In some embodiments, the score area is configured in a geometric shape on a substrate.

In some embodiments, the score area is configured to vent (fail the score line) in a geometric shape.

In some embodiments, the score is configured as a linear score.

In some embodiments, the score is configured as a dog-bone shaped score.

In some embodiments, the score is configured as a circular score.

In some embodiments, the score is configured as a semi-circular score.

In one embodiment, the score line comprises a round line configured to extend a predetermined length along the substrate.

In one embodiment, the score line comprises a circumferential line configured to extend along/around a portion of the substrate.

In one embodiment, the score line comprises a perimetrical line configured to extend a predetermined length along the outer edge/region of the substrate.

In one embodiment, the score line comprises an arcuate line configured to extend a predetermined length along the substrate.

In one embodiment, the score line comprises a radial vent configured to extend a predetermined length along the substrate.

In some embodiments, scoring generally reduces in thickness of a material along a defined path to weaken it intentionally along that path for the purpose of opening or releasing pressure. In some embodiments, during the scoring operation, the metal (substrate) positioned beneath the scoring knife is subjected to compression in the direction of the scoring tool (e.g. knife).

As used herein, "score residual" means: the portion of metal that is left after scoring a surface. In some embodiments, the score residual is between about 0.3 to 0.5 of the sheet thickness. In some embodiments, the score residual is not less than 0.003" thick.

As used herein, "countersink" means: a raised portion (e.g. raised ridge or groove) on a component (e.g. the vent area or dome actuator). In some embodiments, the countersink is configured to act as an initiation site for generating strain (e.g. across the score during a vent event, e.g. across the dome actuator during a current interrupt event). In some embodiments, the countersink is configured to propagate an initiation site of a vent thorough (e.g. substantially through, through a portion of, throughout all of) a score along the vent.

In some embodiments, the score is positioned in the countersink.

In some embodiments, the score is positioned to transect the countersink.

Without being bound by a particular mechanism or theory, it is believed that as the countersink depth increases, it increases the stress on the score at countersink to initiate snap through (i.e. initiate a snap-through buckling event). Without being bound by a particular mechanism or theory, it is believed that the countersink reversal pressure is a function of countersink depth, countersink radius, countersink diameter, material strength and sheet thickness. For a minimum thickness sheet, with a minimum countersink depth, this is a plot of the countersink reversal pressure as a function of countersink diameter and countersink radius for a fixed yield strength.

As used herein, "buckling initiator" means: an area configured to cause/start buckling (e.g. bending/giving way) at a specified location of the vent (e.g. score line, e.g. score line positioned in a countersink of a vent) under pressure or strain. In some embodiments, the buckling initiator causes the venting to occur at the appropriate position, positioned along the score line and at a predetermined distance from the hinge. In some embodiments, the buckling initiator is scored, embossed, stamped, scratched, etched, or a combination thereof.

As used herein, "hinge" means: a movable joint or mechanism. In some embodiments, the vent is configured with a score and a hinge, such that when the score opens, the hinge is maintained to create a vent lid/flap on the vent area.

In some embodiments, the hinge is positioned adjacent to (intersecting with) the score path. In some embodiments, the hinge is configured in the countersink.

In some embodiments, the countersink is configured with a buckling initiator. In some embodiments, the panel is configured with a buckling initiator. In some embodiments, the panel radius is configured with a buckling initiator.

As used herein, "flame arrestor" means: a material or object to reduce, remove, or eliminate flammability. In some embodiments, the flame arrestor is configured to lower the temperature of the exiting gas to below the gas stream ignition temperature. In some embodiments, the flame arrestor is configured to prevent a flame front from reentering the enclosure containing the multi-roll structure.

Some non-limiting examples of flame arrestors include: a fine mesh, an open cell foam, a thin tube describing a tortuous path, a long straight tube of sufficiently small diameter, a perforated sheet, or combinations thereof. In some embodiments, the gas path obstruction is fabricated of sufficiently conductive (e.g. thermally conductive) material that the gas temperature is lowered to below the auto-ignition temperature. A non-limiting example of a flame arrestor material is copper.

In some embodiments, the vent is configured with a flame arrestor.

In some embodiments, the flame arrestor is configured to prevent flames from reentering the enclosure/housing upon venting. In the event of a failure of an individual lithium ion core member (e.g. jellyroll), a large amount of gas is generated (~10 liters, when referring to a battery assembly configured for automotive applications), and this gas is both hot (~250-300° C.) and flammable. In some embodiments, in order to prevent the flame front from entering the energy storage assembly and/or to prevent the gas stream from reaching its ignition point, a copper mesh flame arrestor is placed over the vent. A non-limiting example of a flame arrestor is a 30 mesh, 0.012" wire diameter of copper material.

As used herein, "current interrupt device" means: a device configured to interrupt electrical current or electrical communication through a battery assembly and/or from a battery assembly to an adjacent battery assembly or product form/device.

In some embodiments, the current interrupt device is configured to disconnect the battery assembly from electrical communication with the product form and/or other battery assemblies, e.g. in instances of an overcharge event (e.g. charging a cell beyond its electrochemical voltage window), mechanical frustrums (e.g. nail penetration) and/or high internal pressure.

As used herein, "support" means: a component configured to retain or hold another object or device in position. In some embodiments, the support is configured to hold each of the plurality of energy storage devices in a position within the housing, such that a predetermined position/distance is maintained. In some embodiments, the support includes a fire barrier, a phase change material, a plastic (e.g. filled with a fire barrier), and/or an intumescent material/coating. An extinguishing material, configured to react and release fire quenching material (e.g. releasing CO2 or otherwise reacting to remove oxygen species from an area proximate (e.g. within the cell).

As used herein, "energy absorbing component" means: a material or device configured to absorb energy (e.g. kinetic energy or thermal energy). As non-limiting examples, the energy absorbing component includes: phase change materials (e.g. heat absorbing layer will decompose at 100 C or more and absorb heat); inorganic materials; ceramic materials; carbonate materials and compounds; hydrate materials and compounds; sodium hydrogen carbonate; calcium carbonate; metal oxides; aluminum hydroxide (aka ATH); aluminum oxide; oxides or nitrides of silicon, aluminum, titanium, zirconium, zinc, magnesium or any mixtures of the oxides or nitrides (e.g. silicon oxide; titanium oxide); silicon carbide; metal nitride materials; silicon nitride; calcium silicate; endothermic material (e.g. configured to absorb thermal energy), hydroxide compounds or materials; hydrogel; common carbonate salt ceramics; heat resistant glass; alumina; carbon; wool fibers; glass fibers; dawsonite; concrete; ablative materials; intumescent resins; modified epoxy binders, and/or polymers impregnated with any of the foregoing materials, and combinations thereof.

As used herein, "kinetic energy absorbing component" means: a material or device configured to absorb kinetic energy (e.g. impact event, drop event or crash).

As used herein, "thermal energy absorbing component" means: a material or device configured to absorb thermal energy (e.g. temperature excursion, exothermic reaction, sudden flame, or combinations thereof).

As used herein, "thermal agent" refers to at least one material (e.g. chemical compound) that is configured to absorb and/or reduce/extinguish thermal energy and/or a fire.

In some embodiments, the thermal agent is configured between the inner wall of the outer can and the outer wall of the inner can. In some embodiments, the thermal agent is configured between the outer wall of the inner can and the partition walls. In some embodiments, the thermal agent comprises: at least 1% to 100% of the open volume in the outer can.

In some embodiments, the thermal agent comprises: at least 5 vol. %; at least 10 vol. %; at least 15 vol. %; at least 20 vol. % at least 30 vol. %; at least 40 vol. % at least 45 vol. %; at least 50 vol. %; at least 55 vol. %; at least 60 vol. %; at least 65 vol. %; at least 70 vol. %; at least 75 vol. %; at least 80 vol. %; at least 85 vol. %; at least 90 vol. %; at least 95 vol. %; or 100 vol. % of the open volume of the outer can.

In some embodiments, the thermal agent comprises: not greater than 5 vol. %; not greater than 10 vol. %; not greater than 15 vol. %; not greater than 20 vol. % not greater than 30 vol. %; not greater than 40 vol. % not greater than 45 vol. %; not greater than 50 vol. %; not greater than 55 vol. %; not greater than 60 vol. %; not greater than 65 vol. %; not greater than 70 vol. %; not greater than 75 vol. %; not greater than 80 vol. %; not greater than 85 vol. %; not greater than 90 vol. %; not greater than 95 vol. %; or 100 vol. % of the open volume of the outer can.

In some embodiments, the thermal agent is an energy absorbing material.

In some embodiments, the thermal agent is configured to degrade/decompose and release an extinguishing agent (e.g. water vapor, carbon dioxide) or absorb a combustion source (ambient oxygen, flammable components of the electrolyte, and/or electrodes) in proximity to the thermal zone, battery pack, and/or battery cell(s)/module(s). Some non-limiting examples of thermal agents include: commercial fire retardant materials, hydrogel, and combinations thereof.

In some embodiments, the energy storage assembly is configured such that the energy storage assembly does not undergo a substantial amount of expansion (e.g. quantified as volumetric expansion and/or permanent expansion of the sealed housing through creep of the substrate materials during extended operation with elevated internal pressure, which results in a loss of strength in the substrate materials).

In some embodiments, the energy storage assembly is configured such that the assembly is able to undergo a certain amount of expansion (e.g. such that the electrode structures in each of the individual energy storage devices is able to cycle during charge and discharge.

In some embodiments, expansion of the energy storage assembly is mitigated in order to reduce, prevent and/or eliminate premature failure of the cell through inadvertent venting, and/or result in a loss of efficiency of the energy storage system, as through inadequate coverage of the energy storage device components (e.g. electrodes) with electrolyte.

In some embodiments, the wall thickness is configured to promote energy storage device (e.g. battery) operation while limiting expansion of the energy storage assembly to less than 1% (e.g. during normal operation). In this configuration, thinner walls enable higher internal volume, contributing to increased energy density and/or specific capacity.

In one embodiment, the energy storage assembly is configured with a plurality of different fail safe mechanisms. In one embodiment, the energy storage assembly is operated such that upon rising pressure in the interior of the battery assembly (e.g. within the housing), the battery assembly is configured to undergo a sequence of failsafe mechanisms in order to reduce, prevent, and/or eliminate the further pressurization and/or instability/flammability of the energy storage device.

During operation, the energy storage assembly is configured to operate within an acceptable pressure range, wherein the upper limit of the pressure range is defined by P1.

If, during operation, the energy storage assembly reaches or exceeds P1 and reaches P2, then the energy storage assembly is configured with a current interrupt device, such that the current interrupt device is configured to disconnect the battery assembly from electrically communicating with the product form and/or other battery assemblies in electrical communication with the product form.

If, during operation and after the current interrupt device interrupts current from the energy storage assembly pressure increases, such that the battery assembly reaches or exceeds P3, then the battery assembly configured with a vent area is configured to tear and release pressure (including gases retained within the energy storage assembly), directing the gas from the energy storage assembly.

If during operation and after the vent discharges gas from the energy storage assembly, pressure continues to increase such that it reaches or exceeds P4, then the housing (e.g. container body) is configured to yield/vent and release pressure (e.g. at the area where the lid is attached to the body, at the area where the body has joined sections, and/or in areas where the lid is discontinuous).

In some embodiments, the various failsafe mechanisms are configured such that $P1<P2<P3<P4$, wherein such pressure thresholds are spaced such that a hierarchy of operations is achieved. In this embodiment, P1 is the normal operating pressure (e.g. 3 psi); P2 is the pressure for current interrupt (e.g. 20 psi); P3 is the venting pressure (e.g. 40 psi); and P4 is the box failure pressure (e.g. 50 psi).

As a non-limiting example, an embodiment of a pressure disconnect is configured such that it ceases electrical communication but maintains the hermetic seal of the housing, as premature venting initiated by a current disconnect would cause premature venting and/or hinder the ability of the vent to actuate/operate.

In some embodiments, the energy storage assembly is a battery assembly includes a plurality of lithium ion cells (e.g. rechargeable batteries). In some embodiments, the battery assembly includes prismatic and/or cylindrical cell systems packaging in one or a plurality of polymer cells (such as the ones made by AESC, LG).

In some embodiments, the energy storage assembly is a battery assembly includes packaging standard prismatic cells having one or more non-separated flat wound or stacked electrode structures (such as those made by SDI, ATL and Panasonic).

In some embodiments, the battery assembly includes one or more module of sealed Li-ion cells.

In some embodiments, the battery cell includes: a plurality of batteries, the electrical wiring and connections, and a container (e.g. rigid container), configured to house the cells and electrical wiring/connections to the cells separate from the device/product that the battery pack supports. In some embodiments, the battery cell components reside in an outer can/housing configured with a seal (via a forming operation or weld).

In some embodiments, the battery cell includes: a plurality of batteries configured in electrical communication with electrical wiring & connections, and at least one protection apparatus.

As used herein, "protection apparatus" refers to a sealed can which houses at least one energy storage device, where the protection apparatus is configured to protect the at least one battery from at least one of: impact event(s) and/or thermal event(s) (e.g. including pressure associated with these types of events).

In some embodiments, the protection apparatus includes a housing, which is configured to substantially enclose a plurality of batteries (each housed in an inner sleeve); a current interrupt device, a vent, partition walls, or combinations thereof.

In some embodiments, the protection apparatus in the form of an outer can includes a plurality of partition walls which extend across the inside of the outer can, such that the partition walls extend between adjacent inner cans (housing batteries). In some embodiments, the partition walls are configured to provide stiffening (mechanical strength) to the outer can (e.g. in the event of an impact event).

As used herein, "housing" means the casing that encloses and protects the energy storage devices and other energy storage assembly components.

As used herein "body" refers to the sidewall and/or bottom of the housing, which is configured to retain a plurality of cells.

As used herein, "cover" refers to a top that lies on, over, or around the body. In some embodiments, the cover is configured to mechanically attach to the body (e.g. at an upper edge of the body.

In some embodiments, the cover is configured to fit over an upper open end of the body, such that certain energy storage device components (i.e. plurality of batteries, electrical wiring/connections) are enclosed within the housing (cover and body).

In some embodiments, the cover is sealed on an upper perimetrical lip/opening of the body (e.g. sidewall). In some embodiments, the cover is mechanically attached to the body. In some embodiments, the cover is crimped onto the sidewall.

Some non-limiting examples of attachment devices/components include: welding, crimping, sealing (with glue, adhesives, brazing), mechanically fastening, and combinations thereof.

In some embodiments, the body includes a bottom and at least one sidewall. In some embodiments, the bottom is configured along a lower portion of the body, with a perimetrical sidewall (or a plurality of sidewalls) configured around the bottom and extending upward from the bottom, yielding an open, upper end along the top portion of the body (e.g. forming a container, configured to retain a plurality of cells).

In some embodiments, the protection apparatus (e.g. container or housing) is configured to retain the thermal event to within the container and/or to an area proximate to the affected battery/li-ion core); such that the damaged assembly is configured to be removable from the battery pack and/or product form (and exchanged/replaced with undamaged components).

In some embodiments, at least one of the protection apparatus components, the body, the sidewall, the cover and/or the partition wall (outer can only); are configured to absorb the force from an impact event (e.g. high pressure over a short period of time). Some non-limiting examples of impact events include crash events (battery packs utilized in vehicles), drop events (e.g. consumer electronics, power tools, etc), and the like.

In some embodiments, at least one of the protection apparatus (inner can or outer can) components: the body, the sidewall, the cover, partition walls (outer can only), the thermal agent and/or flame arrestor are configured to absorb the thermal energy from a thermal event. Non-limiting examples of thermal events include: thermal run away, cell rupture, overheating, overcharging, short circuiting, catching fire, or a combination thereof (e.g. where one or more of these thermal events is triggered via a crash event, as set forth above).

In some embodiments, at least one of the protection apparatus components: the vent area, the score, and/or the current interrupt device, are configured to respond to increasing pressure (e.g. initiated via an impact event and/or thermal event) and mitigate rising pressure via a release/tear (e.g. vent, score) or current interrupt (via dome actuator) in order to: (1) electrically disconnect a battery/battery from electrical communication with other batteries, battery cells, and/or the product form/device and/or release gases from a battery or battery cell and/or.

In some embodiments, the cross-sectional thickness of the inner can (e.g. cover, body) is: from 150-500 microns (e.g. from 200-230 microns). In some embodiments, the cross-sectional thickness of the outer can (e.g. cover, body) is: from 150-500 microns (e.g. from 200-230 microns). In some embodiments, the cross-sectional thickness of the outer can body range from 380-500 microns. In some embodiments, the can lid has a cross-sectional thickness of from 500-750 microns. In some embodiments, the thickness of the lid is 2000 microns and the thickness of the body is 1500 microns.

As used herein "substrate" refers to: a layer of material that is a portion of the wall in the housing. Some non-limiting examples of substrate material include: aluminum alloys, aluminum, 3XXX series aluminum alloys (e.g. 3003, 3004, 3014); 5XXX series aluminum alloys; 6XXX series aluminum alloys (e.g. 6061); copper; copper alloys; nickel; nickel alloys; polymers; and combinations thereof.

In some embodiments, the housing (e.g. sealed enclosure, pressure vent, and/or current interrupt device) and/or the support of the energy storage assembly are configured to reduce mass load imparted upon the energy storage assembly during an impact event (e.g. crash or drop of the product form or device including the lithium ion battery cell). In some embodiments, the housing and/or support is configured to deform in response to an impact event. In some embodiments, the housing and/or support is configured to absorb energy in response to an impact event. In some embodiments, the vent area is configured to release pressure (pressurized gases) from the housing in a controlled way (e.g. vent, countersink, score, flame arrestor) in response to a pressure event.

In some embodiments, a battery assembly (e.g. lithium ion cell) configured with a protection apparatus is provided. The battery cell includes a plurality of batteries retained within a protection apparatus, where the protection apparatus includes an inner can and an outer can, where the protection apparatus is configured to undergo a deformation, release pressure (e.g. gases); and/or absorb energy associated with an impact event and/or absorb thermal energy (e.g. to protect the batteries and/or battery cell from a thermal event).

In some embodiments, a battery assembly is provided, comprising: a plurality of batteries (e.g. lithium ion batteries), wherein each battery comprises an electrical connection; an electrical bus work including an outlet port configured to extend from the inside of the container (at the bus work) to the outside of the container, where the bus work and outlet port are configured to electrically communicate with the electrical connection of each battery and communicate current from the cell via the outlet port; a protection apparatus, configured to retain the plurality of batteries therein, the protection apparatus comprising, wherein the protection apparatus is configured to absorb a mass load during an impact event to reduce, prevent, or eliminate such force from reaching the batteries retained in the protection apparatus.

In some embodiments, a battery apparatus is provided. The battery apparatus includes: a plurality of lithium ion batteries, where each lithium ion battery is sealed in a protection apparatus (inner can). The protection apparatus includes: a metallic body (e.g. aluminum or copper alloy) (the body including a bottom and a perimetrical sidewall with an open upper end) and a cover configured to fit on the upper open end of the body, and a forming seal positioned between the open upper end of the body and the outer perimetrical edge of the cover, where the forming seal is configured to enclose the electrolyte and gases within the inner wall of the inner can.

In some embodiments, the cover is sealed to the body (e.g. at the upper end of the battery) via a forming operation.

Non-limiting examples forming operations to seal the cover to the body (e.g. to enclose the battery) include: a double seam (e.g. including a polymer configured to generate seal); a crown (e.g. snap on); a cap (e.g. screw cap onto threaded engagement at upper end of the body); a press-fit configuration; a crimp; a hemmed over attachment; a weld (e.g. welding); a roll-on; a rolled on pilfer proof thread(s); an EMF bond; adhesive; mechanical fasteners; and combinations thereof.

Non-limiting examples of welding include: ultrasonic welding, laser welding, friction welding, EMF bonding, or combinations thereof.

In some embodiments, the protection apparatus is configured (via the vent and/or score pattern) to: vent gas from the inner can from a vent, where the vent is configured to open upon the pressure of the inner can reaching (or exceeding) a predetermined pressure.

In some embodiments, the vent is sufficiently sized to allow gas to escape via the gas evolution rate during a thermal event. In some embodiments, the vent is configured (sized & located) such that that the pressure (during a pressure event) does not exceed the pressure limit of the outer can (the box does not burst).

In some embodiments, the body of an outer can is configured with at least one vent. In some embodiments, the cover of an outer can is configured with at least one vent. In some embodiments, the bottom of an outer can is configured with at least one vent.

In some embodiments, the vent comprises a score pattern, where the score is configured to tear/break apart the substrate along the score at a predetermined threshold pressure to release the pressure (and prevent a thermal event, fire, and/or explosion).

In some embodiments, the score is configured/positioned on the sidewall of the inner can. In some embodiments, the score is configured/positioned on the cover of the inner can. In some embodiments, the score is configured/positioned on the bottom of the inner can. In some embodiments, the score is configured/positioned on the sidewall of the outer can (container). In some embodiments, the score is configured/positioned on the bottom of the outer can. In some embodiments, the score is configured/positioned on the cover of the outer can. In some embodiments, the score is configured on the substrate (e.g. inner can or outer can) after the can is formed but prior to assembly (e.g. prior to insertion of electrolyte and/or attachment of electrical contacts).

In some embodiments, the vent area is configured with a flame arrestor. In some embodiments, the flame arrestor is configured to fit over the vent area, such that upon a pressure event, the vent area opens (at the vent area or score pattern) and the hot gas (e.g. hydrogen gas) is directed through the vent and through the flame arrestor to exit the inner can. In some embodiments, the flame arrestor comprises a thermally conductive heat exchanger material (e.g. copper). In some embodiments, the flame arrestor comprises a mesh.

In some embodiments, the flame arrestor is configured (in the event of a flame accompanying the pressure event/gas eruption) to reduce/decrease the temperature of the gas stream and/or prevent the flame from propagating backwards into the battery.

In some embodiments, the protection apparatus (e.g. inner can) is configured with a current interrupt device (via the displacement device) to: electrically disconnect a battery upon a pressure event (e.g. initiated via a thermal event and/or impact event).

In some embodiments, the displacement device is a dome. In some embodiments, the displacement device is a flat face (e.g. configured to bow/extend outward from the interior of the can at a predetermined threshold pressure). In this either configuration (e.g. dome or flat face/bottom), the displacement device (upon displacement) is configured to disconnect a weld between the bottom of the inner can and the electrode (e.g. to effect an electrical disconnect of the battery in response to a pressure event). In some embodiments, the dome actuator is configured with a countersink.

In some embodiments, the body of the inner can (sleeve) is impact extruded. In some embodiments, the body of the inner can is drawn and ironed. In some embodiments, the body of the outer can is impact extruded. In some embodiments, the cover of the outer can is drawn and ironed.

In some embodiments, configured with an electrolyte resistant member (e.g. plastic film) on inside of inner can or inside of outer can or cover (of inner can or outer can). In some embodiments, the cover is configured to seal to the upper end of the body via a layer of sealing compound (e.g. electrically insulating), which enables/promotes a seal but prevents the two pieces from making electrical contact.

In some embodiments, the protection apparatus (e.g. outer can) includes a plurality of slotted partition walls configured to extend from one side of the sidewall to another sidewall, such that the partition wall acts as a separator between two or more batteries in a battery cell.

In some embodiments, at least some of the partition walls include slots (e.g. vertical slots) at predetermined locations, where the slots extend through the wall and along at least a portion of the length of the wall. The partitions with slots are then fitted into one another to create a framework of partitions, such that the partitions separate adjacent batteries in a battery cell from one another.

In some embodiments, the partition wall is configured to act as a heat exchanger, removing/stripping heat from the battery/inner can and carry heat away from the battery, to decrease the probability of a thermal event in adjacent batteries.

In some embodiments, the partition wall is configured with vertical direction stiffeners and/or surface features which are configured to stiffen in x and y direction (e.g. upon an impact event/crash). In some embodiments, the partition wall(s) are attached to the inner wall of the outer can (container) via welding.

In one embodiment, a method is provided. The method includes the following steps: rolling the a metal substrate to form a can body the body having: a bottom, a perimetrical sidewall surrounding and extending upwardly from the bottom, and an open upper end generally opposed from the bottom; welding an electrical contact/electrode (e.g. aluminum contact) to the can bottom (e.g. with a welder horn); positioning an electrically resistant member (plastic) over the upper, open end of the body (e.g. to cover the inner wall of the body, the inner sidewall of the cover (proximate to the battery), or both); threading in an electrical contact into the battery; sealing a cover onto the upper end of the body via a forming operation; the cover configured with a hole positioned proximate the electrical contact; inserting electrolyte into the battery via the hole in the cover; priming the battery via a charge/discharge cycle; sealing the can (via a grommet), the seal configured to retain the electrolyte (and/or any off gases) into the can, wherein the seal is positioned between/around the electrical contact extending from the battery and the hole in the cover); and attaching the electrical wiring (e.g. copper connection) to a bus bar.

In some embodiments, if the cover is touching the sidewall of the can, utilize a spacer grommet around the hole to electrically insulate and isolate the electrical connection from the top.

In some embodiments, the cover of the inner can has a thickness range of 0.006" to 0.009" (but could be thicker depending on cylinder diameter).

In some embodiments, the score pattern comprises a score residual (e.g. the thickness of the metal left below the score line). In some embodiments, the score residual is at least 75 microns to not greater than 190 microns, based upon sheet thickness (e.g. 250 microns to 400 microns).

In some embodiments, the substrate (e.g. cover of inner can, body of inner can, cover of outer can, body of outer can) comprises a metallic material (e.g. aluminum, aluminum alloy, copper, copper alloy).

In some embodiments, the substrate (e.g. cover of inner can, body of inner can, cover of outer can, body of outer can) comprises aluminum and/or an aluminum alloy. Some non-limiting examples of aluminum alloys for the substrate include: 1XXX series aluminum alloys (e.g. 1100); 3XXX series aluminum alloys (e.g. 3003, 3104, 3150); 5XXX series aluminum alloys (e.g. 5182); and combinations thereof.

In some embodiments, the cover is electrically isolated/insulated from the body of the can.

In some embodiments, the outer can (container) of the battery cell is sealed via at least one of: a double seam, a weld, a hem, a seal, and/or combinations thereof.

In some embodiments, the protection apparatus is configured to electrically disconnect (disconnect device) upon the contents of the inner can reaching a predetermined threshold pressure.

In some embodiments, the energy storage assembly is configured of components with sufficient stiffness and strength to undergo a crash event and protect the inner energy storage devices from an impact event (i.e. prevent the battery from experiencing any pressure or force due to an impact event).

In some embodiments, the energy storage apparatus is configured of components with sufficient stiffness and strength to undergo a crash event and protect the inner batteries from an impact event (e.g. absorb a large amount of force from the impact event, such that the resulting force placed upon one or more of the batteries is a fraction of that of the crash event).

In some embodiments, the apparatus is configured with high stiffness and strength materials to absorb energy upon a crash event and protect the energy storage devices which are retained inside (e.g. reduce, prevent, or eliminate impact force from reaching the individual batteries), while such configuration is sufficiently designed to provide an open volume (e.g. interstices) for thermal agent(s)/thermal management materials (where such thermal management materials are configured to reduce, prevent, and/or eliminate thermal events upon the battery cell (or individual battery components) reaching a predetermined threshold temperature (e.g. indicative of a thermal event).

One metric in crashworthiness is the amount of Energy Absorbed (EA), quantified as force per distance (e.g. kN×m).

Another metric in crashworthiness is the Mean Load (Pmean), the amount of energy absorbed per length of deformation (or crush), quantified as EA/length of deformation (or crush) needed to absorb it (measured in kN).

In some embodiments, the apparatus is configured to comprise a mean load of at least 50 kN to not greater than 300 kN. In some embodiments, the apparatus is configured to comprise a mean load of at least 90 kN to not greater than 200 kN.

In some embodiments, the apparatus comprises a mean load of: at least 50 kN; at least 100 kN; at least 150 kN; at least 200 kN; at least 250 kN; or at least 300 kN. In some embodiments, the apparatus comprises a mean load of: not greater than 50 kN; not greater than 100 kN; not greater than 150 kN; not greater than 200 kN; not greater than 250 kN; or not greater than 300 kN.

In some embodiments, the protection apparatus is configured to maximize energy density while promoting a threshold mean load (e.g. in the event of an impact event/crash).

As used herein, "energy density" refers to an amount of energy (e.g. useful, extractable energy) stored in a given energy system (or region of space) per unit volume of the energy system.

In some embodiments, the energy storage apparatus is configured to/sufficiently designed to maximize energy density, such that the protection apparatus is configured to promote protection from impact events and/or thermal events while minimizing the total volume/space that the battery cell takes up.

In some embodiments, the energy storage apparatus is configured to be utilized in a laptop.

In some embodiments, the energy storage apparatus is configured to be utilized in a cell phone.

In some embodiments, the energy storage apparatus is configured to be utilized in a portable electronic device.

In some embodiments, the energy storage apparatus is configured to be utilized in a plug-in hybrid vehicle (PHEV).

In some embodiments, the energy storage apparatus is configured to be utilized in a battery electric vehicle (BEV).

In some embodiments, the energy storage apparatus is configured to be utilized in a Hybrid Electric Vehicle (HEV).

In some embodiments, the energy storage apparatus is configured to be utilized in a grid storage system for storing power in a power storage configuration.

In some embodiments, the energy storage apparatus is configured to be utilized in a lead acid replacement mode.

In some embodiments, the energy storage apparatus is configured to be used in: automobile starters, portable consumer devices, light vehicles (such as motorized wheelchairs, golf carts, electric bicycles, and electric forklifts), tools, and uninterruptible power supplies.

Non-limiting examples of applications in which the protection apparatus (e.g. housings) is utilized include lithium ion batteries (e.g. rechargeable Li-ion batteries) in areas including: electric vehicles, hybrid vehicles, automotive devices/products (e.g. electric vehicles such as automobiles, buses, trucks, golf carts, pedelecs), industry, portable electronics (e.g. model aircraft, drones, flashlights), consumer electronics (e.g. computing devices, cell phones, tablets, laptops, e-cigarettes, cameras, camcorders, game consoles), telecommunication devices/products, construction and home improvement equipment (e.g. power tools, hand held devices, gardening devices, landscaping devices), medical equipment/devices (e.g. wheelchairs), aerospace equipment/devices, military applications/devices, and combinations thereof.

In some embodiments, the energy storage apparatus is configured to be utilized in a power grid storage system (e.g. to promote peak shaving applications).

In some embodiments, the energy storage device(s) is utilized in the instant battery assemblies comprise: cylindrical cells.

In some embodiments, the battery cell assembly utilizes commercially available sealed li-ion batteries. Non-limiting examples of such commercially available sealed batteries include: cylindrical and/or prismatic batteries including 18650 and 183765. Without wishing to be bound by any manufacturer or vendor, some commercially available lithium-ion batteries are available through one or more entities including, but not limited to: Panasonic, Sony, Sanyo, ATL, JCI, Boston-Power, SDI, LG Chemical, SK, BAK, BYD, Lishen, Coslight and others.

In some embodiments, the battery cell assembly (e.g. cylindrical and/or prismatic) is configured for a capacity of from 1 Ah to 7 Ah.

In some embodiments, the battery cell assembly (e.g. prismatic and/or polymer) is configured for a capacity of from 15 Ah to 100 Ah, or even up to about 150 Ah.

In some embodiments, the battery cell assemblies are configured to promote a high energy density (e.g. configured to promote a longer run time, and/or to reduce cost per kWh of the non-active materials that are components of the battery assembly and/or battery cell(s)).

In some embodiments, the battery assembly is configured with wiring to electrically communicate the battery assembly(ies) with the each other and/or with the product form.

In some embodiments, the battery assembly is configured with wiring to electrically communicate the battery assembly with battery management system electronics, fastening structures, and/or cooling systems.

Various ones of the inventive aspects noted herein above may be combined to yield protection apparatuses, battery packs including protection apparatuses, and methods of making and using the same in conjunction with various product forms/devices which employ battery packs (e.g. lithium-ion battery packs).

These and other aspects, advantages, and novel features of the invention are set forth in part in the description that follows and will become apparent to those skilled in the art upon examination of the following description and figures, or may be learned by practicing the invention.

BRIEF DESCRIPTION OF THE DRAWINGS

As shown in FIG. 1, a product form/device 10 includes an energy storage device 100 configured to provide power (e.g. electric current) to the product/form device 10 via electrical wiring/contacts 12. The energy storage assembly 100 is configured to fit on or in the product form/device 10. The energy storage device 100 is configured to electrically connect/communicate with the product form/device 10 (or other energy storage assemblies within the product form/device 10) via electrical wiring. As shown in FIG. 1, the energy storage device 100 is configured with a housing 116 which retains a plurality of individual energy storage devices 102 (e.g. battery, cell, li-ion member) and corresponding electrical connections (e.g. electrical contacts/tabs form the energy storage devices, terminals, buswork, fuses, and the like). In some embodiments, the protection device 200 is configured as at least one of: the current interrupt device 210 and/or the vent 220).

As shown in FIG. 10, the support 120 is configured as a series of slats/vertical walls that have an intersecting/interconnected configuration.

FIG. 20 depicts an exploded view of an embodiment of an energy storage assembly, in accordance with the instant disclosure.

FIG. 21A, FIG. 21B and FIG. 21C depicts various embodiments for a score pattern that can be utilized in a vent panel/vent component, in accordance with the instant disclosure. In evaluating the configuration of score shape as further detailed in Example 9, three shapes were evaluated: a y-shaped score (FIG. 21B), a line score (FIG. 21A), and a circumferential score (FIG. 21C).

FIG. 22 depicts a top view of an embodiment of a vent having a score with a circumferential pattern with a countersink and a buckling initiator, in accordance with the instant disclosure.

FIG. 23 depicts a top view of an embodiment of a vent having a score with an x-shaped pattern with a countersink and a buckling initiator (e.g. positioned in the intersecting "x" of the score line), in accordance with the instant disclosure.

FIG. 35 depicts a computer modeled cut-away perspective side view of an embodiment of a laser seam welded housing of the instant disclosure, the housing having 0.5 mm thick walls. Depicted in varying grayscale across the top of the housing, the relative displacement in the z direction (vertical direction) for a 0.5 mm thick aluminum alloy walled housing experiencing an internal pressurization of 3 PSI (e.g. operating pressure).

Referring to FIG. 48, the pressurization event in an embodiment of the energy storage device is depicted at different (increasing) pressures. FIG. 48 (1)-(4) are depicted as events on the plot depicting displacement (in inches) of the centerlines of the dome actuator and vent as a function of pressure (psi). As depicted in FIG. 48 (1), both the dome and the vent device have moved slightly. As depicted in FIG. 48 (2), both the dome and the vent device have moved to a greater extent. As depicted in FIG. 48 (3), the dome has reversed/actuated and the vent device has moved to a greater extent. As depicted in FIG. 48 (4), the dome (in reversed/actuated position) has moved again and the vent device has opened.

FIG. 55 depicts a parametric rendering of an embodiment of a dome actuator (component of the current interrupt device) in conjunction with the Examples section, in accordance with the instant disclosure.

FIG. 56 is a chart depicting the internal pressure as a function of displacement for a computer modeled dome displacement in the Examples section.

DETAILED DESCRIPTION

Figure 1:
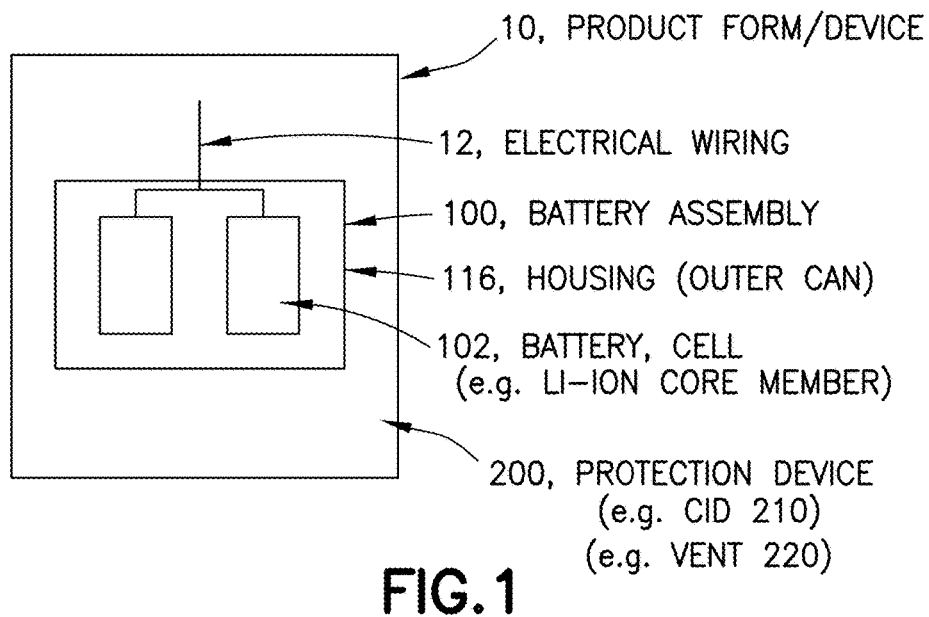
FIG. 1 depicts an embodiment of the instant disclosure in which a protection device is configured on an energy storage assembly (e.g. battery assembly) in accordance with the instant disclosure.
Figure 2:
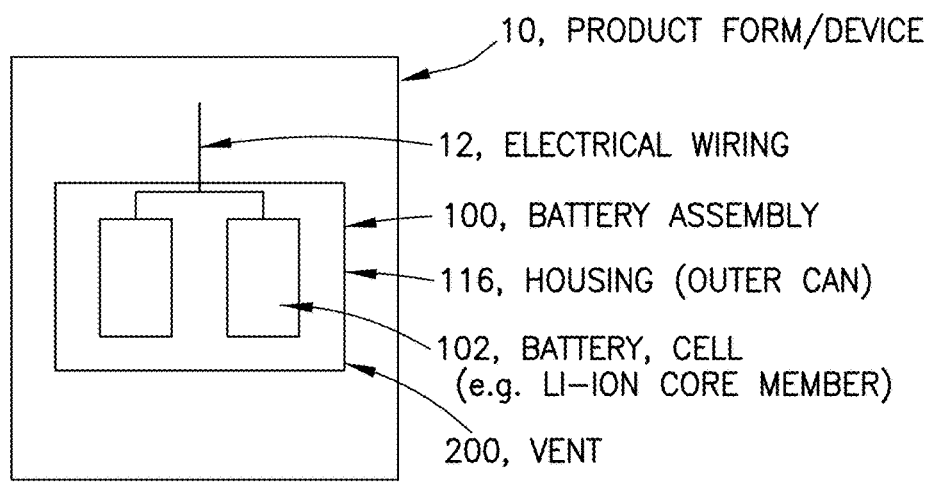
FIG. 2 depicts an alternative embodiment to FIG. 1, in which the components are similarly configured and corresponding, but the protection device comprises a vent/vent device 220.
Figure 3:
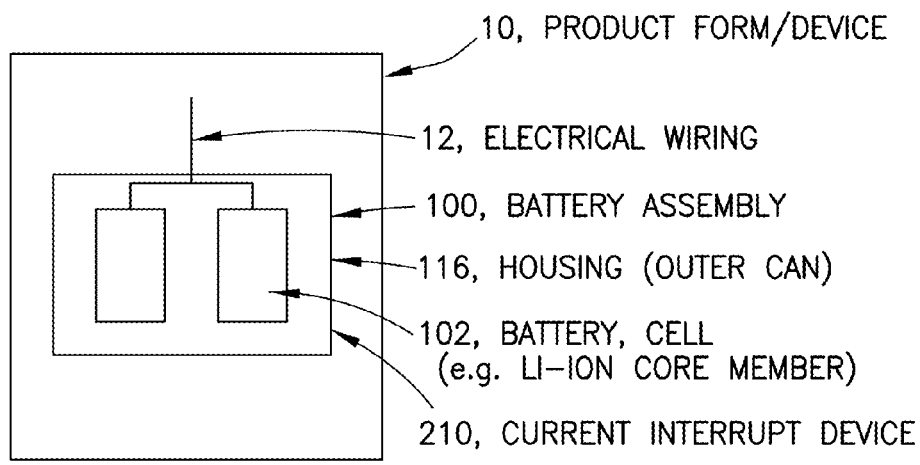
FIG. 3 depicts an alternative embodiment to FIG. 1, in which the components are similarly configured and corresponding, but the protection device comprises a current interrupt device vent/vent device 210.
Figure 4:
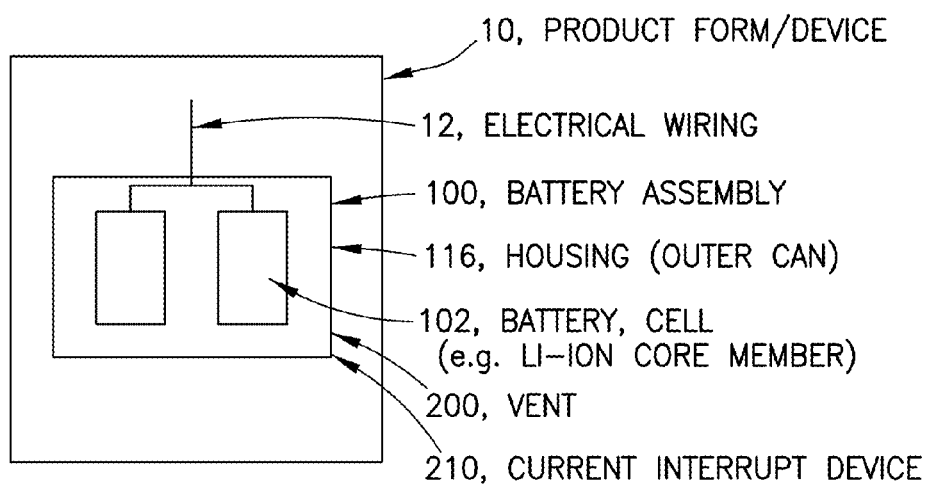
FIG. 4 depicts an alternative embodiment to FIG. 1, in which the components are similarly configured and corresponding, but the protection device comprises a current interrupt device vent/vent device 210 and a vent device 220, in accordance with the instant disclosure.
Figure 5:
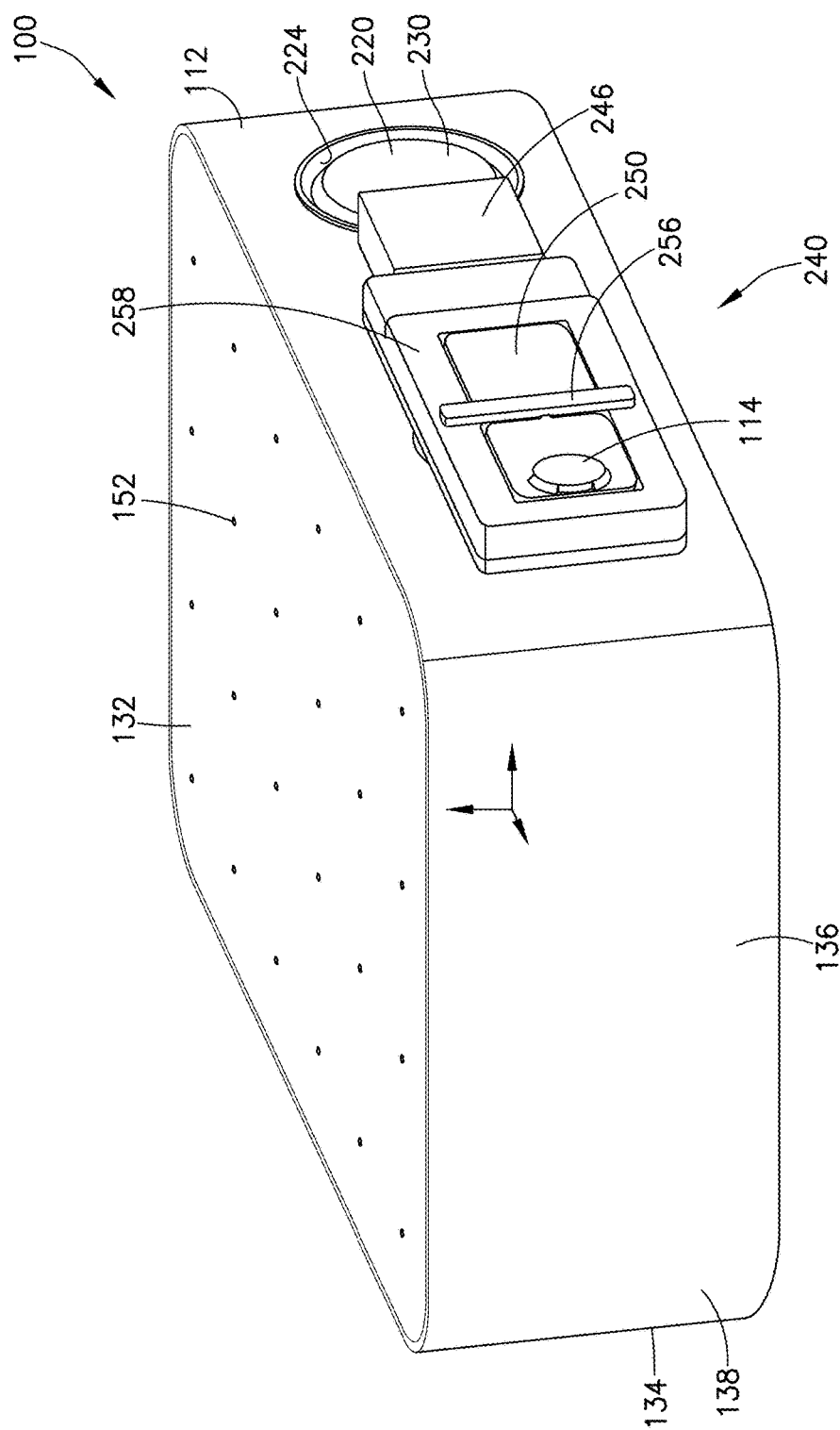
FIG. 5 depicts a perspective side view of an embodiment of the energy storage device in accordance with the instant disclosure.
Figure 6:
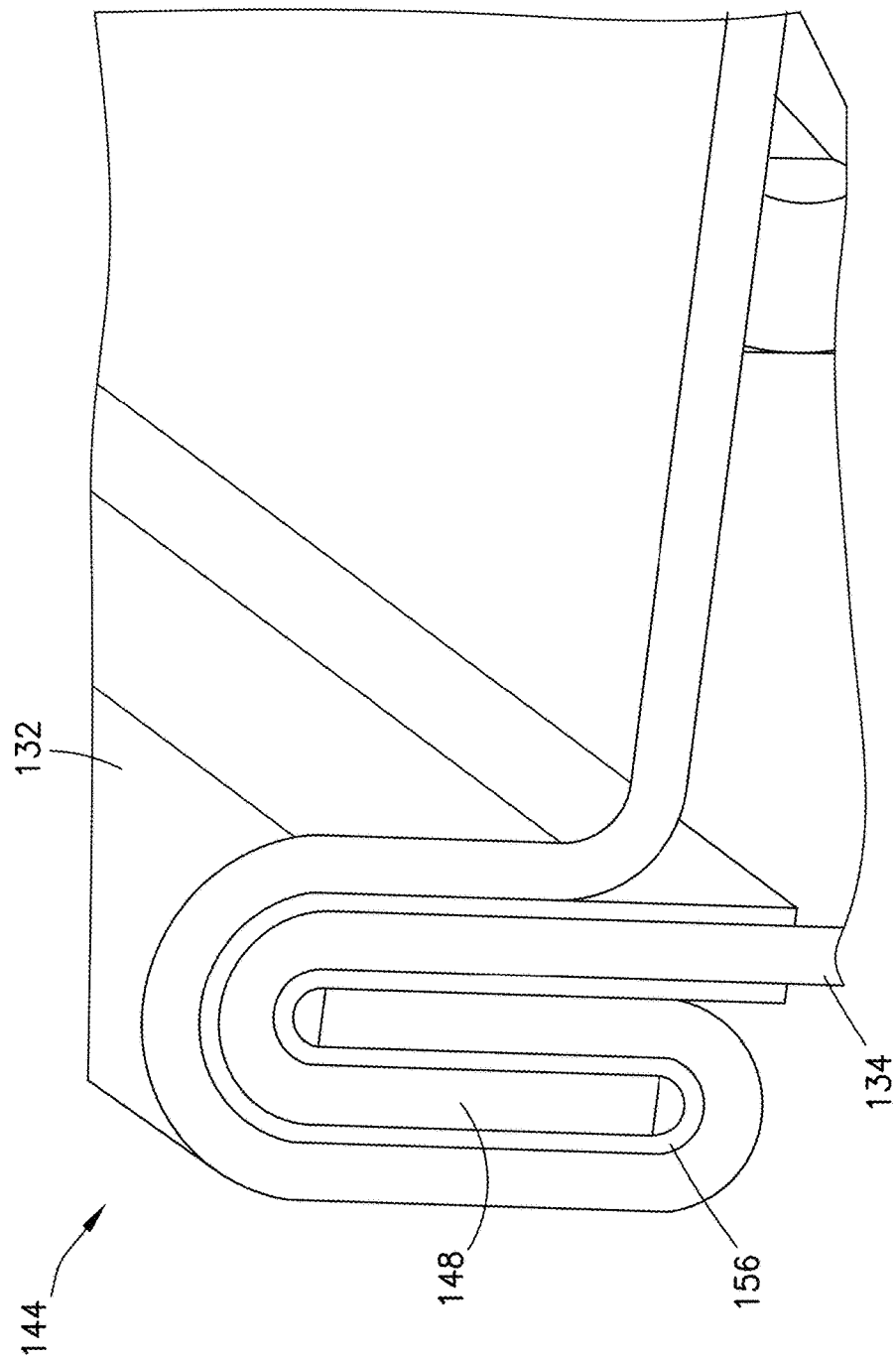
FIG. 6 depicts an alternative embodiment of the energy storage device of the instant disclosure, in which the housing lid/cover is attached to the housing body via a forming operation (e.g. double seam depicted).
Figure 7:
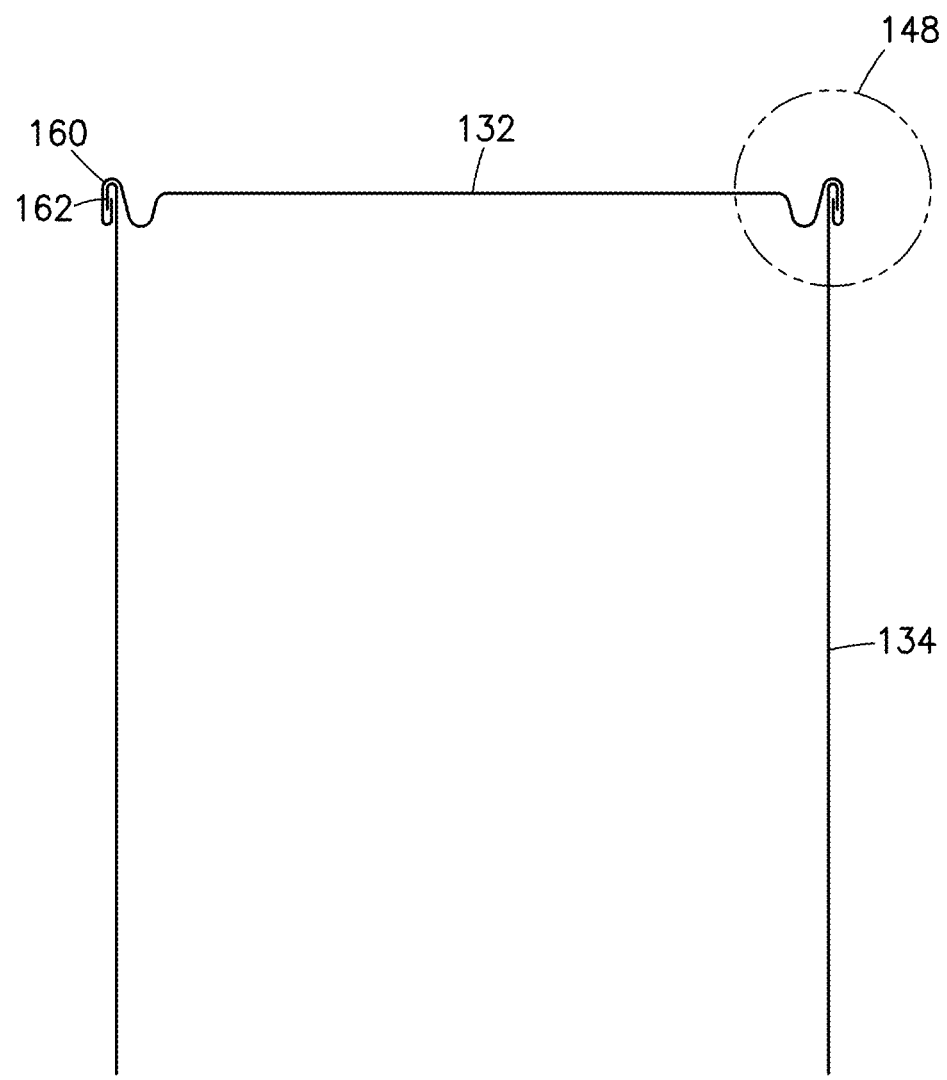
FIG. 7 depicts an alternative embodiment of the energy storage device of the instant disclosure, in which the housing lid/cover is attached to the housing body via a double seam.
Figure 8:
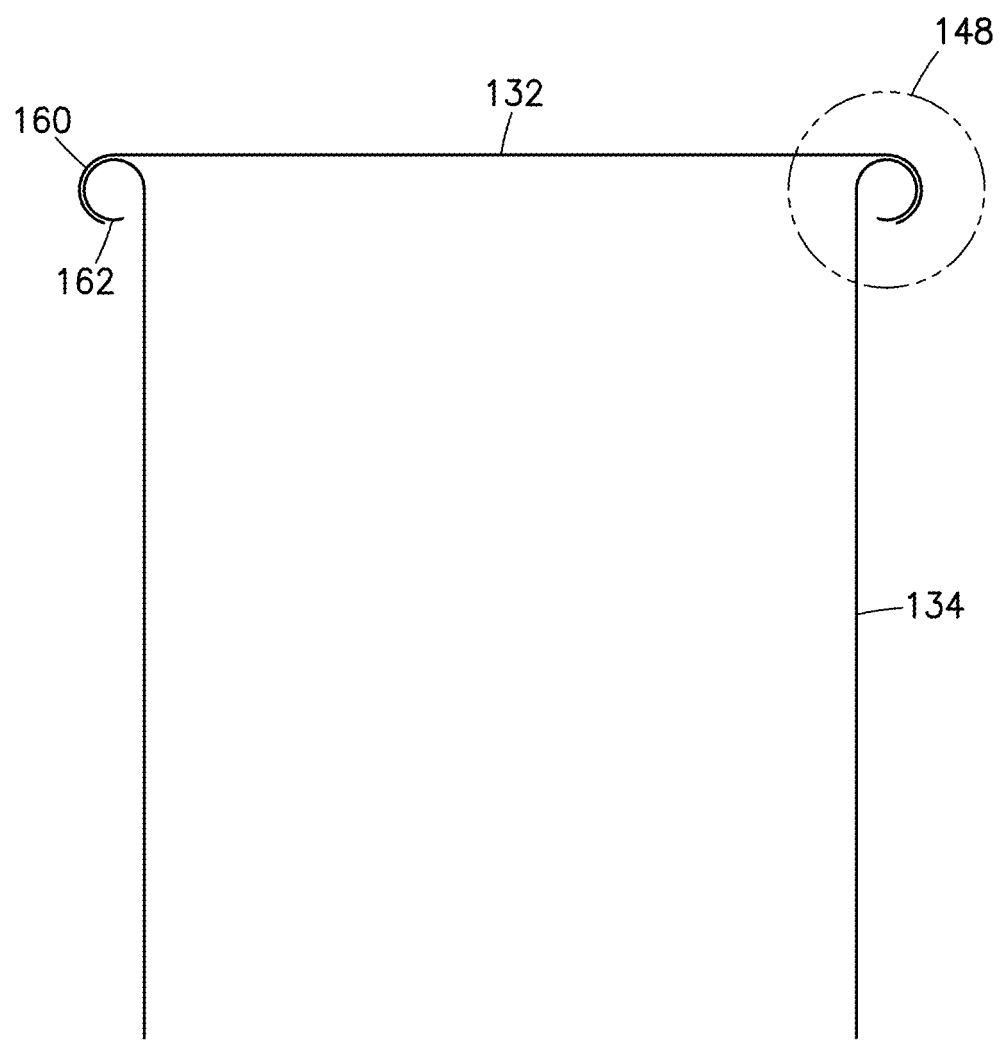
FIG. 8 depicts an alternative embodiment of the energy storage device of the instant disclosure, in which the housing lid/cover is attached to the housing body via a forming operation (e.g. mechanical attachment via a snap-on cap).
Figure 9:
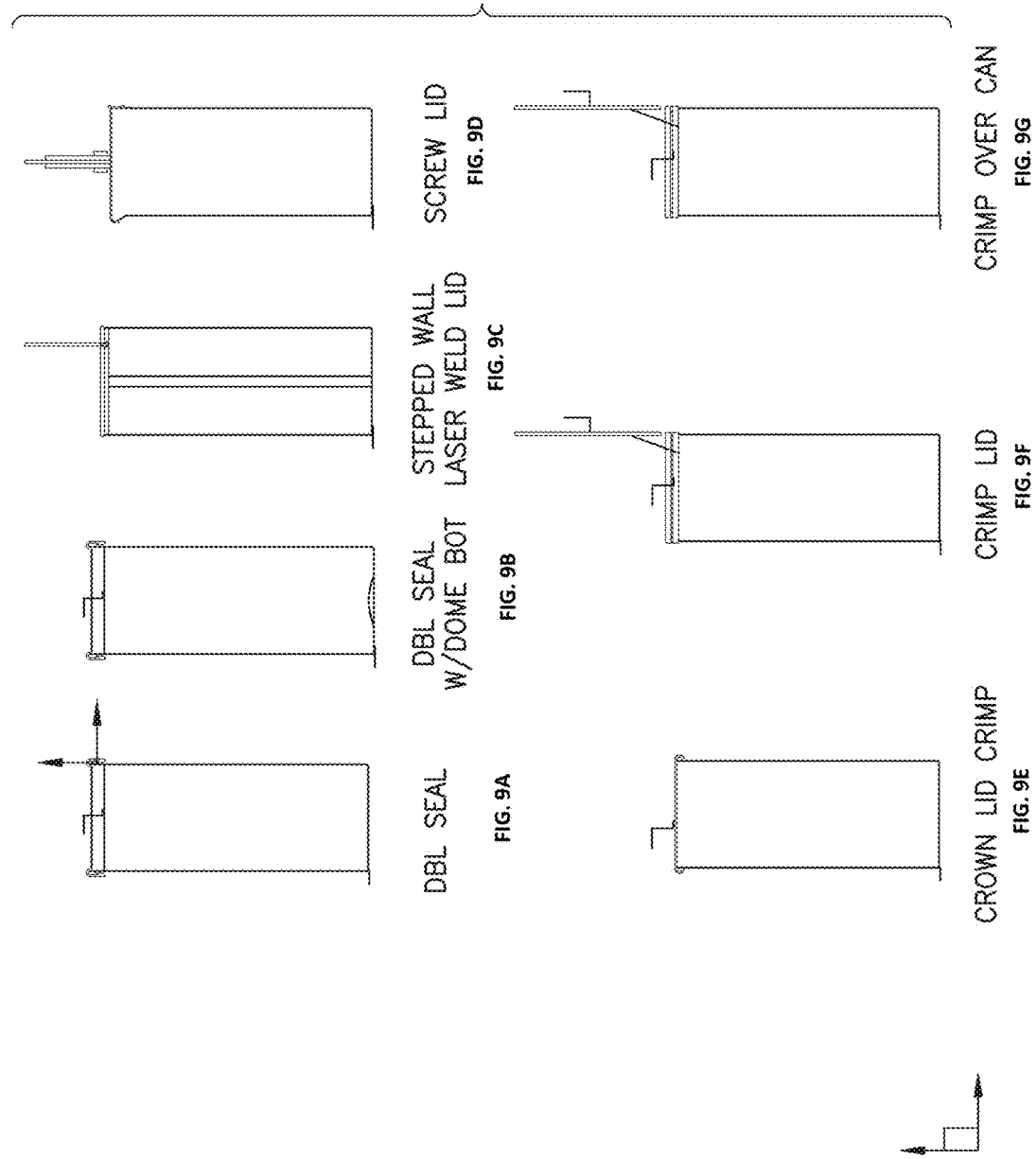
FIG. 9 A-G depict several alternative embodiments of enclosing/sealing configurations for the energy storage device housing in accordance with the instant disclosure. The various embodiments depicted in FIG. 9 (A-G) include: (A) a double seam (e.g. with a body having a generally planar bottom); (B) a double seam (with a body having a generally domed bottom, (C) a stepped wall laser welded lid (e.g. configured with a notch in the upper lip of the body to support the lid), (D) a screw lid (e.g. with pre-formed thread on body, interference fit, or threading created by mating seal arrangement via raised ridges or raised threads (on the lid or body) marrying to the corresponding inner sidewall of the other component (lid or body)); (E) a crown lid crimp; (F) a crimp lid (e.g. roll forming the lid over the body); or (G) a crimp over can (e.g. roll forming the body over the lid).
Figure 10:
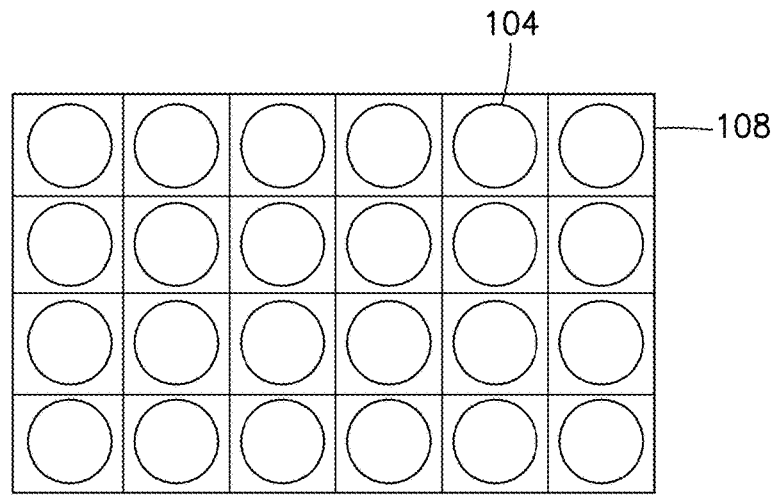
FIG. 10 depicts a top plan view of the cathode bus bar 108 having vias 164 through the cathode bus bar (e.g. sufficiently sized to fit/retain the lower regions of the energy storage devices in accordance with the instant disclosure. Also depicted is an alternative embodiment of a support 120 in accordance with the instant disclosure.
Figure 11:
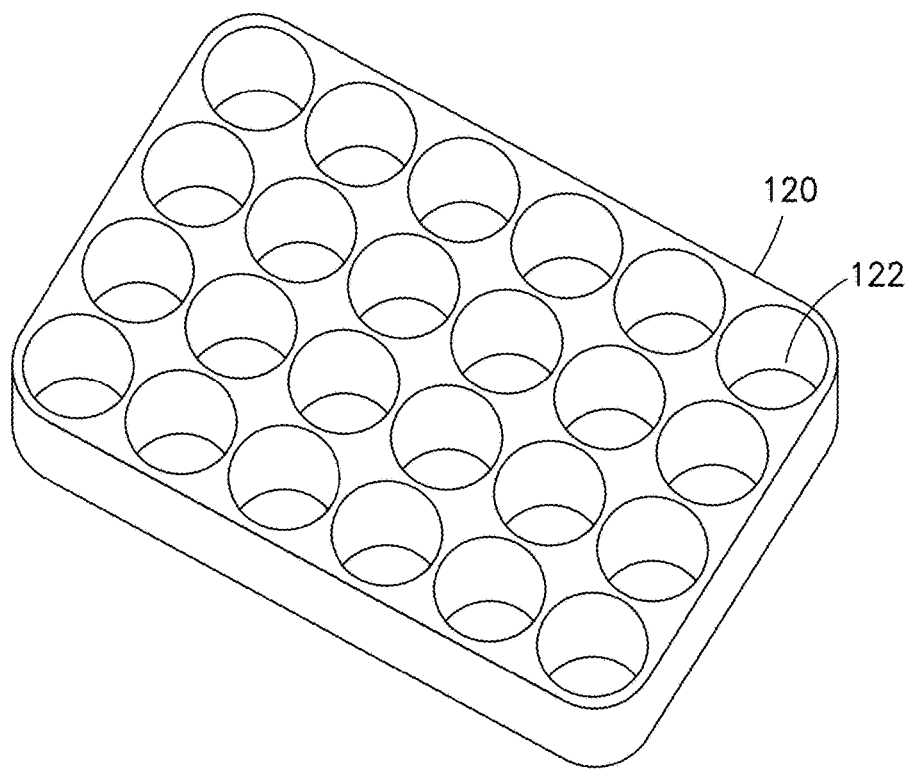
FIG. 11 depicts a perspective view of an embodiment of a support structure in accordance with the instant disclosure.
Figure 12:
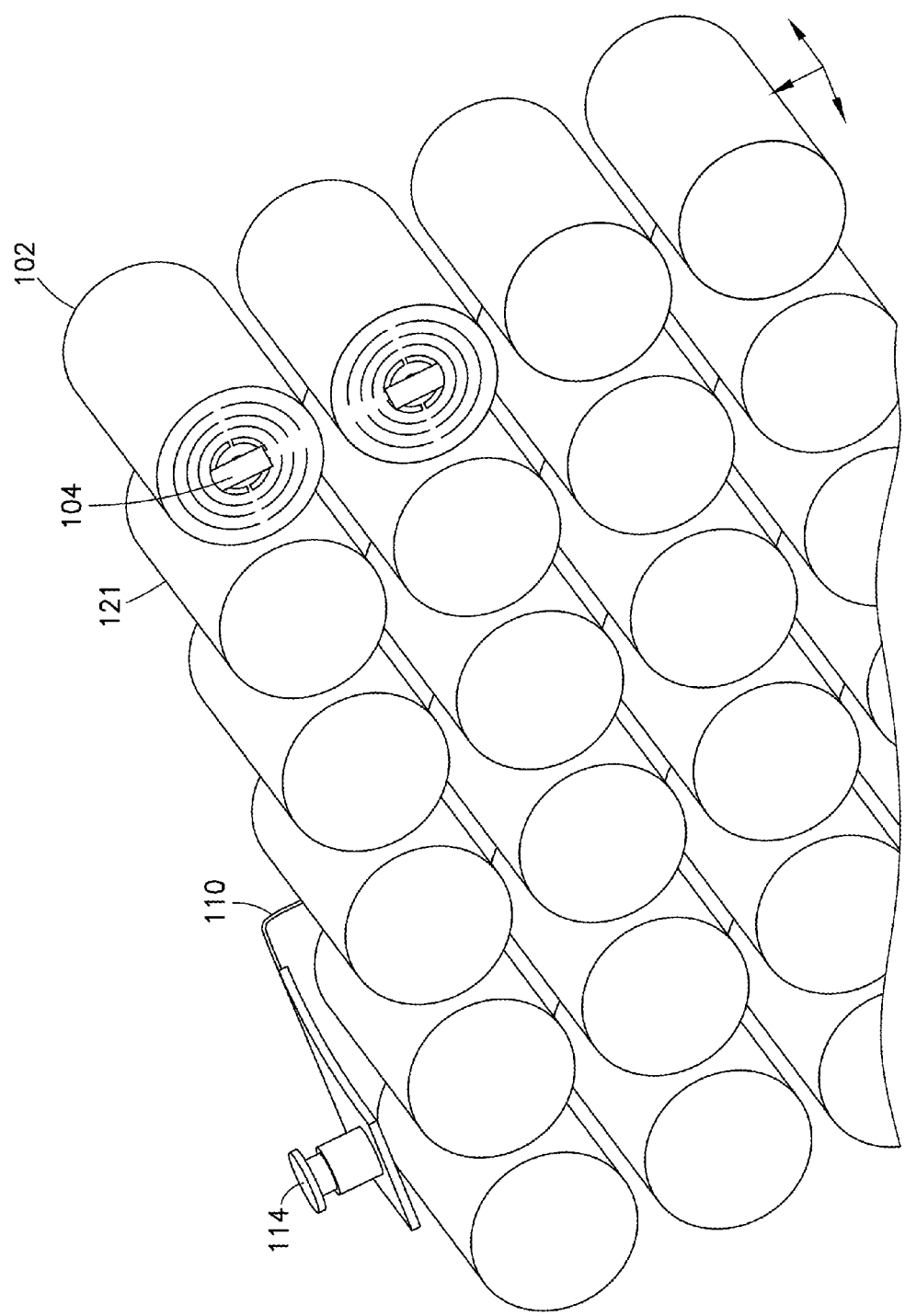
FIG. 12 depicts a partial cut away perspective view of an embodiment of an array of energy storage devices configured for attachment to the electrical wiring/connections/bus work of the energy storage assembly in accordance with the instant disclosure.
Figure 13:
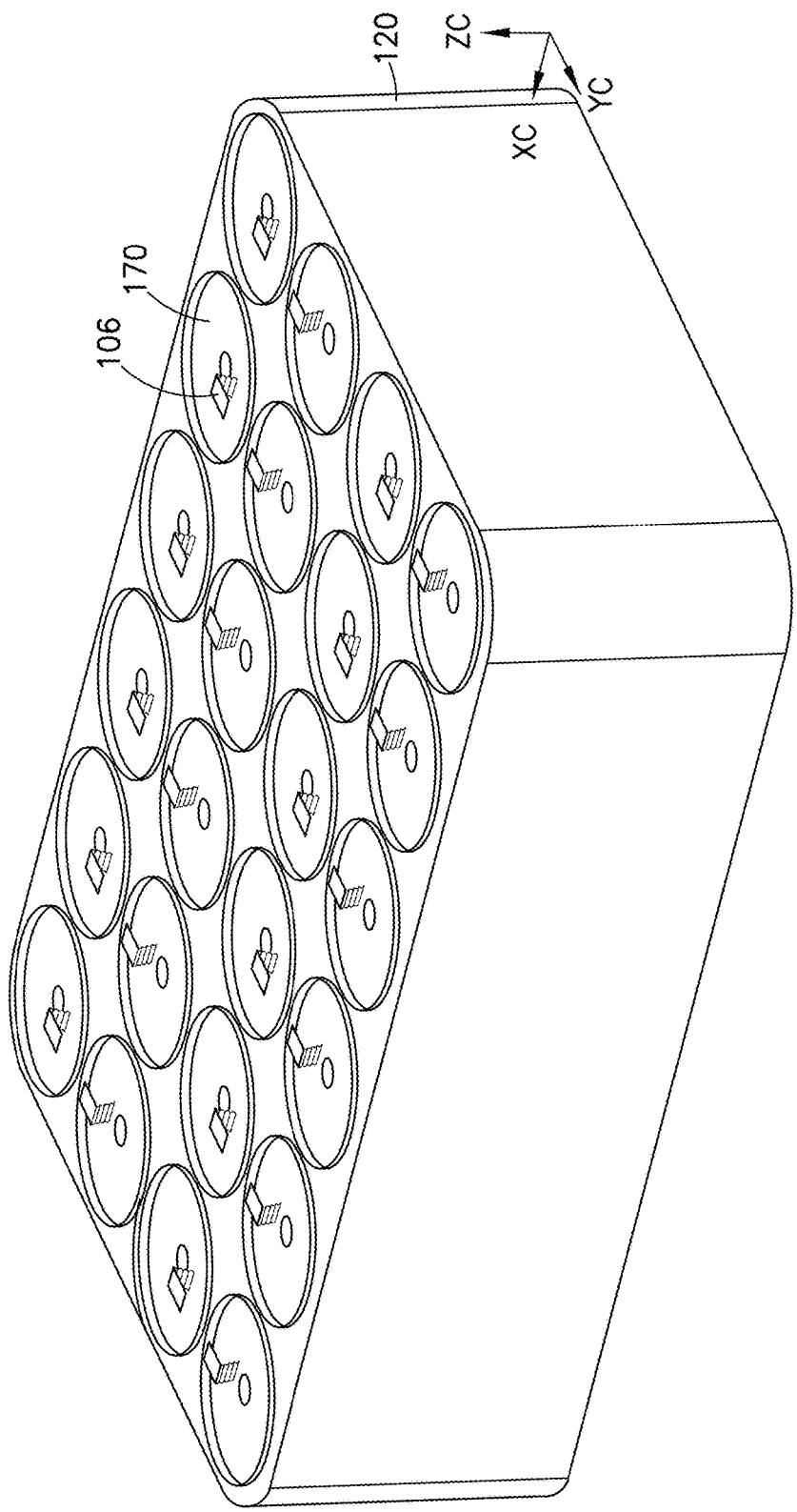
FIG. 13 depicts a perspective side view of an embodiment of an array of energy storage devices retained within a support, where the energy storage devices include electrical connection/conductive tabs and covers/caps, in accordance with the instant disclosure.
Figure 14:
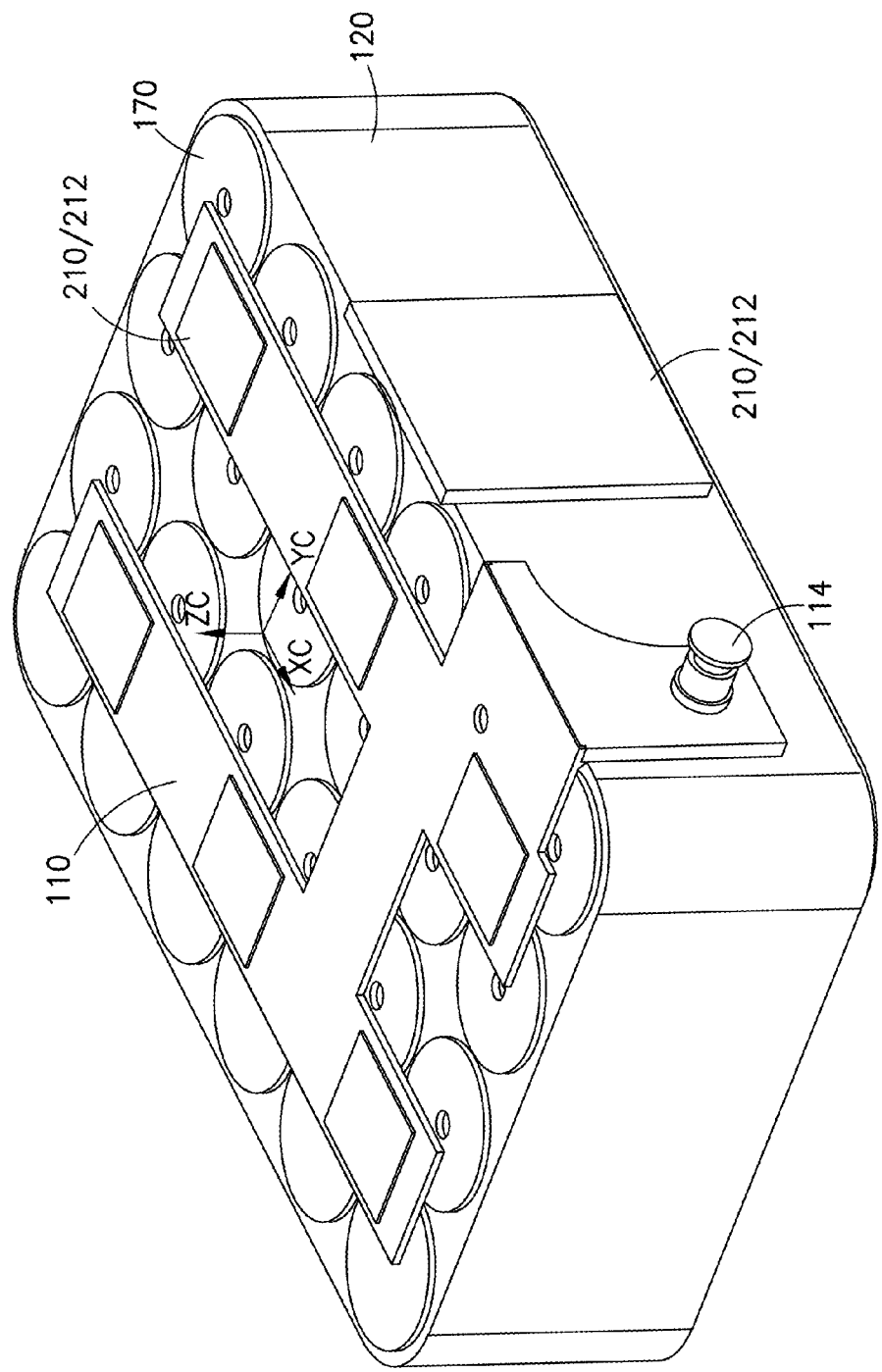
FIG. 14 depicts a perspective side view of an embodiment of an array of energy storage devices retained within a support, where the energy storage devices include covers/caps, a bus bar, and insulating sheets positioned along the support sidewall and the current collector bar/bus bar, in accordance with the instant disclosure.
Figure 15:
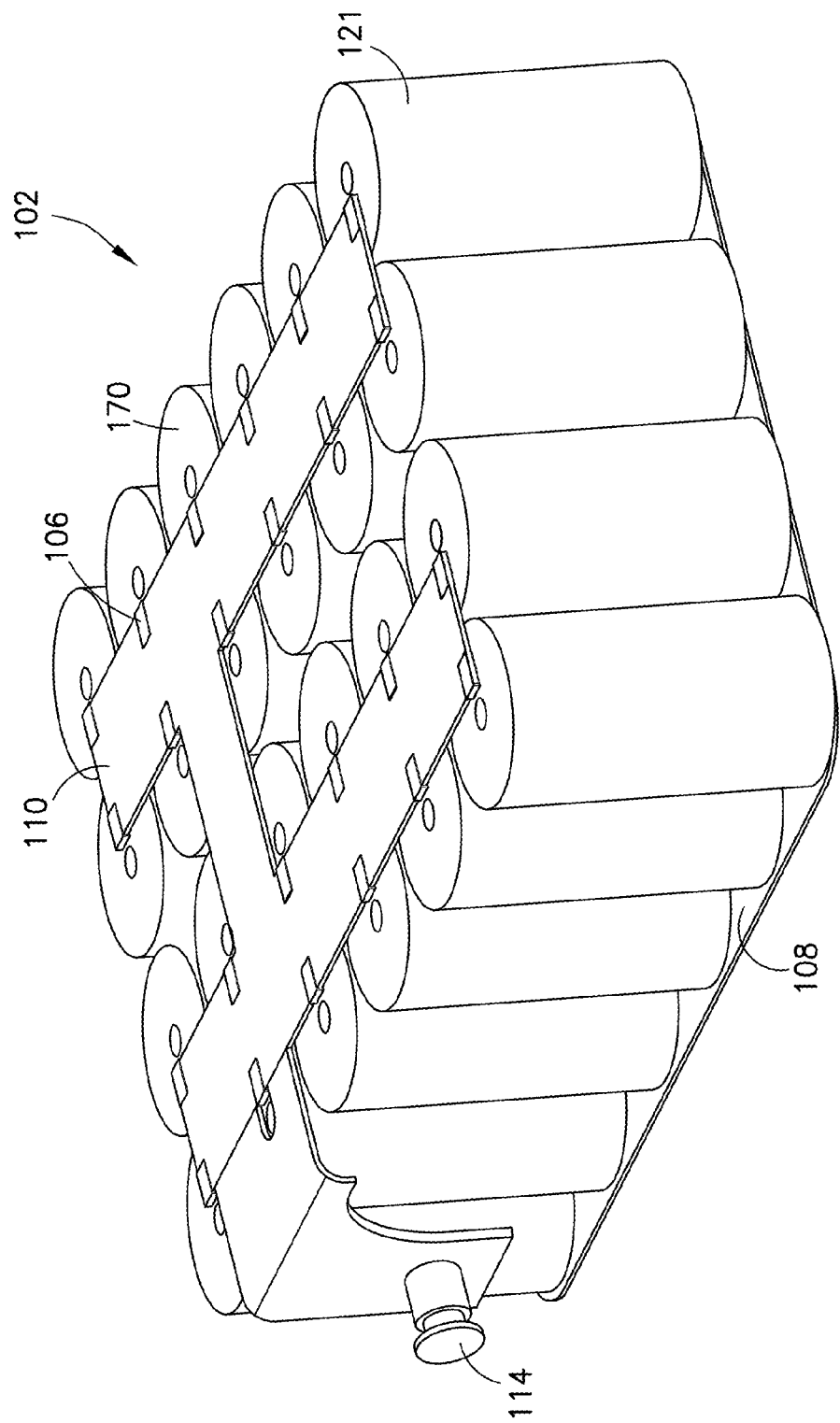
FIG. 15 depicts a perspective side view of an embodiment of an array of energy storage devices retained within a support, where the energy storage devices include conductive tabs, covers/caps, a bus bar, and a terminal configured in electrical contact with the bus bar in accordance with the instant disclosure.
Figure 16:
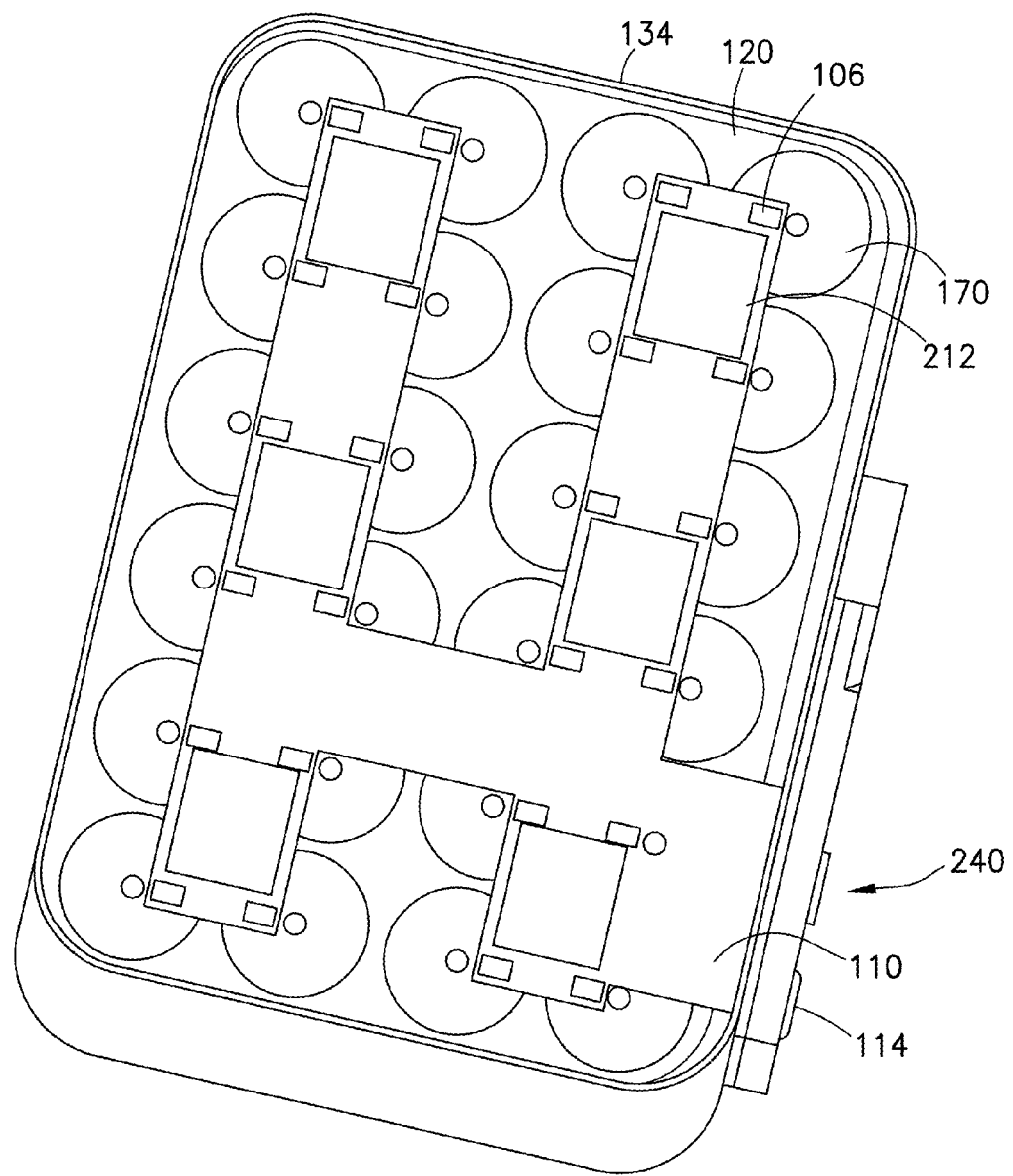
FIG. 16 depicts a top plan view of an embodiment of an array of energy storage devices retained within a support, where the energy storage devices include conductive tabs, covers/caps, a bus bar, insulating sheets on the bus bar, wherein the aforementioned components are retained within a housing, the housing configured with a current interrupt device and a terminal, in accordance with the instant disclosure.
Figure 17:
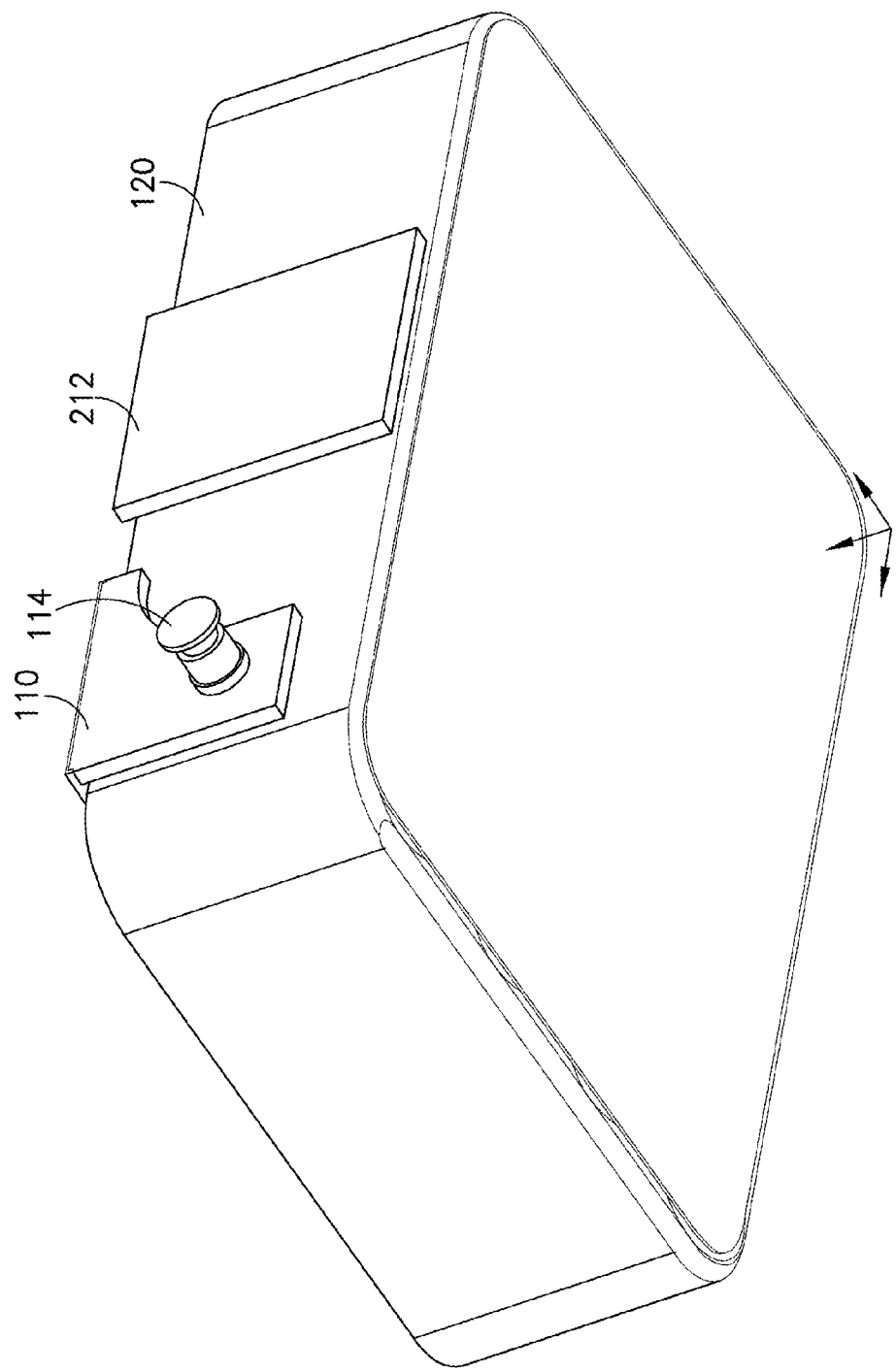
FIG. 17 depicts a perspective view of the embodiment of FIG. 16 (housing and current interrupt components removed), depicting the terminal contact configured on the support, adjacent to an insulating.
Figure 18:
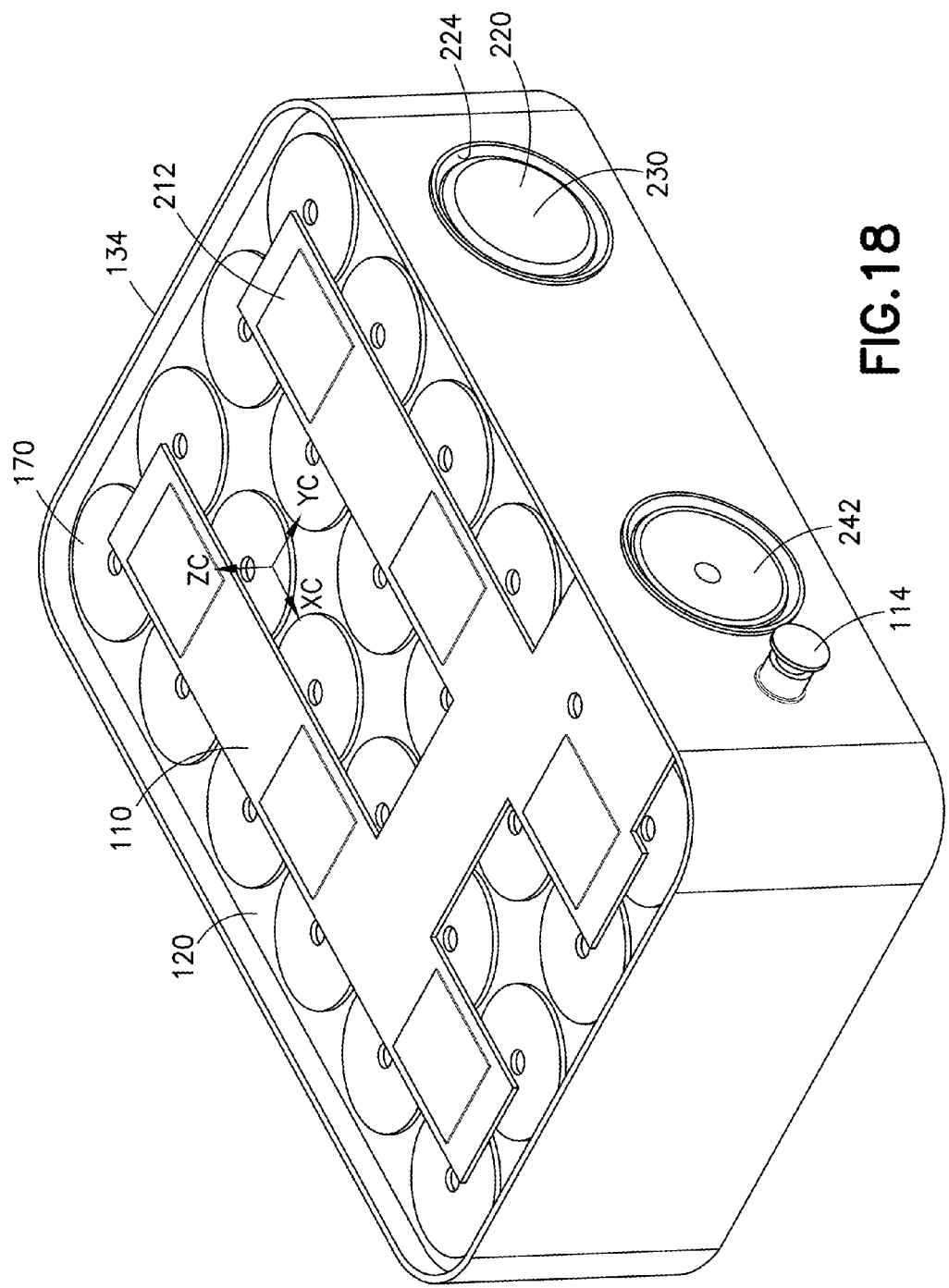
FIG. 18 depicts a perspective view of an embodiment of the instant disclosure in which a housing has configured on its sidewall a current interrupt device (dome actuator depicted) and a pressure vent/vent component, wherein the housing is configured to retain a plurality of energy storage devices configured in an array and positioned within a support, in accordance with the instant disclosure.
Figure 19:
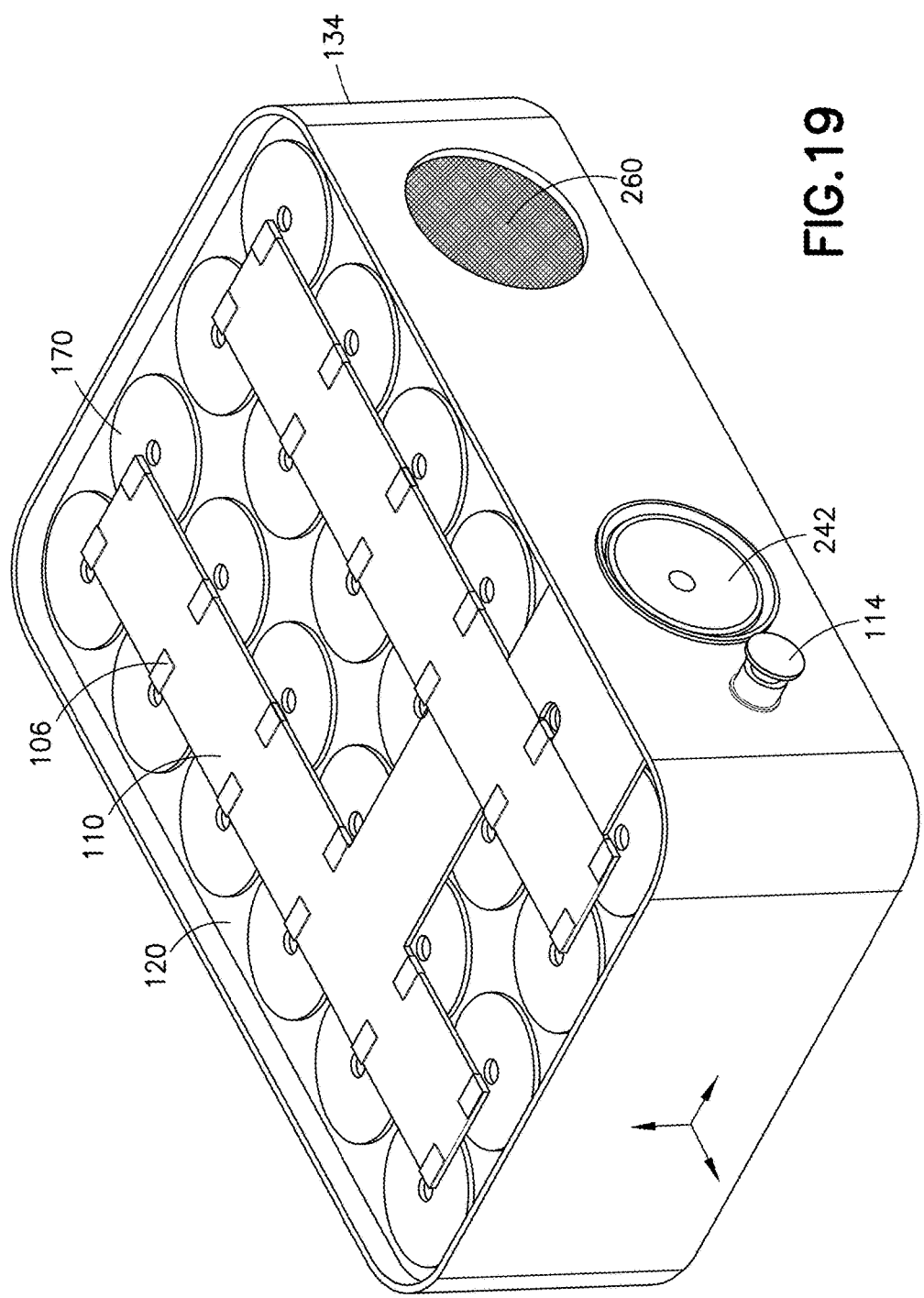
FIG. 19 depicts a similar view with corresponding components to FIG. 18, though it is noted that the energy storage devices correspond to unsealed individual lithium-ion core members with covers positioned over an upper end of the sleeve which is configured to retain each individual core member.
Figure 24:
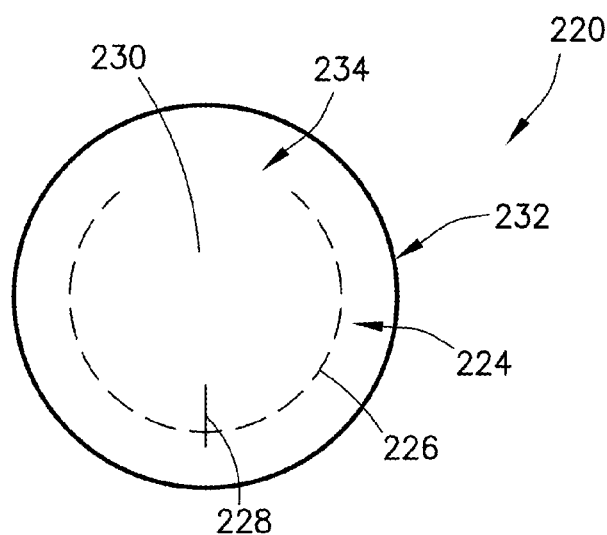
FIG. 24 depicts a top view of an embodiment of a vent having a score with a circumferential pattern and a hinge both positioned with a countersink and a buckling initiator, in accordance with the instant disclosure.
Figure 25:
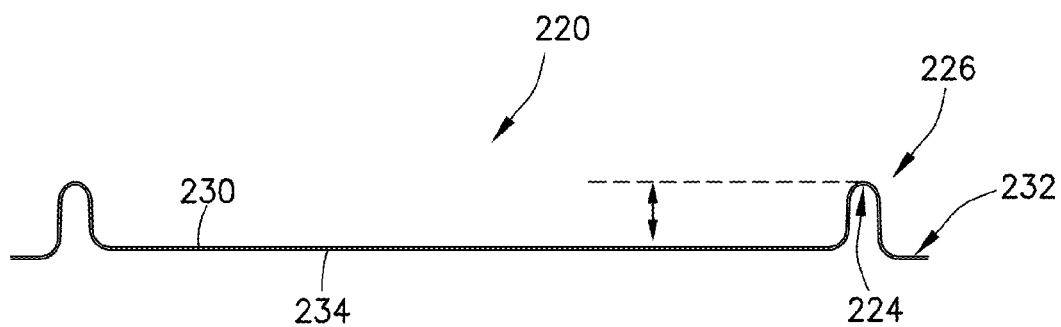
FIG. 25 depicts a side plan view of an embodiment of a vent device having a countersink in accordance with the instant disclosure.
Figure 26:
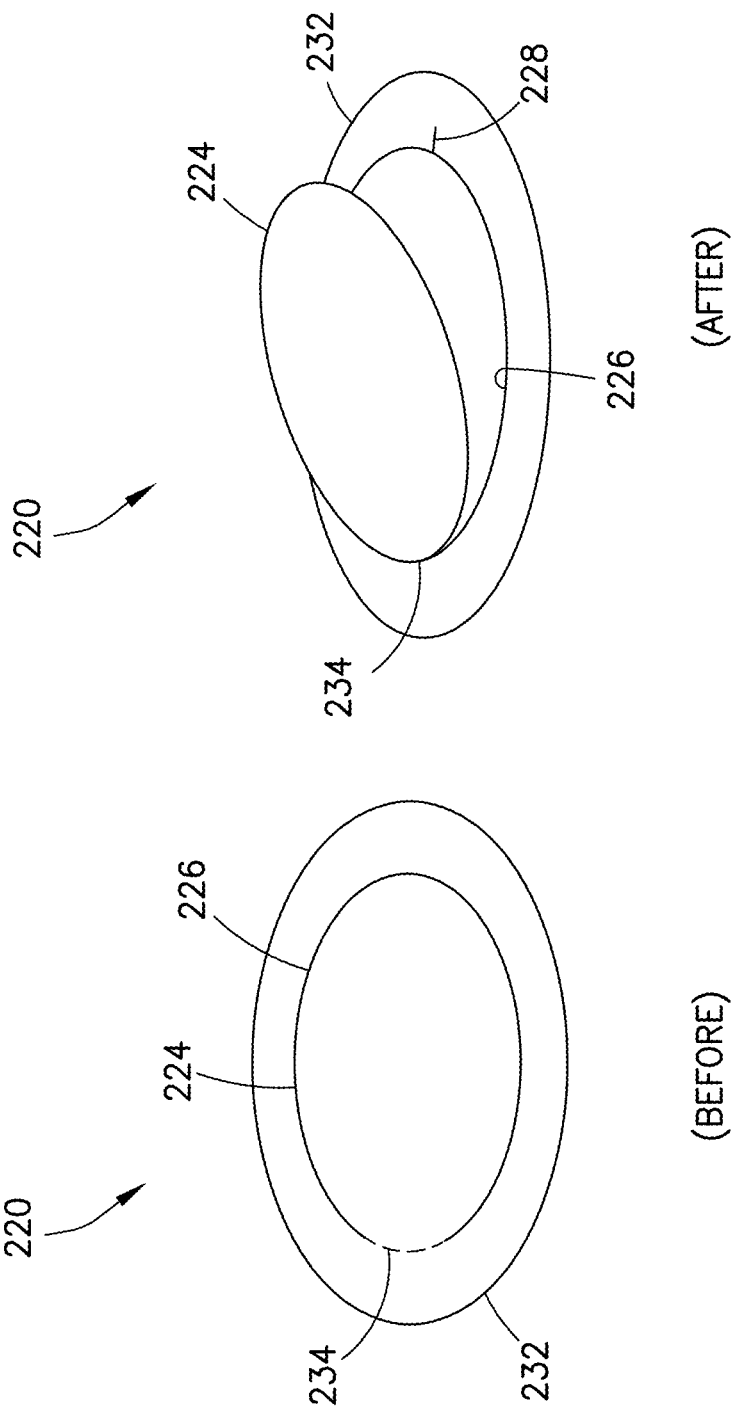
FIGS. 26A and 26B depict embodiment of the pressure vent in a before (26A) vs. after (26B), depicting the size of the resulting opening/vent, the extent of deformation, and the resulting hinge retaining the vent flap onto the vent device, in accordance with the instant disclosure.
Figure 27:
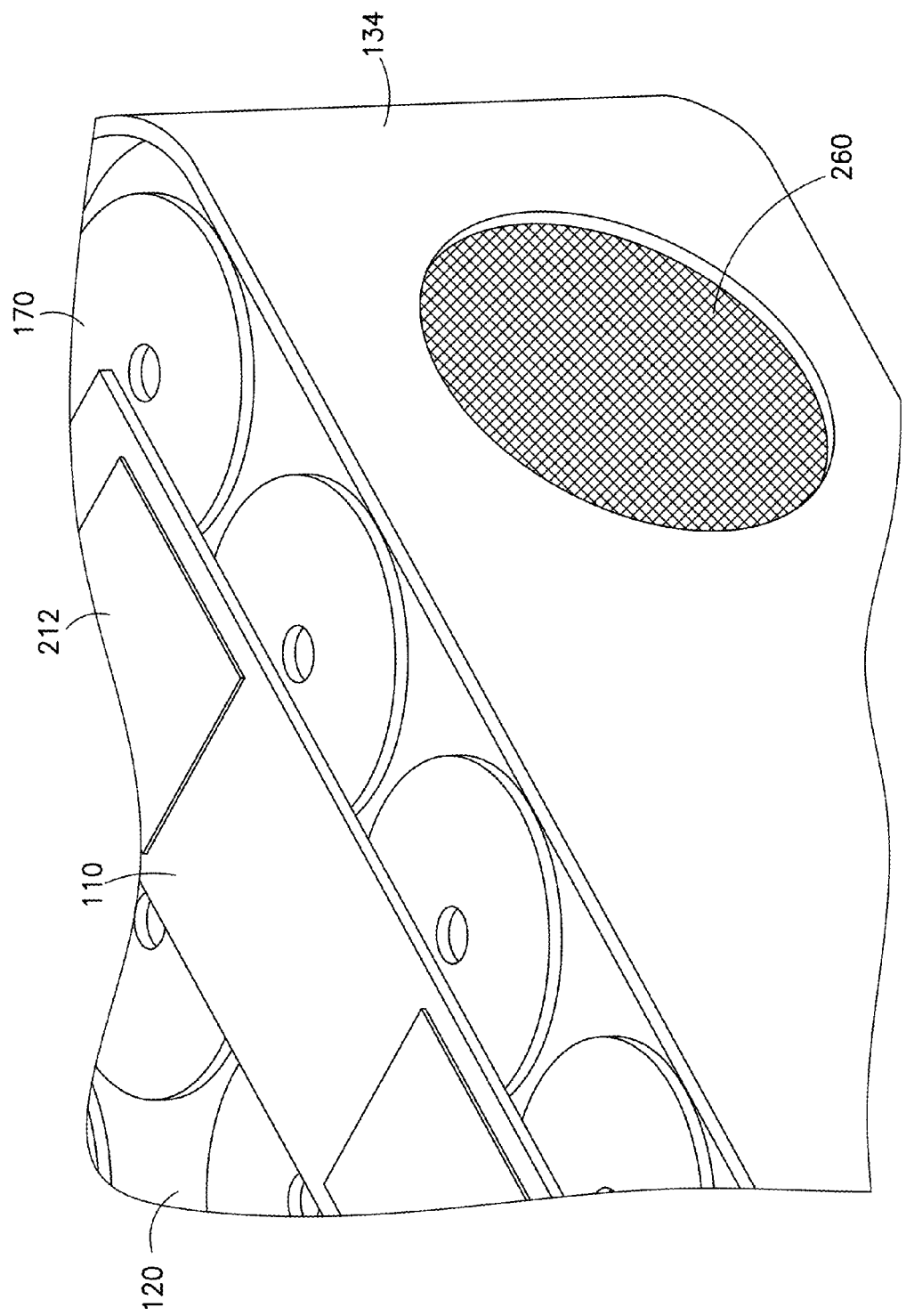
FIG. 27 depicts a partial-cut away perspective side view of an embodiment of the energy storage assembly, with a close-up view of an embodiment of the flame arrestor, in accordance with the instant disclosure.
Figure 28:
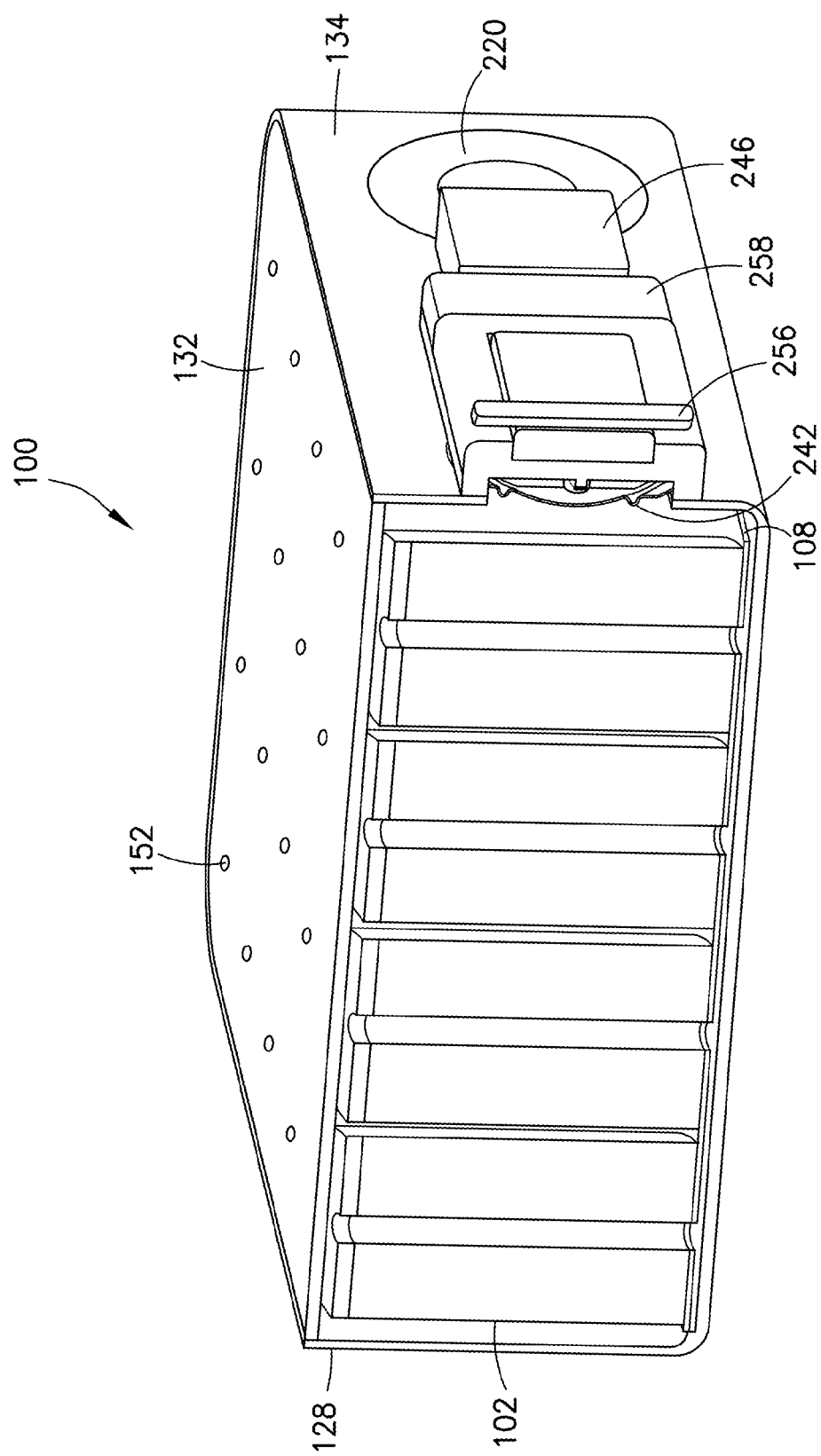
FIG. 28 depicts a cut away perspective view of an embodiment of an energy storage assembly, depicting a cut away side-view of the current interrupt device, in accordance with the instant disclosure.
Figure 29:
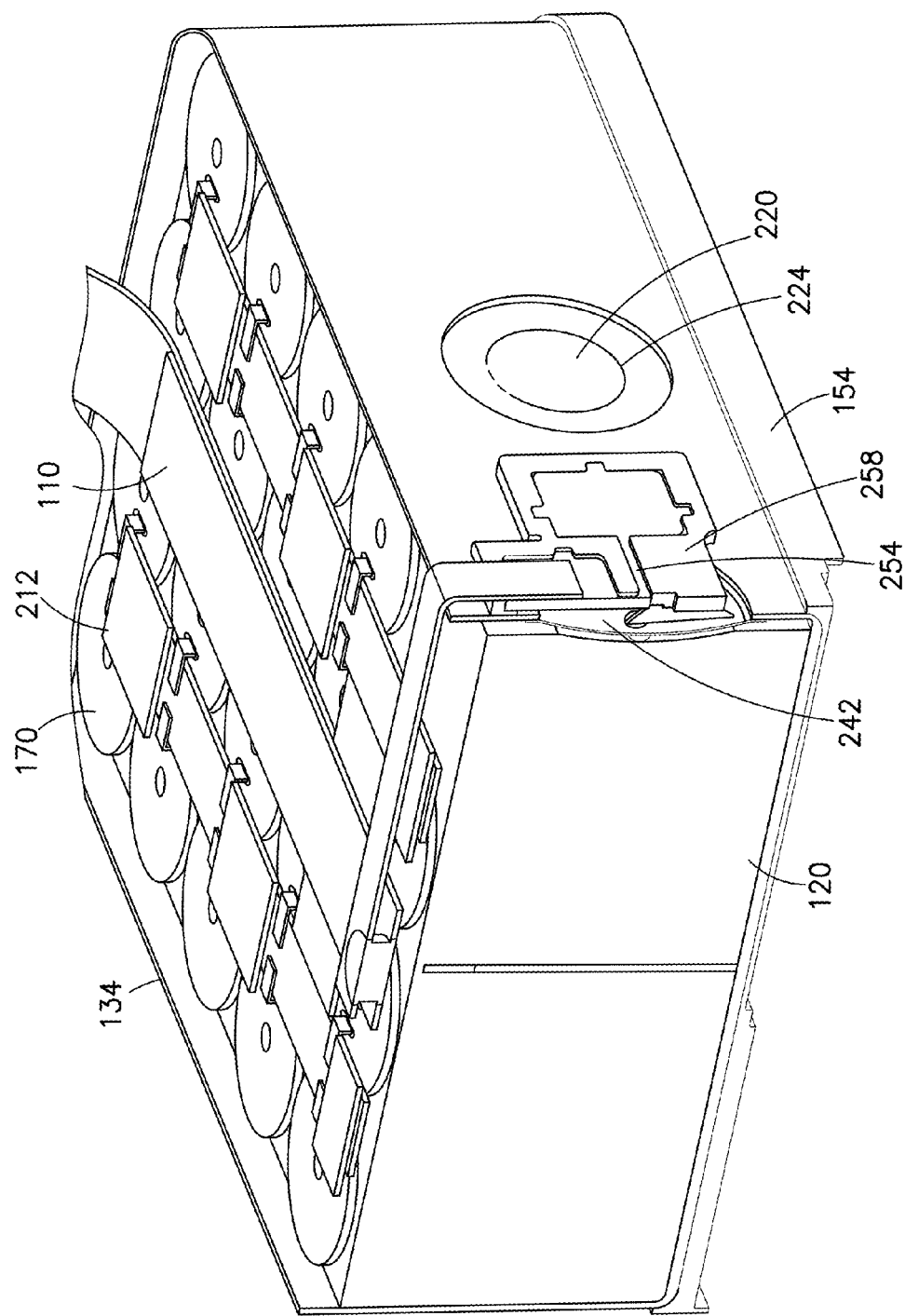
FIG. 29 depicts a cut away perspective view of an embodiment of an energy storage assembly, depicting a cut away side-view of the current interrupt device and the pressure vent, in accordance with the instant disclosure.
Figure 30:
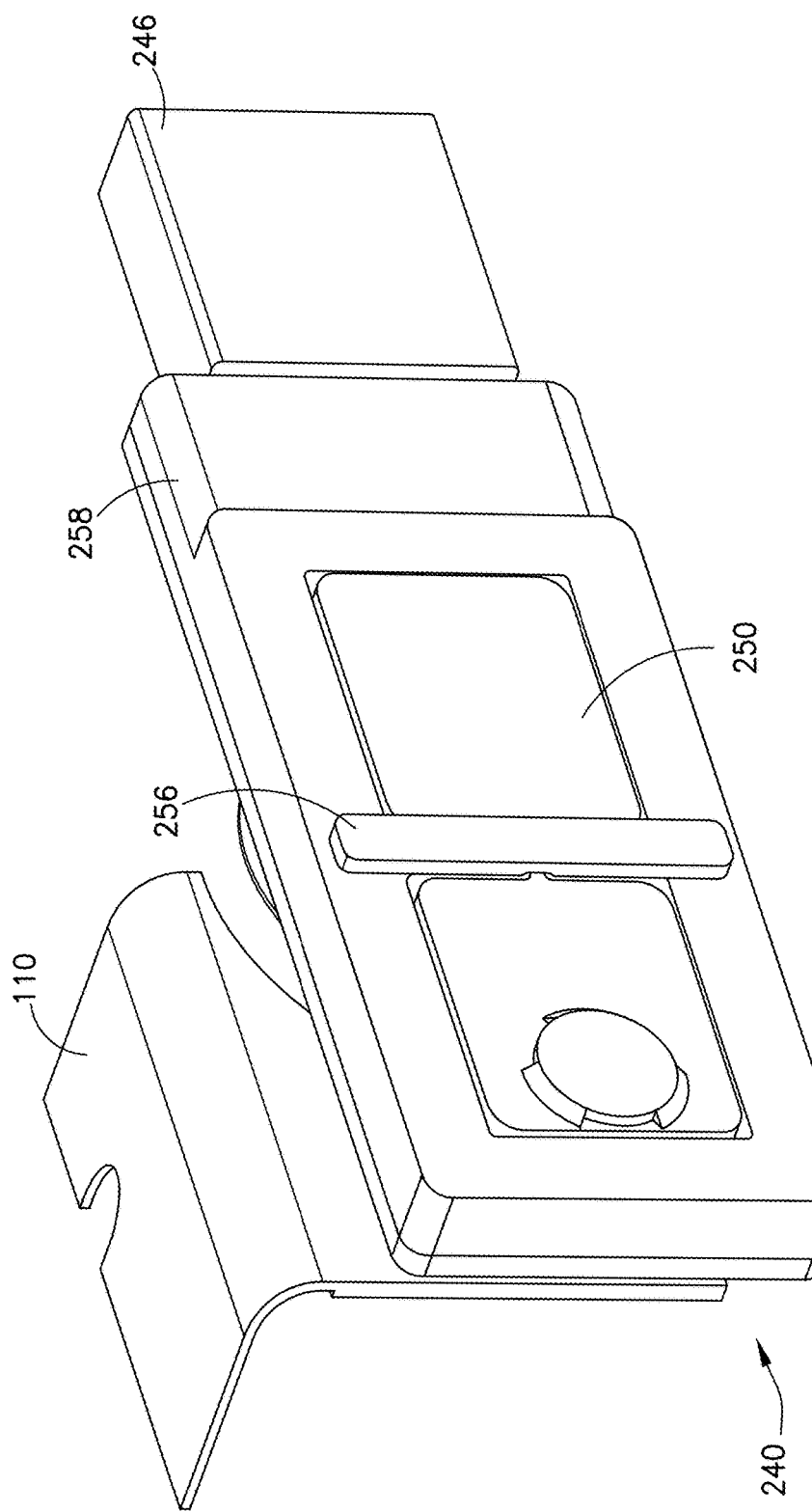
FIG. 30 depicts an embodiment of the current interrupt device depicting the "outside" view including the terminal, the insulating components, and their configuration, in accordance with the instant disclosure.
Figure 31:
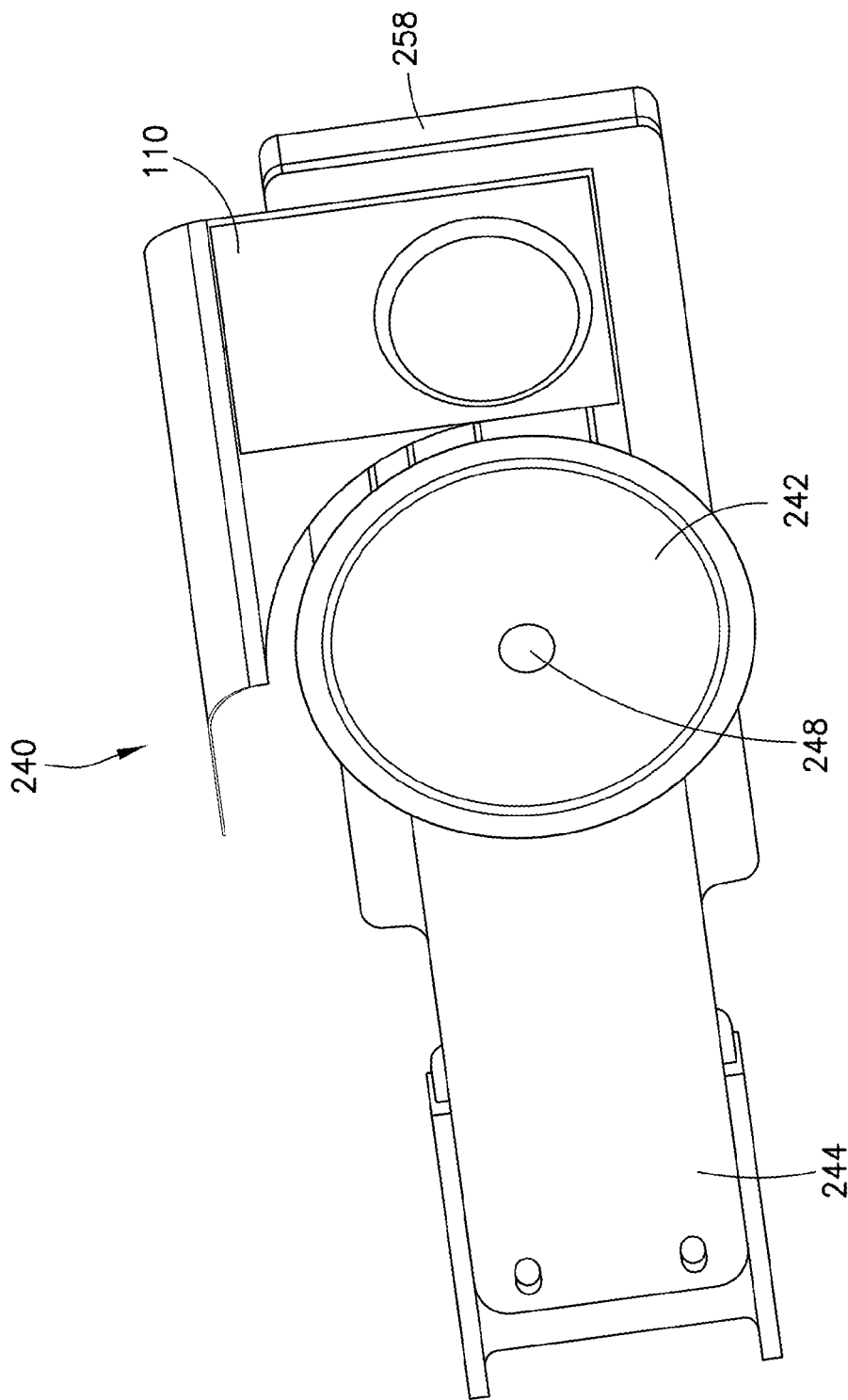
FIG. 31 depicts the embodiment of the current interrupt device in FIG. 30, depicting an "inside" view of the dome actuator, the terminal, the insulating components, and their configuration, in accordance with the instant disclosure.
Figure 32:
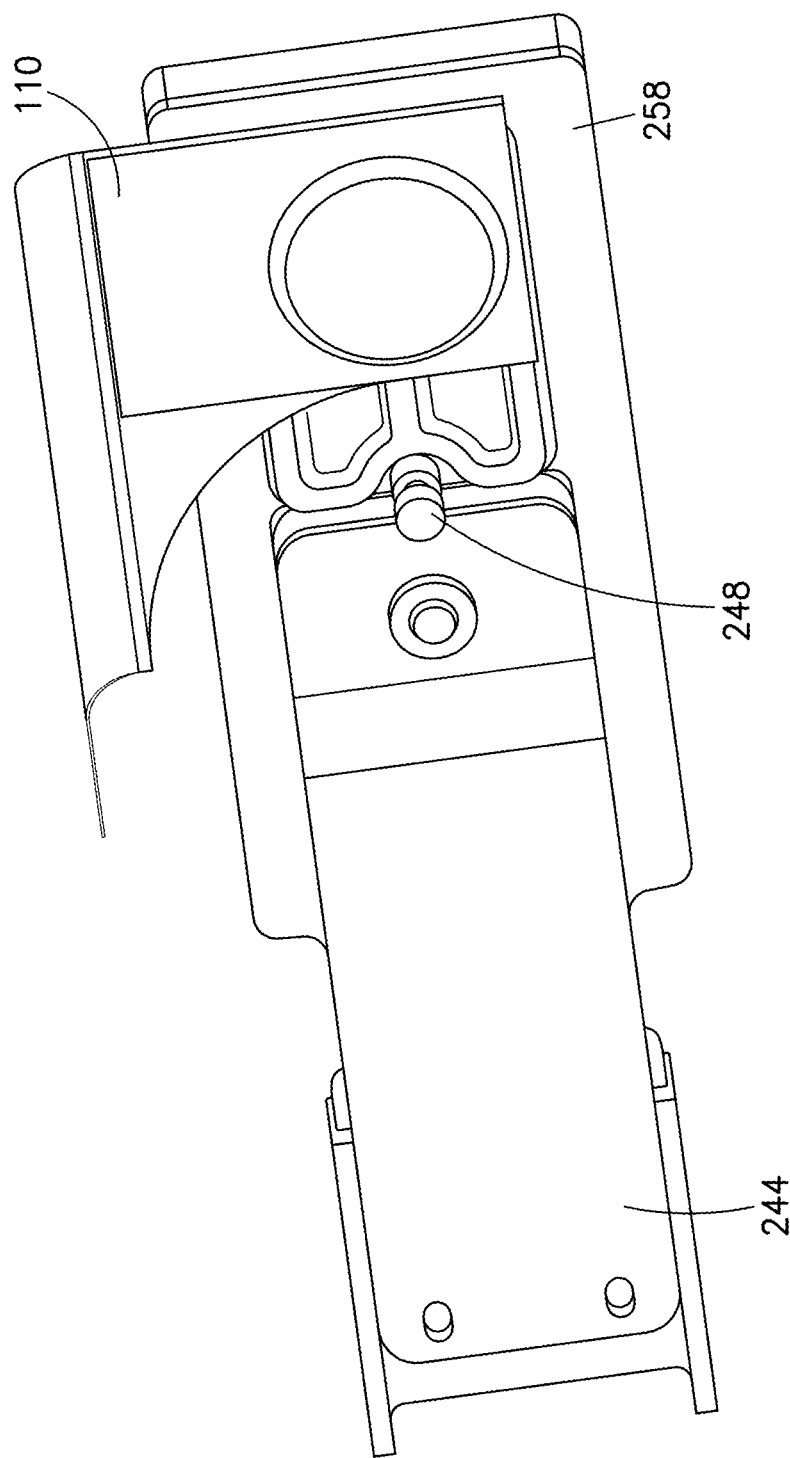
FIG. 32 depicts the embodiment of the current interrupt device in FIG. 31, with the dome actuator removed, depicting the component that moves forward (via the dome actuator) to short the fuse, in accordance with the instant disclosure.
Figure 33:
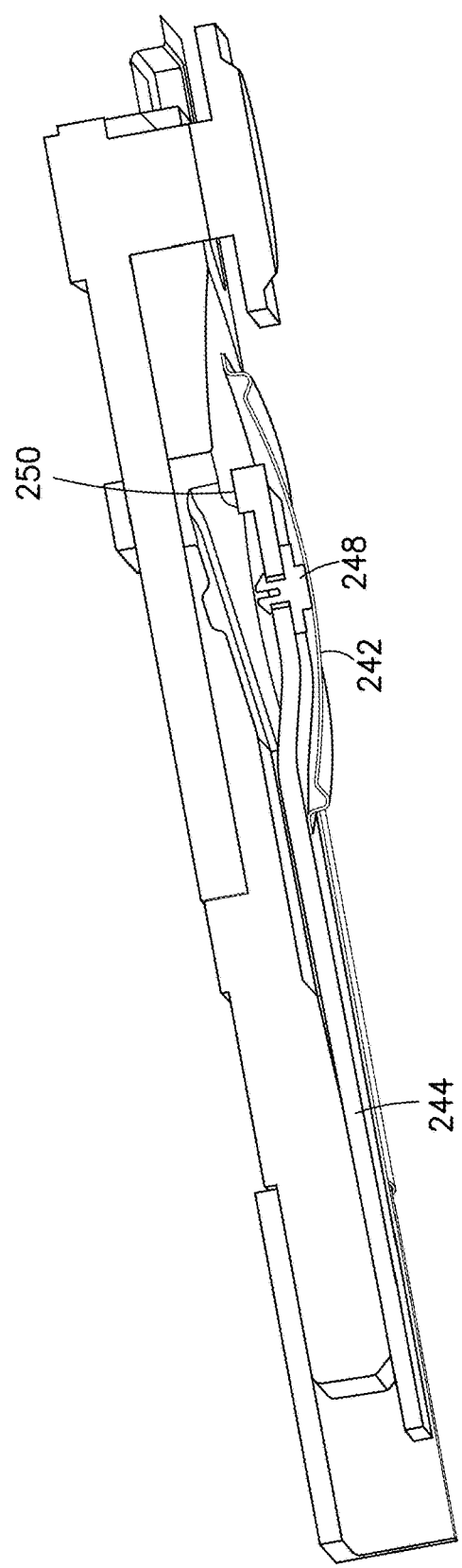
FIG. 33 depicts a cut away side view of an embodiment of the current interrupt device in the "before" position (before actuation, snap-through buckling and shorting the fuse).
Figure 34:
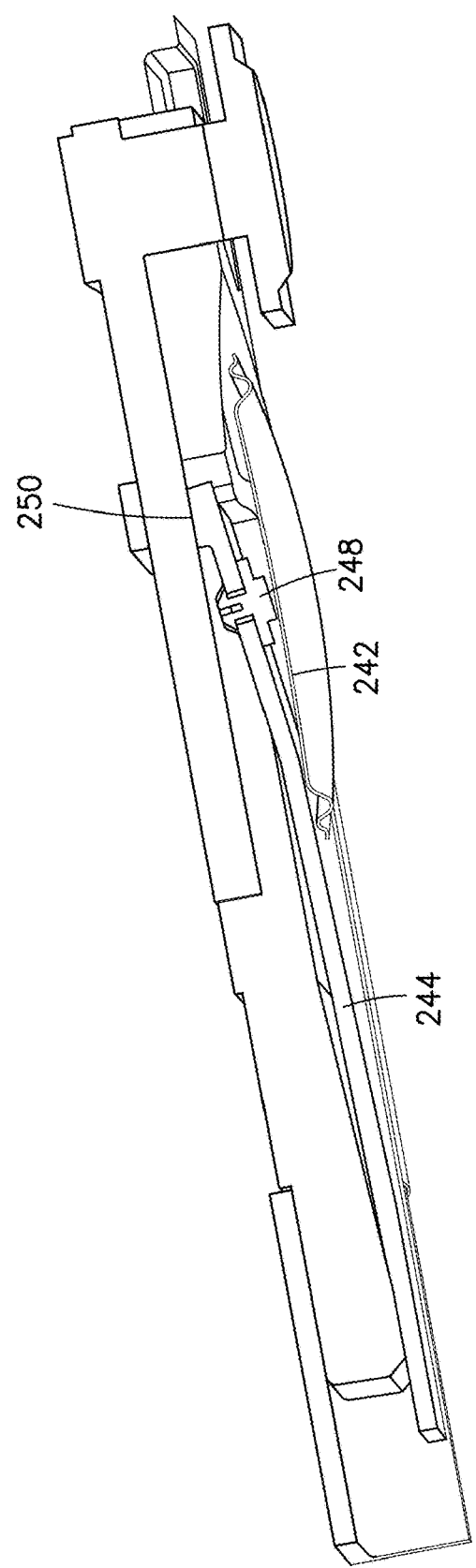
FIG. 34 depicts a cut away side view of an embodiment of the current interrupt device in the "after" position (after actuation, snap-through buckling and shorting the fuse).
Figure 36:
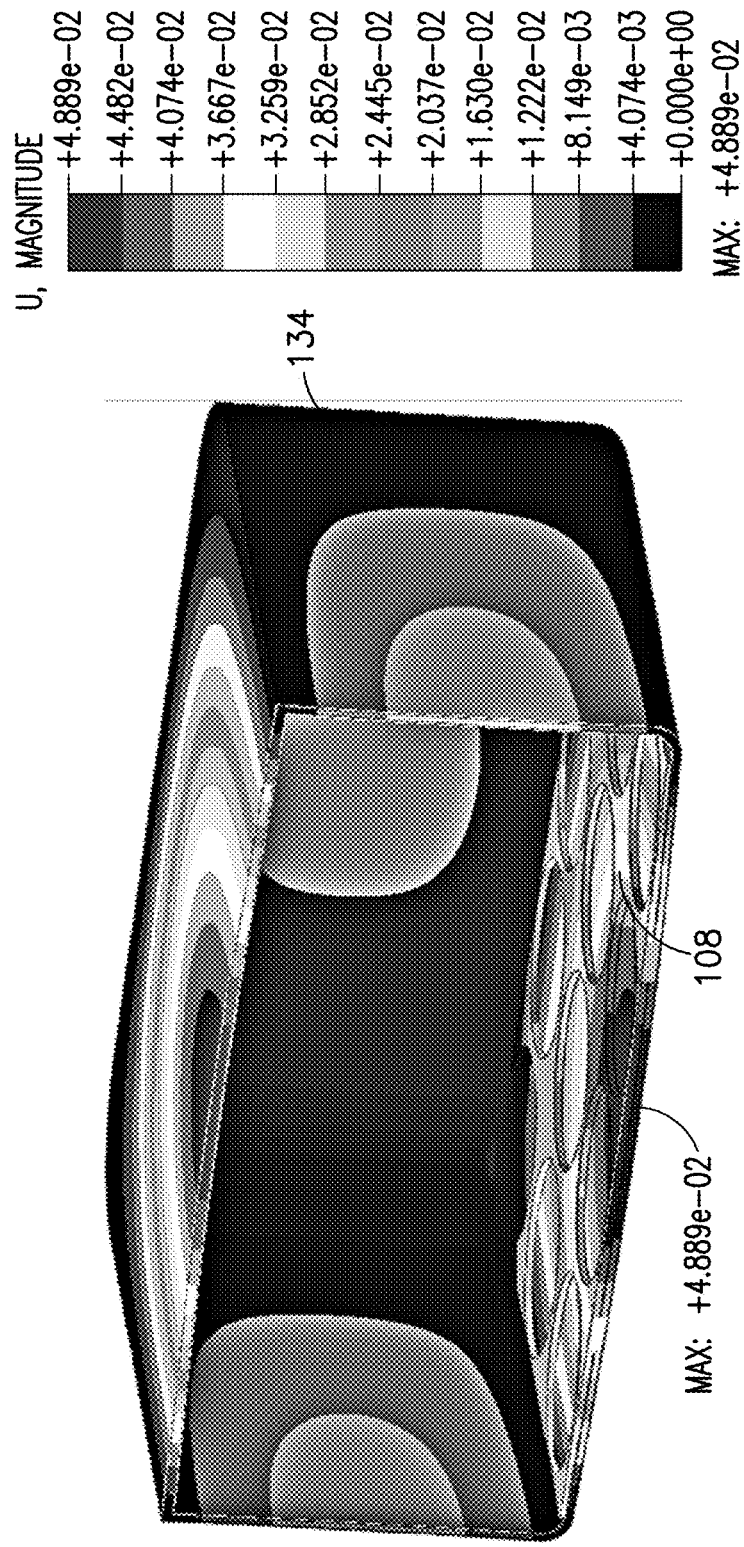
FIG. 36 depicts a computer modeled cut-away perspective side view of an embodiment of a laser seam welded housing of the instant disclosure, the housing having 0.75 mm thick walls. Depicted in varying grayscale across the top of the housing, the relative displacement in the z direction (vertical direction) for a 0.75 mm thick aluminum alloy walled housing experiencing an internal pressurization of 3 PSI (e.g. operating pressure). The housing of FIG. 36 depicts less displacement in the z direction than the housing of FIG. 35.
Figure 37:
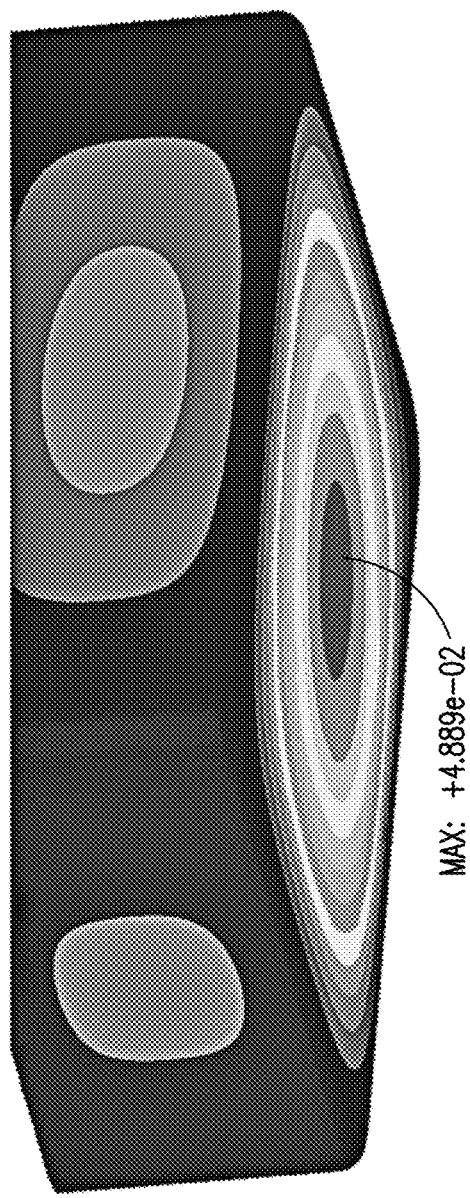
FIG. 37 depicts a computer modeled cut-away perspective side view of an embodiment of a laser seam welded housing of the instant disclosure, the housing having a 1 mm thick walls. Depicted in varying grayscale across the top of the housing (shown inverted), the relative displacement in the z direction (vertical direction) for a 1 mm thick aluminum alloy walled housing experiencing an internal pressurization of 3 PSI (e.g. operating pressure). The housing of FIG. 37 depicts less displacement in the z direction than the housing of FIG. 36 and FIG. 35.
Figure 38:
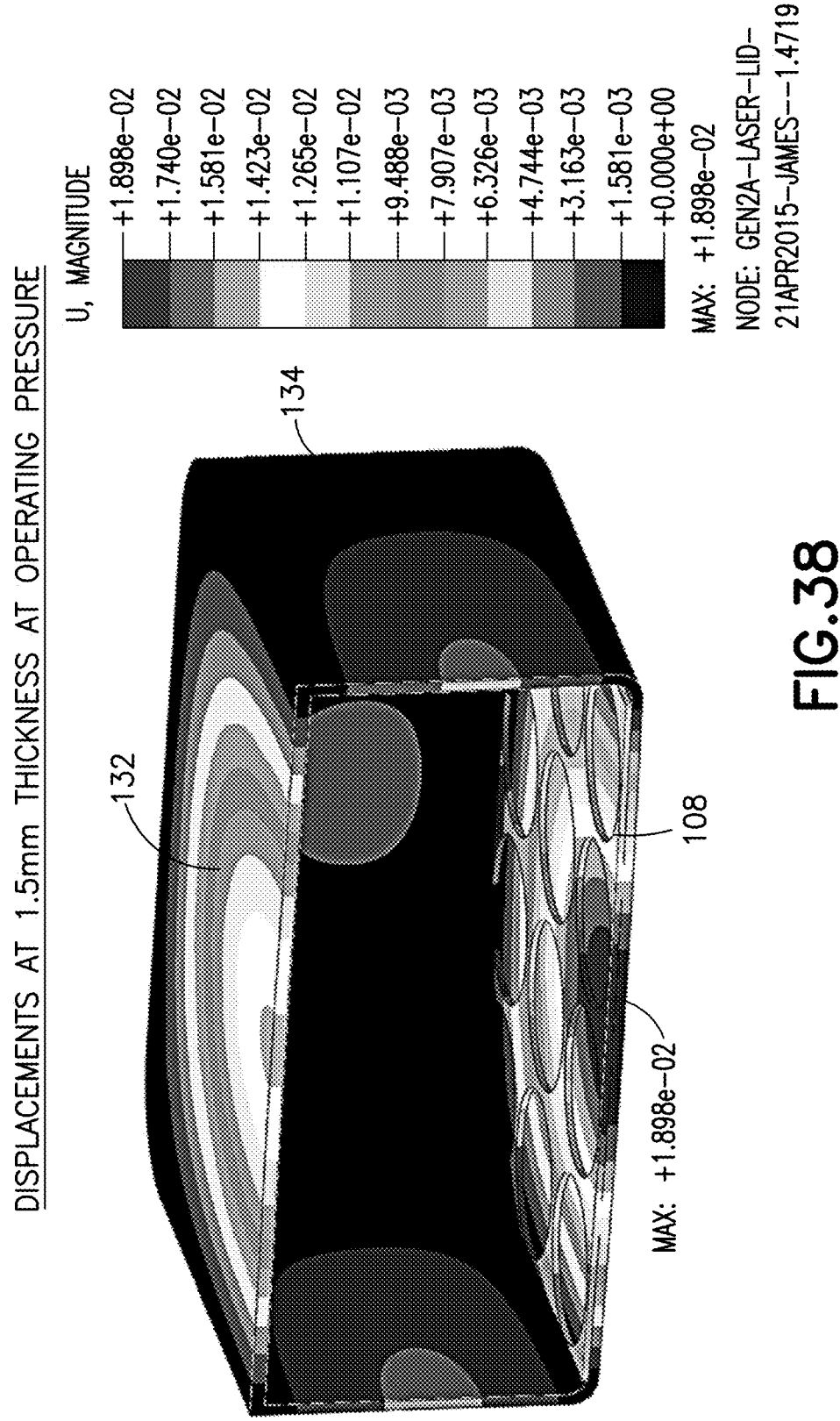
FIG. 38 depicts a computer modeled cut-away perspective side view of an embodiment of a laser seam welded housing of the instant disclosure, the housing having a 1.5 mm thick walls. Depicted in varying grayscale across the top of the housing, the relative displacement in the z direction (vertical direction) for a 1.5 mm thick aluminum alloy walled housing experiencing an internal pressurization of 3 PSI (e.g. operating pressure). The housing of FIG. 38 depicts comparatively less displacement in the z direction than the housings of FIGS. 37, 36, and 35.
Figure 39:
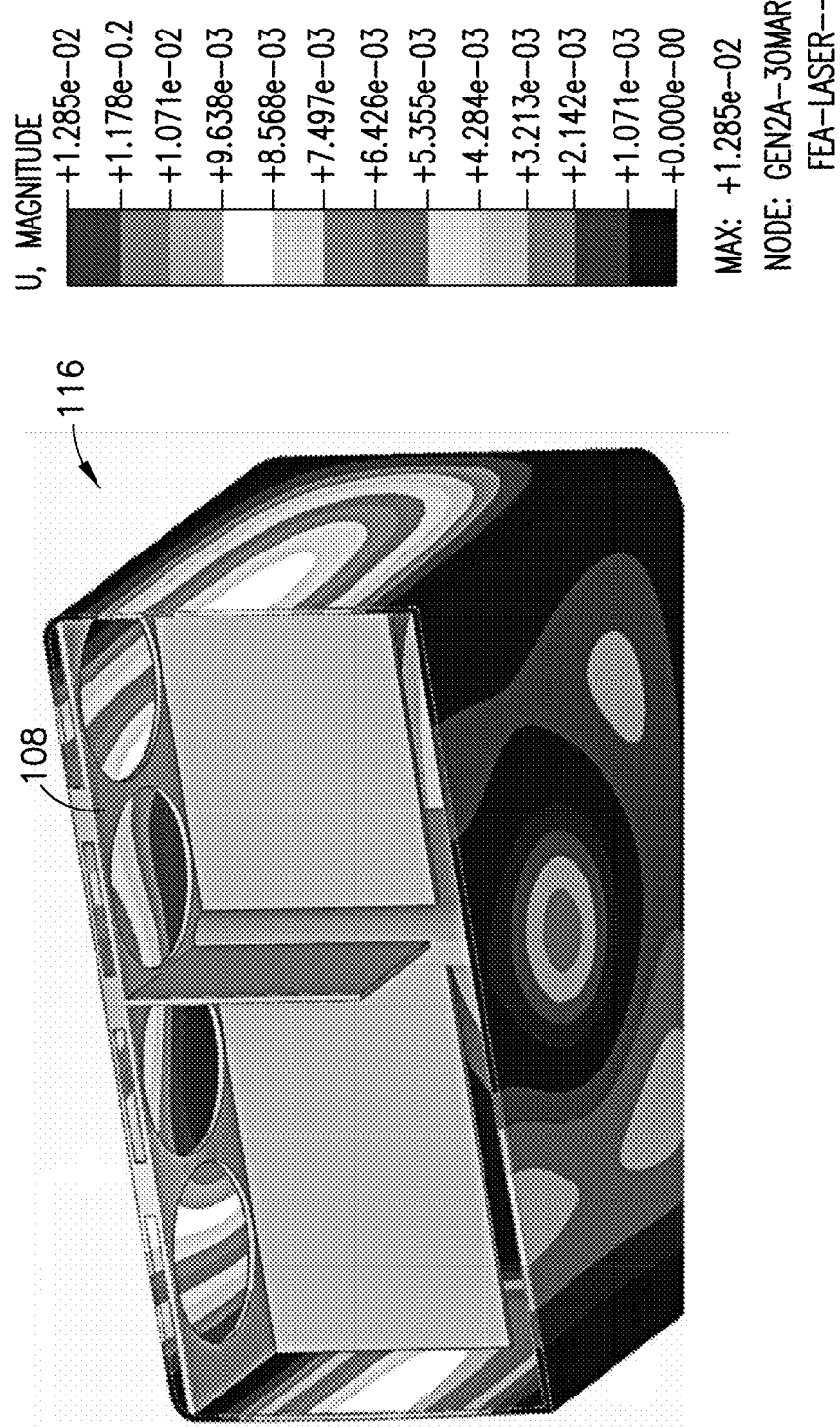
FIG. 39 depicts a computer modeled cut-away perspective side view of an embodiment of a laser seam welded housing of the instant disclosure, the housing equipped with vertical stiffeners configured to extend in the z direction and attach to the sidewalls of the housing in order to promote reduction of displacement in the z direction at 3 PSI (e.g. operating pressure).

Reference will now be made in detail to one or more embodiments, and/or the accompanying drawings with reference to various experimental examples in accordance with the instant disclosure.

In one or more embodiments of the instant disclosure, the battery assembly is configured such that abuse failures do not lead to cascading runaway In one or more aspects of the instant disclosure, the energy storage assembly is configured with a sealed enclosure housing one or more (e.g. a plurality of) energy storage devices; a current interrupt device with a dome actuator; and/or a pressure vent with a flat panel actuator, the panel configured with a raised circumferential groove (e.g. countersink) and a score positioned along at least a portion of the countersink, the score configured to extend at least a portion of the thickness of the countersink substrate and a buckling initiator positioned proximate (e.g. orthogonal to and/or intersecting with) the countersink and/or the score. Without wishing to be bound by a particular mechanism or theory, it is believed that material properties and dimensions are dependent on the methods chosen to affect the sealing of the enclosure/housing, with complex interdependencies regarding the relationships of the features configured within the enclosure/housing. Set out in the paragraphs that follow are examples including: prophetic examples (e.g. method of assembly and use), computer modeling trials, and experimental data obtained on various features and/or components of the instant disclosure.

Prophetic Example 1—Method of Making Housing

In this configuration, the housing/enclosure body is formed via a forming operation (e.g. drawing and ironing) in order to provide a base with a perimetrical sidewall extending upward and surrounding the base, thus defining an inner void. The inner void is configured/sufficiently sized to accommodate a plurality of energy storage devices.

At a position along the sidewall (e.g. positioned a sufficient distance from the electrode leads, terminal contacts and/or electrical wiring of the energy storage devices) a portion of the housing sidewall is removed to accommodate the attachment of a current interrupt device. The current interrupt device is attached (e.g. welded, fastened, bonded, and/or adhered) to the housing and configured to interrupt electrical contact if the internal atmosphere of the housing reaches/exceeds a predetermined pressure. The current interrupt device is configured onto the sidewall of the housing such that the housing is capable of maintaining a sealed enclosure to house the energy storage devices.

In one embodiment, at a position along the sidewall (e.g. positioned a sufficient distance from the electrode leads, terminal contacts and/or electrical wiring of the energy storage devices) a portion of the housing sidewall is removed to accommodate the pressure vent. The pressure vent is attached to the opening to maintain a seal in the housing.

In another embodiment, at a position along the sidewall having a sufficient thickness, is configured with a scored vent (e.g. with countersink and buckling initiator) is configured into the locally thinned portion of the sidewall, such that the scored vent is configured to open at a predetermined pressure acting upon the scored area.

In another embodiment, at a position along the sidewall (e.g. positioned a sufficient distance from the electrode leads, terminal contacts and/or electrical wiring of the energy storage devices) a portion of the housing sidewall is locally thinned. Once locally thinned, a scored vent is configured into the locally thinned portion of the sidewall, such that the scored vent is configured to open at a predetermined pressure acting upon the scored area.

In alternative embodiments, at least one of the current interrupt device and the pressure vent are configured in the cover/lid of the housing (as opposed to the sidewall).

Prophetic Example 2—Method of Assembly Li-Ion Core Members (e.g. Jelly Roll)

In this configuration, the individual energy storage devices are retained in a housing that is sealed via a forming operation (e.g. double seaming). In this instance, the jelly rolls are placed into the housing, electrolyte is inserted into the jelly rolls and a charge/discharge cycle is completed in order to prepare the li-ion core members. Once the li-ion core members are primed (e.g. configured for electrical storage, charge, and discharge operation), the lid of the housing is positioned over the open, upper end of the housing body, overlapping a perimetrical lip (e.g. flange) on the upper end of the housing with a corresponding flange/lip perimetrically located on the lid/cover. Through a forming operation, the corresponding flanges are joined to form a double seal (e.g. having a sealing compound positioned between the layers to assist in achieving a hermetic seal).

Prophetic Example 3—Method of Assembly with Wire Fuse

In this configuration, the individual energy storage devices are each retained in a sleeve, with the plurality of energy storage devices set into a larger housing/enclosure configured to seal (e.g. hermetically seal) around/about the energy storage devices.

The inner can and ends are manufactured (e.g. via a forming operation, via an extrusion), with inner end having/configured with a central hole for the electrical contact/wiring (e.g. copper lead) to exit the energy storage device. Then, the outer cans (e.g. housing/enclosure), including body and cover (or ends) is manufactured.

Each energy storage device is loaded into an inner can, and a weld (e.g. ultrasonic weld or laser weld) is positioned adjacent to the bottom of the can (e.g. where the weld is an aluminum contact configured between the energy storage device and the container). The electrical contact/wiring is threaded through the central hole in the top, followed by the insertion of a non-sealing, insulating spacer (e.g. grommet) into the hole to prevent the electrical wiring/contact (copper) from touching the metal end (e.g. aluminum end).

An electrolyte resistant substrate/sheet (e.g. plastic) is then positioned over the top of the energy storage device, such that the electrolyte resistant substrate/sheet is configured to extend over a flange at the top of the can (i.e. between the top and the upper end of the body of the can).

The top (including electrolyte resistant sheet) is sealed to the upper end of the can via a forming operation (e.g. double seam). In this embodiment, the apparatus is configured to protect the sealing compound from the electrolyte (of the battery). In some embodiments, the sealing compound is configured to be resistant to electrolyte, such that the electrolyte resistant sheet is omitted (not needed).

The cans are positioned into an open bottomed foam layer such that the bottom of each can is exposed below to the foam. Weld (e.g. ultrasonically weld) the bottom of the can to a sheet (e.g. aluminum sheet) to serve as a bus bar, where the weld is configured to circumscribe each can (e.g. configured as an annulus on the outside of the can). Beneath each of the cans is a hole in the bus. Position an insulating sheet (first insulating sheet) under the bus, where the insulating sheet includes a hole under each of the cans. Position a thin conducting member (e.g. sheet, wire, plurality of wires, etc) beneath the insulating sheet, where the conducting member is electrically connected to one side of a cell shutoff relay. In this embodiment, the thin conducting member is configured to act as a relay contact (e.g. in the event of a pressure event). Position another insulating sheet (second insulating sheet), where the sheet is configured to extend across the whole bottom of the container and upwards at least partially up the side of the foam layer.

Position the sealed cans, foam, bus (e.g. aluminum bus), insulating sheet (first sheet), relay contact member, and insulating sheet (second sheet) into the container (e.g. outer can). Position/configure the electrical contacts from the electrical connection on each battery to a second bus work (e.g. copper bus work). Insert electrolyte into the center hole of all the sealed cans (e.g. into the battery). Position/configure electrical contact to the bus work (e.g. aluminum bus work and copper bus work, sited at the electrode ends) for each of the plurality of the cells.

Perform battery preparation, via a charge and discharge cycle. Seal inner can lids via (e.g. sealing grommet). Connect the busses to the cell contacts and add the relay, connecting the relay to the copper bus and the relay contact member, seal the outer can (e.g. via a forming operation, e.g. seaming).

Prophetic Example 4—Method of Using an Energy Storage Assembly

An energy storage device is configured with a sealed housing (e.gs. of a metal substrate, aluminum alloy), where the housing is configured to enclose a plurality of energy storage devices within the housing (e.g. body and cover) and permit electrical communication between the energy storage devices and a product form/device. The energy storage device is configured with a current interrupt device as shown and described and a pressure vent as shown and described.

During operation (e.g. charge, discharge, storage/maintaining the charge) of the energy storage device, the energy storage assembly is configured to retain the energy storage devices and other innards (e.g. electrical connections, bus work, support structures, etc) at an operating pressure (P1, e.g. a range). During operation, the energy storage device can be configured in electrical contact/communication with a product form/device and/or other energy storage devices. Alternatively, during operation, the energy storage device may be charged, discharged, or partially charged and be in storage for a period of time.

During operation, if/when the internal pressure of the energy storage assembly reaches P2, a pressure above the operating pressure, then the current interrupt device configured onto the energy storage device is configured to interrupt the current of the energy storage device (e.g. such that one or more of the energy storage devices is incapable of electrical communication with other energy storage devices and/or the product form/device.

During operation, if/when the internal pressure of the energy storage assembly reaches P3, a pressure above P2, then the pressure vent configured in the housing opens and releases the pressurized gases from inside the housing.

Prophetic Example 5—Method of Using a Battery Assembly

Operating (e.g. charging, discharging) a battery assembly at an operating pressure (P1, e.g. ranging from 0 to 5 PSI), wherein the battery assembly is configured in electrical communication with at least one of: a product form and other battery assemblies; disconnecting the battery assembly from electrical communication with at least one of: the product form and the other battery assemblies when the internal pressure of the battery assembly reaches P2 (e.g. ranging from 15-25 PSI), a pressure above the operating pressure (e.g. wherein disconnecting is accomplished via a current interrupt device); venting the battery assembly via a vent configured in the housing of the battery assembly when the internal pressure of the battery assembly reaches P3 (e.g. ranging from 35-45 PSI), a pressure above P2 (e.g. wherein venting is accomplished via a semi-circular scored vent positioned in a circular countersink of a vent area positioned on the housing of a battery assembly, wherein the battery assembly is configured to house a plurality of lithium ion core members; venting the battery assembly via a structural vent (e.g. plugged enclosure, weld seam, or attachment site of lid to body) when the pressure reaches P4, (e.g. a pressure range of 50-60 PSI), where P4 is greater than P3 (e.g. upper limit pressure that the box can withstand while maintaining structural integrity).

Example 6: Displacement of Sealed Housing Under Pressurized Conditions

Figure 40:
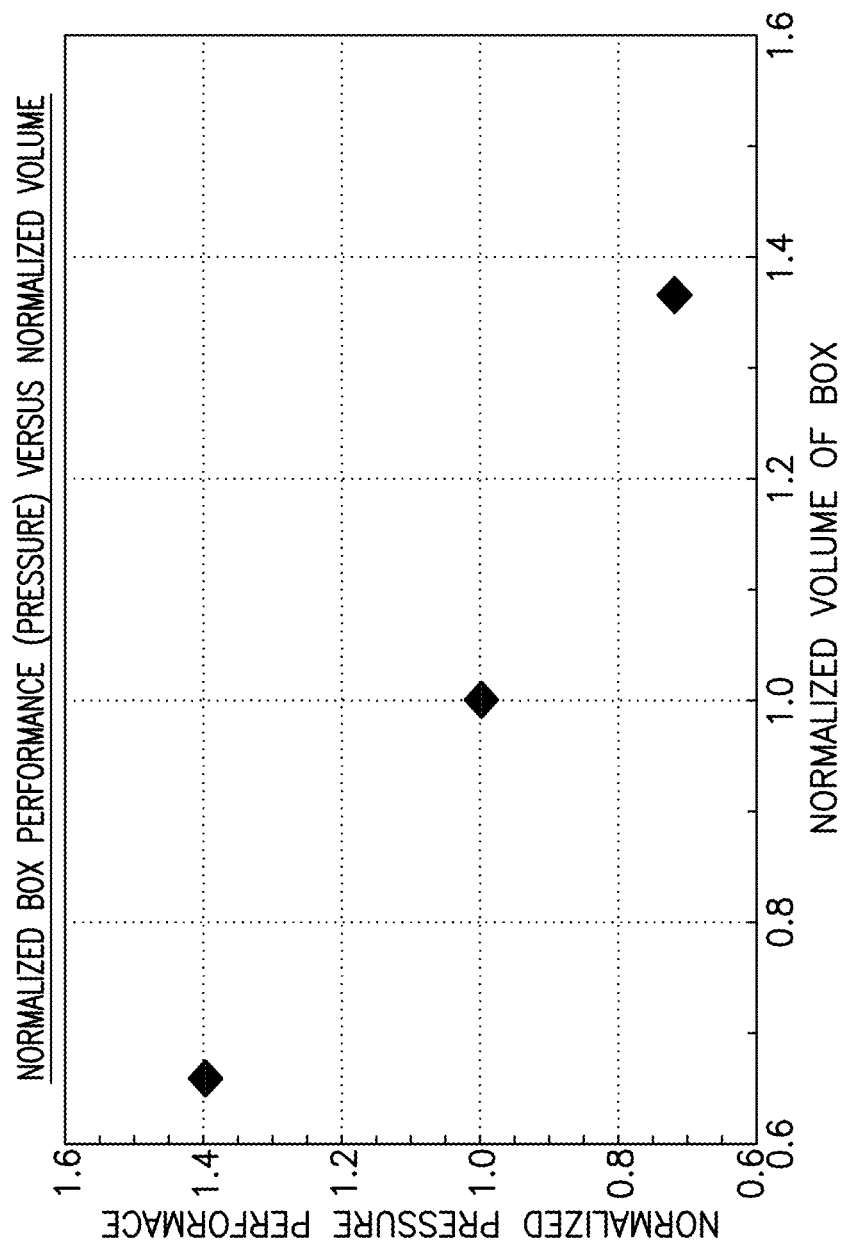
FIG. 40 depicts a graph of normalized pressure performance vs. normalized box volume based on these computer modeling trials. As depicted in FIG. 40, as the normalized volume of the box increases, the normalized pressure performance decreases in a direct and/or proportional functional relationship (near linear correlation).
Figure 41:
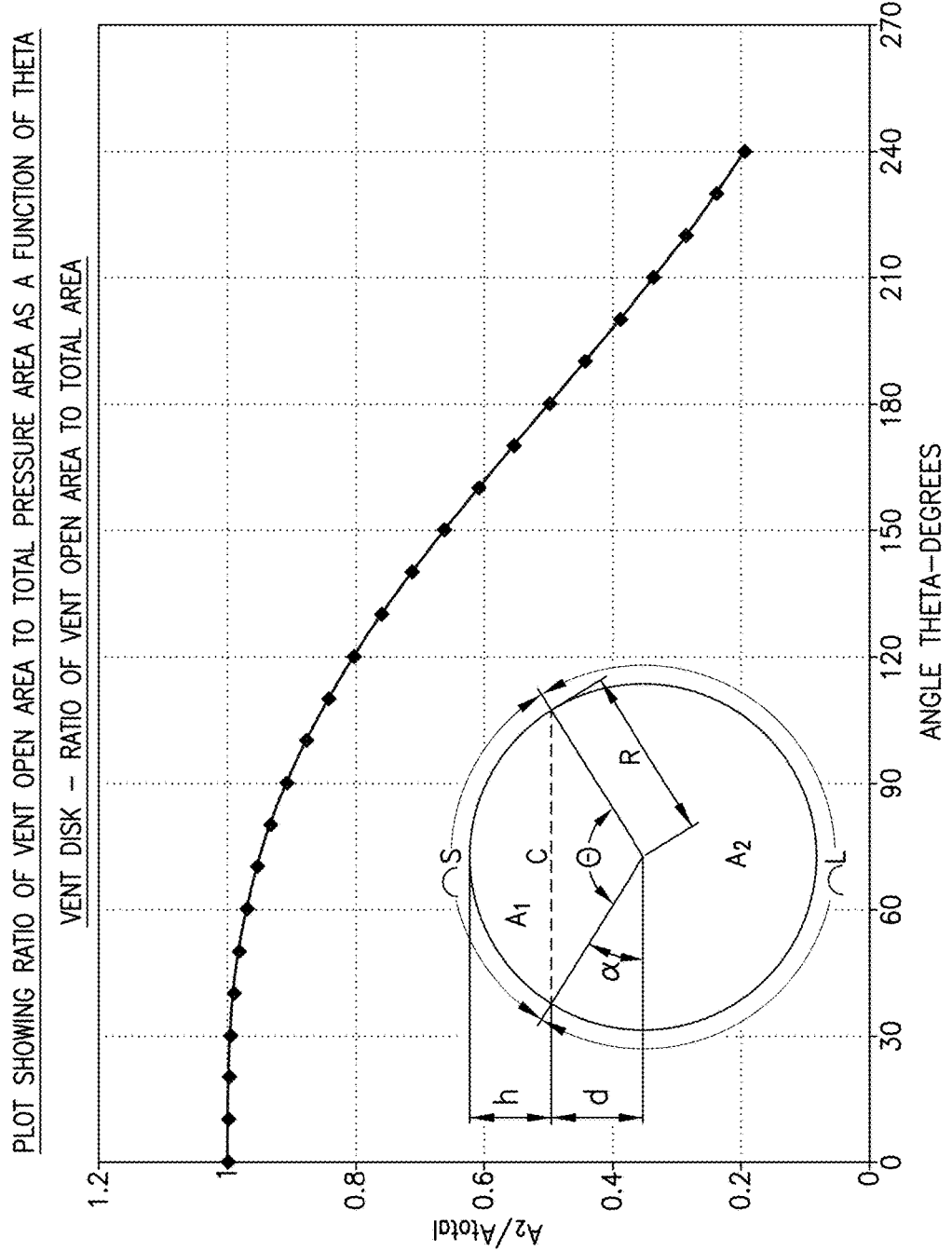
FIG. 41 depicts a plot showing the ratio of vent open area to total pressure area as a function of the angle theta, in accordance with various embodiments of pressure vent of the instant disclosure.
Figure 42:
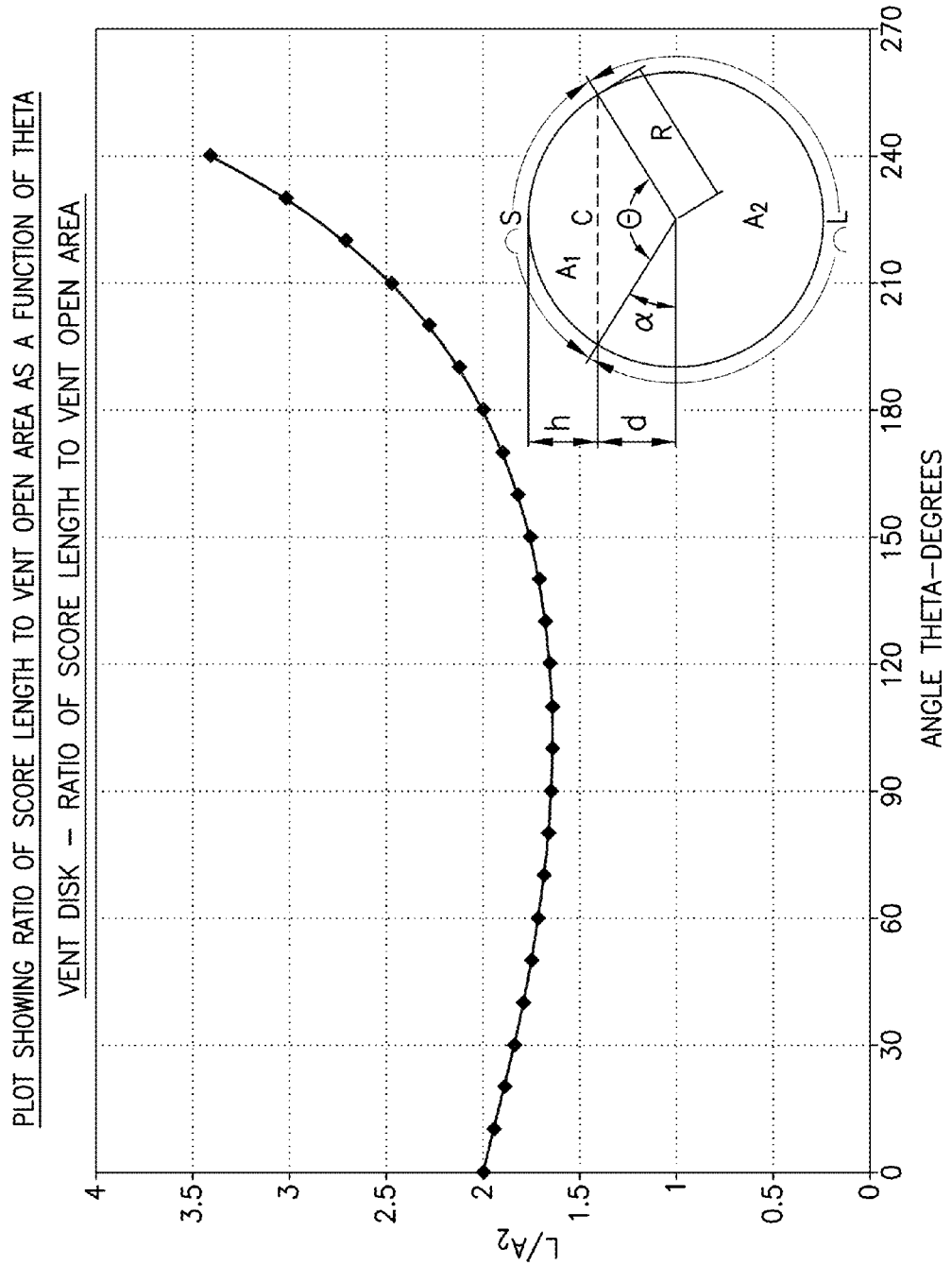
FIG. 42 depicts a plot of the ratio of score length to vent open area as a function of theta, in accordance with various embodiments of the pressure vent of the instant disclosure.
Figure 43:
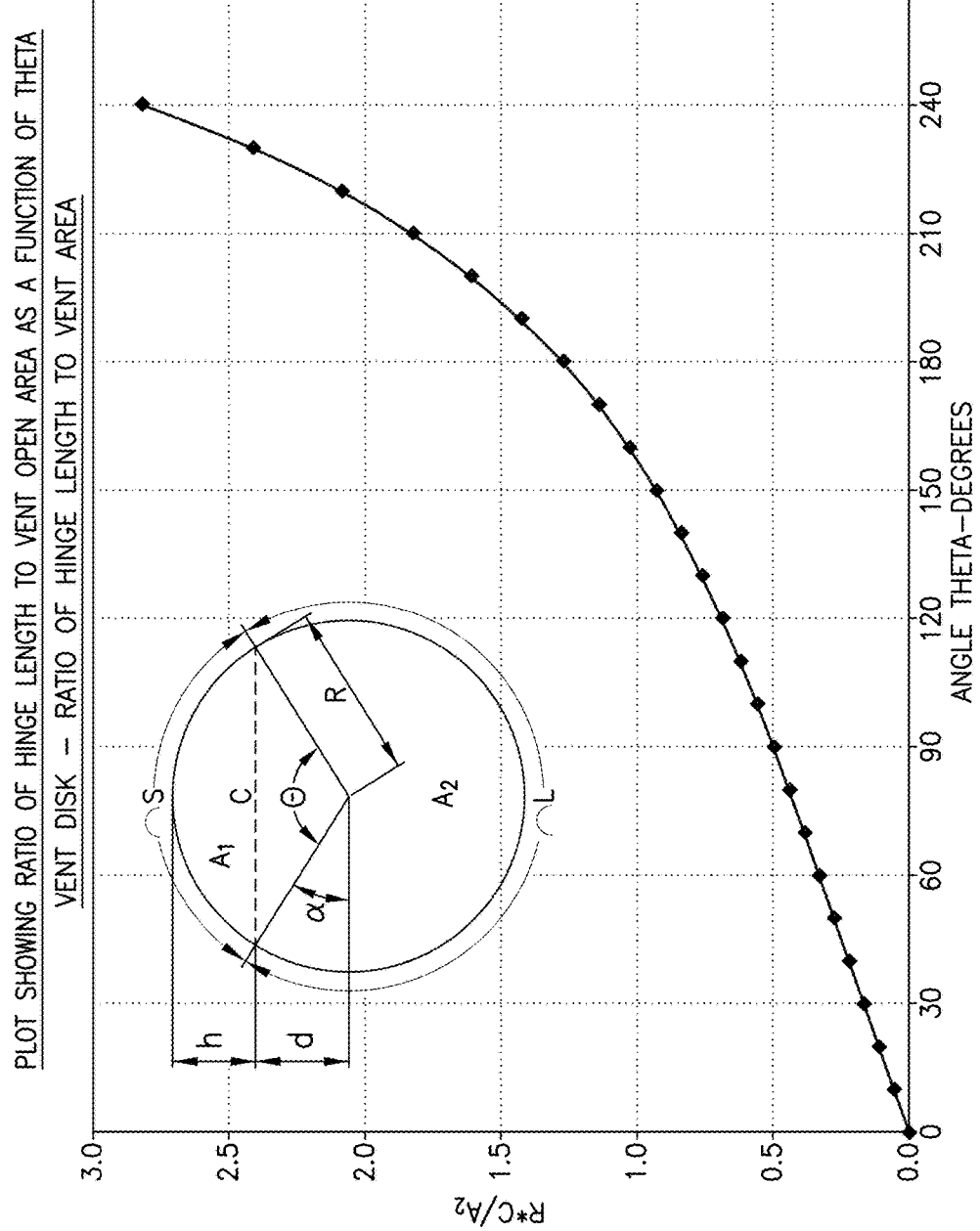
FIG. 43 depicts a plot of the ratio of hinge length to vent open area as a function of theta, in accordance with various embodiments of the pressure vent of the instant disclosure.
Figure 44:
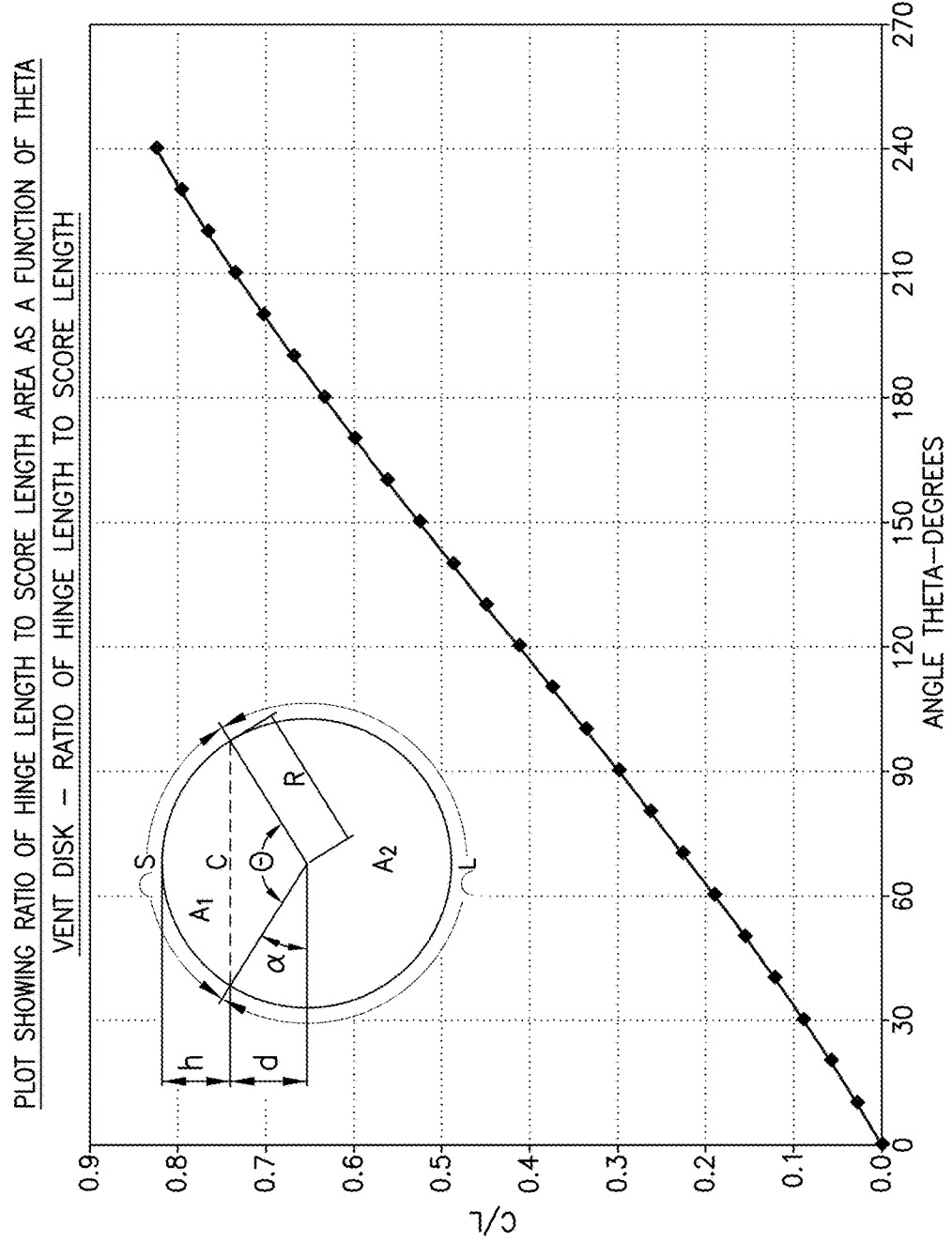
FIG. 44 depicts a plot of the ratio of hinge length to score length area are a function of theta, in accordance with various embodiment of the pressure vent of the instant disclosure.

In order to understand how pressurization impacts the sealed housing, some computer models were generated to view/confirm the displacement of the sealed housing at operating pressure (e.g. up to 3 PSI). Referring to FIGS. 35-40, seam welded housing designs having varied thickness (e.g. 0.5, 0.75, 1, and 1.5 mm) were computer modeled towards the upper end of the typical range of operating pressure (e.g. 3 PSI) in order to understand displacement. Referring to FIGS. 34-39, varying displacement is depicted in grayscale, and FIG. 40 provides a graph depicting the relationship of normalized performance pressure compared to normalized volume of box. As the thickness of the walls increases, the amount of displacement observed in the z direction decreases.

Without wishing to be bound by a particular mechanism or theory, the amount of growth in the z direction is believed to be a function of the length and width of the housing, the thickness of the top and the joining method of the top closure to the container wall.

Figure 54:
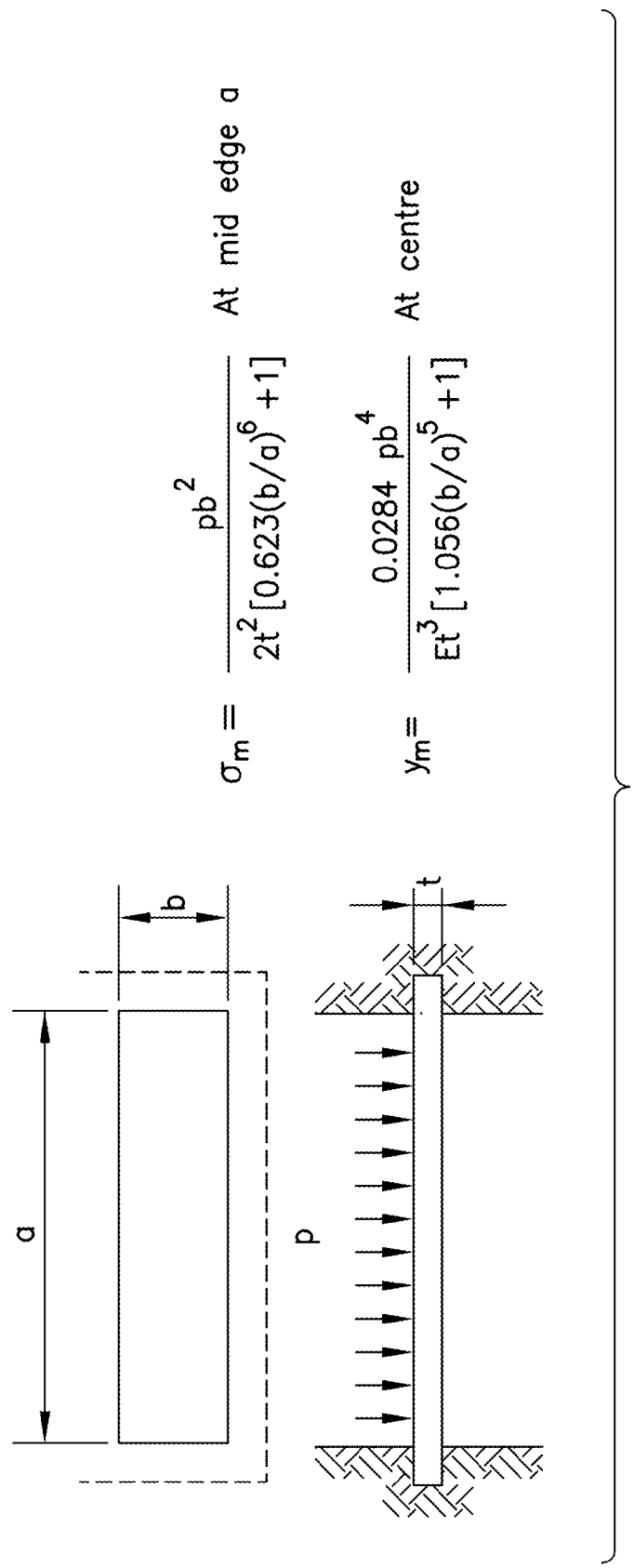
FIG. 54 depicts schematics of rectangular displacements paired with corresponding equations, to propose an explanation for displacement in the z direction across the housings evaluated via computer modeling in FIGS. 34-40.

Without wishing to be bound by a particular mechanism or theory, for a rectangular container, it is believed (e.g. based on the equations set out in FIG. 54) that the larger the plan view dimensions (length and width of the lid) the thicker or more geometrically stiffened the lid (or body) has to be in order to meet the deformation limit at operating pressure. As depicted in FIG. 54, for maximum deflection of a rectangular plate subject to a pressure load, the deflection is an inverse cubic relation to the thickness for fixed boundary dimensions. Further, the deflection is a nominally a 3rd order function of the long dimension of the plate.

Further, the stresses at the boundary decrease as the inverse of the thickness squared which will have the benefit of reducing the stresses at the sealing joint/region of the container:

Without being bound by a particular mechanism or theory, displacement can be reduced by utilizing vertical stiffening ribs/vertically configured supports to shorten the a or b dimensions in the equations in FIG. 54 and thus positively impact the displacement versus pressure profile of the container/housing (see FIG. 40).

Example 7: Displacement Measured in Sealed Housings/Enclosures at Elevated Pressures This set of experiments was carried out on battery assembly housings having different wall thicknesses, in order to better understand the expansion of hermetically sealed boxes at typical operating pressures (e.g. 0-3 PSI) as compared to elevated pressures (e.g. >3 to 50 PSI). Displacement was measured as a function of internal pressure in the boxes. Two different wall thicknesses were evaluated, where housings included a 0.8 mm wall thickness ("cans 1-4", Test #1) or 1.5 mm thickness ("cans 5-8", Test #2). Otherwise, the housings shared the same design criterion: the base thickness was 1.5 mm, the lid thickness was 2 mm, and the basic dimensions of the boxes were 175.2 mm×118.69 mm×56.06 mm. The housings were constructed of 3003-H14 aluminum. The laser welded hermetic seals on the prepared housings were evaluated via a prepared bodies "Whole-Can Helium leak test", and all housings passed. The cans were equipped with a completely sealed nitrogen gas inlet (in order to input nitrogen gas into the otherwise sealed housing and increase internal pressure).

Prior to pressurization, each housing geometry was measured. Then, the housing was positioned and retained inside a stainless steel cage in 2-axis fixed position, equipped with a drop indicator. The drop indicator was in contact with the top of the housing in order to measure the Z-axis displacement as a function of increasing pressure. Since the bottom plate is 1.5 mm and top plate is 2 mm, the housing was positioned with the bottom plate facing up in order to minimize any potential contribution of the unbalanced geometry due to size expansion during the test.

During testing, the housing was pressurized to 3 psi (P1) and held at this pressure for a duration of two minutes, followed by a pressurization at 10 psi for a duration of two minutes. This sequence—pressurize and hold for a duration of two minutes, was followed in increments of 5 PSI until the upper limit of the experiment, 50 PSI, was achieved. The upper limit of 50 PSI was based upon the Lid Test Plan. Measurements were obtained via a camera that was positioned in front of the cage in order to record readings from the drop indicator.

Without wishing to be bound by any particular mechanism or theory, at 3 PSI, the believed upper limit of typical internal operating pressure for a battery assembly housing a plurality of active (e.g. charging, discharging, operating) lithium ion batteries, was also tracked.

At 3 PSI, the maximum displacement on all 4 cans having 0.8 mm thick walls was 1.016 mm. The minimum displacement on the thin walled cans at 3 PSI was 0.457 mm. The average displacement on the thin walled cans at 3 PSI was 0.9335 mm.

Results of the displacement at incremental pressurization is displayed in Table 1, below.

TABLE 1

| Test 1, Results: Increment Analysis on Every 5 PSI | | | | | | | | |
|---|---|---|---|---|---|---|---|---|
| Pressure (PSI) | Can #1 (in) | Can #1 (mm) | Can #2 (in) | Can #2 (mm) | Can #3 (in) | Can #3 (mm) | Can #4 (in) | Can #4 (mm) |
| 0-15 | 0.06 | 1.524 | 0.055 | 1.397 | 0.06 | 1.524 | 0.05 | 1.27 |
| 15-20 | 0.05 | 1.27 | 0.065 | 1.651 | 0.07 | 1.778 | 0.075 | 1.905 |
| 20-25 | 0.045 | 1.143 | 0.07 | 1.778 | 0.045 | 1.143 | 0.06 | 1.524 |
| 25-30 | 0.035 | 0.889 | 0.05 | 1.27 | 0.055 | 1.397 | 0.06 | 1.524 |
| 30-35 | 0.04 | 1.016 | 0.055 | 1.397 | 0.048 | 1.219 | | |
| 35-40 | 0.032 | 0.813 | 0.055 | 1.397 | 0.054 | 1.372 | | |
| 40-45 | 0.028 | 0.711 | 0.06 | 1.524 | 0.053 | 1.346 | | |
| 45-50 | 0.05 | 1.27 | 0.045 | 1.143 | 0.041 | 1.041 | | |
| SUM | 0.34 | 8.636 | 0.455 | 11.557 | 0.426 | 10.82 | 0.245 | 6.223 |
| Displacement average in inches every 5 PSI increment: | | | | | | | 0.052 | |
| Displacement average in mm every 5 PSI increment: | | | | | | | 1.330 | |

For Can #1, at 3 PSI displacement was 1.016 mm, and at the upper limit of 50 PSI the total displacement was is 12.167 mm. For Can #2, at 3 PSI the displacement was 1.397 mm, and at the upper limit of 50 PSI the total displacement was 15.570 mm. For Can #3, at 3 PSI the displacement was 0.864 mm, and at the upper limit of 50 PSI the total displacement was 14.605 mm. For Can #4, at 3 PSI the displacement was 0.457 mm, and at the upper limit (prior to premature failure believed to be attributed to a weld issue) of 25 PSI the total displacement was 9.017 mm.

At the upper limit of 50 PSI, maximum the overall displacement on the three cans (#1-3) was 15.570 mm, the minimum displacement was 12.167 mm, and the average displacement was 14.114 mm. Three of the four cans/housings with 0.8 mm thick walls survived pressurization to 50 PSI. As previously stated, one housing, Can #4 failed prematurely due to a weld issue. Thus, it was observed that battery assemblies having sufficient sealing/appropriately welded bodies with walls of 0.8 mm thick were structurally sound/survived a pressurization of 50 PSI at an extended duration of time (i.e. two minutes).

At 3 PSI, the maximum displacement on all 4 cans having 1.5 mm thick walls was 0.813 mm. The minimum displacement on the thick walled cans at 3 PSI was 0.457 mm. The average displacement on the thin walled cans at 3 PSI was 0.6415 mm. Results of the displacement at incremental pressurization is displayed in Table 2, below.

TABLE 2

Test #2: Increment Analysis on Every 5 PSI

| Pressure (PSI) | Can #5 (in) | Can #5 (mm) | Can #6 (in) | Can #6 (mm) | Can #7 (in) | Can #7 (mm) | Can #8 (in) | Can #8 (mm) |
|---|---|---|---|---|---|---|---|---|
| 0-15  | 0.05  | 1.27  | 0.05  | 1.27  | 0.06  | 1.524 | 0.048 | 1.219 |
| 15-20 | 0.038 | 0.965 | 0.048 | 1.219 | 0.03  | 0.762 | 0.043 | 1.092 |
| 20-25 | 0.04  | 1.016 | 0.037 | 0.94  | 0.05  | 1.27  | 0.045 | 1.143 |
| 25-30 | 0.042 | 1.067 | 0.053 | 1.346 | 0.044 | 1.118 | 0.05  | 1.27  |
| 30-35 | 0.035 | 0.889 | 0.052 | 1.321 | 0.031 | 0.787 | 0.035 | 0.889 |
| 35-40 | 0.045 | 1.143 | 0.018 | 0.457 | 0.04  | 1.016 | 0.031 | 0.787 |
| 40-45 | 0.039 | 0.991 | 0.062 | 1.575 | 0.047 | 1.194 | 0.05  | 1.27  |
| 45-50 | 0.021 | 0.533 | 0.022 | 0.559 | 0.025 | 0.635 | 0.038 | 0.965 |
| SUM   | 0.31  | 7.874 | 0.342 | 8.687 | 0.327 | 8.306 | 0.34  | 8.636 |
| Displacement average in inches every 5 PSI increment: | | | | | | | 0.041 | |
| Displacement average in mm every 5 PSI increment: | | | | | | | 1.047 | |

For Can #5, at 3 PSI displacement was 0.457 mm, and at the upper limit of 50 PSI the total displacement was is 10.414 mm. For Can #6, at 3 PSI the displacement was 0.813 mm, and at the upper limit of 50 PSI the total displacement was 11.582 mm. For Can #7, at 3 PSI the displacement was 0.737 mm, and at the upper limit of 50 PSI the total displacement was 10.795 mm. For Can #8, at 3 PSI the displacement was 0.559 mm, and at the upper limit at 50 PSI the total displacement was 10.668 mm.

At the upper limit of 50 PSI, maximum the overall displacement on the four cans (#5-8) was 11.582 mm, the minimum displacement was 10.414 mm, and the average displacement was 10.865 mm. All four cans/housings with 1.5 mm thick walls survived pressurization to 50 PSI. Thus, it was observed that battery assemblies having sufficient sealing/appropriately welded bodies with walls of 1.5 mm thick were structurally sound/survived a pressurization of 50 PSI at an extended duration of time (i.e. two minutes).

It was observed that at 3 PSI, by increasing the side wall thickness from 0.8 mm to 1.5 mm, the maximum displacement decreased by 19.98%, the minimum displacement stayed the same, and average displacement decreased by 31.28%.

It was observed that at 50 PSI, by increasing the side wall thickness from 0.8 mm to 1.5 mm, the maximum displacement decreased by 25.61%, the minimum displacement decreased by 14.41%, and the average displacement decreased by 23.02%.

It was observed that in evaluating the incremental pressurization results (e.g. data in Table 1 and 2), by increasing the side wall thickness from 0.8 mm to 1.5 mm, the average incremental value decreased by 21.27%.

Example 8: Venting Trial with Flat Scored Aluminum Alloy Vents

A series of buckling experiments was performed on flat sheet (no countersink, no bucking initiator). Nine venting trials were run on flat circular sheets, where each sheet was configured with a circumferential/oblong score with a non-scored region defining a hinge. The score was placed directly on the panel (no countersink). The 31.75 mm round disk samples were produced on a single action mechanical press with the stroke controlled to meet the desired score residual. AA3104 material was used for the score vent. The thickness of the material was 250 microns and the score residual was 50 microns (range of 38-60 microns).

The samples were tested (e.g. pressurized) by clamping the scored disk to a flat plate using a washer to simulate a welded condition. The samples were pressurized via a pressurization instrument configured to act through a hole on the washer (on the surface of the each disk) until venting occurred. The experiment was (originally) designed to provide venting at 90-100 PSI, and when factors were varied in order to drive the venting initiation down to a lower pressure, the pressure to initiate venting was no lower than 70 PSI for this set of experiments. Results of the trial are set out in the Table 3 below:

TABLE 3

| Test # | Pressure (psi) |
|---|---|
| 1 | 73 |
| 2 | 82 |
| 3 | 75 |
| 4 | 75 |
| 5 | 72 |
| 6 | 68 |
| 7 | 78 |
| 8 | 75 |
| 9 | 73 |

Nine tests were run and in each instance, the vent retained pressure to at least 65 psi. Venting was observed in all cases at/along the scored vent. The average venting pressure was 75.6 psi. It is noted, variations in the residual thickness did not necessarily have a direct relationship with (e.g. provide significant control to direct) venting pressure. Without being bound by any mechanism of theory, this is believed to be because the scoring (vent) was positioned directly on the panel and the panel diameter was of a relatively small size (compared to later trials).

It is noted that for one of the nine runs, a copper mesh flame arrestor was positioned inside the vent. At venting pressure (approximately 70 psi) the flame arrestor remained intact e.g. did not dislodge from its position or blow through the vent.

Without wishing to be bound by a particular mechanism or theory, buckling pressure is believed to be related to the diameter of the shell/disk and/or other components (e.g. panel depth, countersink, strength of material, material choice, etc.). Without wishing to be bound by a particular mechanism or theory, the required score residual to meet the venting pressure is believed to be a function of the score design and the material thickness and strength.

Example 9: Pressure Venting With Scored Vent with Countersink

In order to evaluate the score design and controls over the pressurization and resulting venting of the pressure vent, a series of experiments was performed on a number of shells having different score features. For each design parameter at least 5 to up to 10 runs were performed on each configuration variable, in order to have a sufficient sample size to draw reasonable comparisons in performance/impact of changing the vent configuration. The same pressurization equipment utilized in Example 8 was again utilized in these trials to better understand the vent configurations and resulting impact on vent propagation through the shell/disk.

In evaluating the configuration of score shape, three shapes were evaluated: a y-shaped score, a line score, and a circumferential score.

In evaluating the configuration of score position, a circumferential score was placed in the countersink vs. directly on the panel.

In evaluating the configuration of score location (i.e. positioning inside or outside of housing), a score was placed on the inside vs. outside of the panel.

In evaluating score-to-hinge ratio configuration, various runs were completed to evaluate the hinge size with a circumferential score in the countersink.

In evaluating the configuration of a score initiation site, circumferential scores were evaluated with and without a buckling initiator. In this trial, when a buckling initiator was used, the buckling initiator was positioned opposite the hinge (e.g. 180 degrees from the hinge) and was configured as a score set in a perpendicular direction to the principal score line on top side of lid/outside shell (e.g. configured as the outside/outward facing portion of the housing).

In each of these trials, the material type/composition, strength, and thickness were selected such that the pressure vents were configured to vent at a range of approximately 85-90 psi. In each run, the score was configured by the same score knife, score procedure, and the same residual thickness such that each sample was designed to vent so that the resulting 'vent event' (e.g. initiation site, propagation, etc) could be evaluated after pressurization.

It is noted that the various configurations were designed to vent, but many of the configurations did not vent in a repeatable and consistent way. In some instances, the vent did not propagate far enough in order to create a sufficient opening in the vent to direct pressurized gas through the opening. In other instances, the vent propagated through the vent shell/sample, such that, if used in combination with an energy storage device, the torn vent substrate could create sharp edges in close proximity to neighboring energy storage devices, electrical components, or sensitive components of the product form or device. In some instances, the vent propagated too far and resulted in a freestanding portion of the vent substrate/shell that was completely removed from the sample (e.g. which could cause a projectile during operating conditions of the energy storage device). In some instances, the vent initiated at a score line, but deviated from the score and instead propagated through the non-score portion of the vent (e.g. creating different sized resulting vents).

In evaluating the results, it was determined that the circumferential-shaped score (leaving an unscored hinge), where the score (and hinge) was positioned within a raised circumferential groove (e.g. countersink) was configured to create a consistently repeatable, precise and accurate vent. Specifically, this configuration resulted in: (1) a consistent vent size; (2) a consistent vent path (e.g. along the score line, neither deviating from the path nor propagating into the hinge); (3) fast vent propagation through the score (short duration of time, as measured from start of vent at buckling initiator to finish of vent at completion of propagation; and (4) did not impact the resulting attachment zone (e.g. outer edges of the shell/substrate). Additionally, the inclusion of the buckling initiator to the vent configuration was found to promote initiation (e.g. via its configuration as site for receiving the build-up of panel stress upon pressurization) of the vent site at a predetermined location on the score line, such that the hinge remained intact (e.g. vented flap was retained on vent substrate) and the score propagated along the defined/designed pathway (e.g. score line) to result in a sufficiently sized vent to achieve quick venting.

Based on these tests, further evaluation of the circumferential score with hinge, positioned in a countersinkF was completed (e.g. Example 10).

Example 10: Computer Modeling Trials on Circumferential Countersink

Finite element models were generated to determine the impact and relationships of diameter, material strength, vent thickness, and residual thickness on the performance and venting characteristics of the disk/vent structure. More specifically, a computer modeling trial was completed on a vent substrate (e.g. AA3003 H14) with a circumferential countersink (no score) with welded ends and undergoing pressurization, in order to evaluate the variables in the vent feature and their impact on buckling pressure (no vent, since no score).

Figure 45:
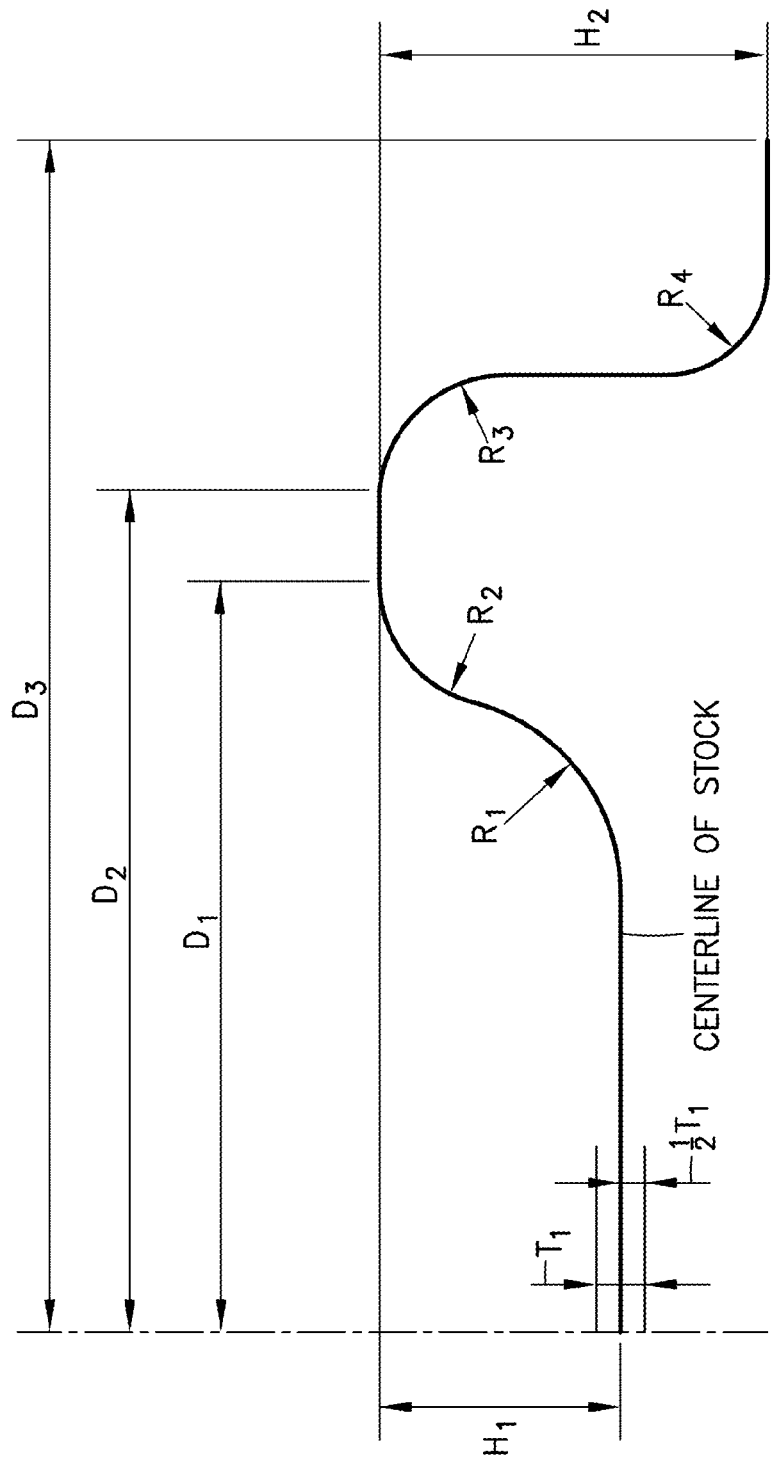
FIG. 45 depicts a parametic view of the vent modeled in accordance with the Examples Section.

In this experiment, by varying certain factors (e.g. diameter, thickness, and strength of the material), the vent was designed to buckle at a threshold of around 40 PSI. The goal of these parametric studies was to understand the effect of radius, radius depth, and countersink depth have on performance of the vent. Referring to FIG. 45, in this modeling series, R1 (e.g. radius, or panel radius), H1 (e.g. panel depth, or radius depth), and H2 (e.g. countersink depth) were varied in order to understand the impact on buckling pressure. In this series of FEM analyses, D1, D2, D3, R2, R3, R4, and T1 (depicted in FIG. 45) were maintained as constant. Specifically, D1 and D2 were the same (D1–D2=0), 1.1275"; D3 was 1.3000"; R2=R3, which was 0.0250"; R4 was 0.200", and T1 was 0.0100". The variations in R1, H1, and H2 (in inches) and resulting buckle pressure (psi) are set out in Table 4 below.

TABLE 4

| ID | R1 | H1 | H2 | Buckle |
|----|--------|--------|--------|--------|
| 1  | 0.0450 | 0.0400 | 0.0600 | 29.2   |
| 2  | 0.0450 | 0.0500 | 0.0600 | 30.2   |
| 3  | 0.0250 | 0.0400 | 0.0600 | 29.4   |
| 4  | 0.0250 | 0.0500 | 0.0600 | 30.5   |
| 5  | 0.0450 | 0.0400 | 0.0800 | 36.3   |
| 6  | 0.0450 | 0.0500 | 0.0800 | 37.5   |
| 7  | 0.0250 | 0.0400 | 0.0800 | 36.6   |
| 8  | 0.0250 | 0.0500 | 0.0800 | 38.1   |
| 9  | 0.0250 | 0.0500 | 0.0800 | 37.9   |
| 10 | 0.0450 | 0.0500 | 0.0800 | 37.4   |
| 11 | 0.0450 | 0.0600 | 0.0800 | 38.6   |
| 12 | 0.0450 | 0.0700 | 0.0800 | 39.9   |
| 13 | 0.0450 | 0.0700 | 0.0800 | 46.0   |

Referring to Table 4, it is shown that variations in the countersink depth resulted in a difference in buckling pressure of approximately 7 psi, while varying the radius depth or panel radius resulted in smaller changes in buckling pressure.

Figure 46:
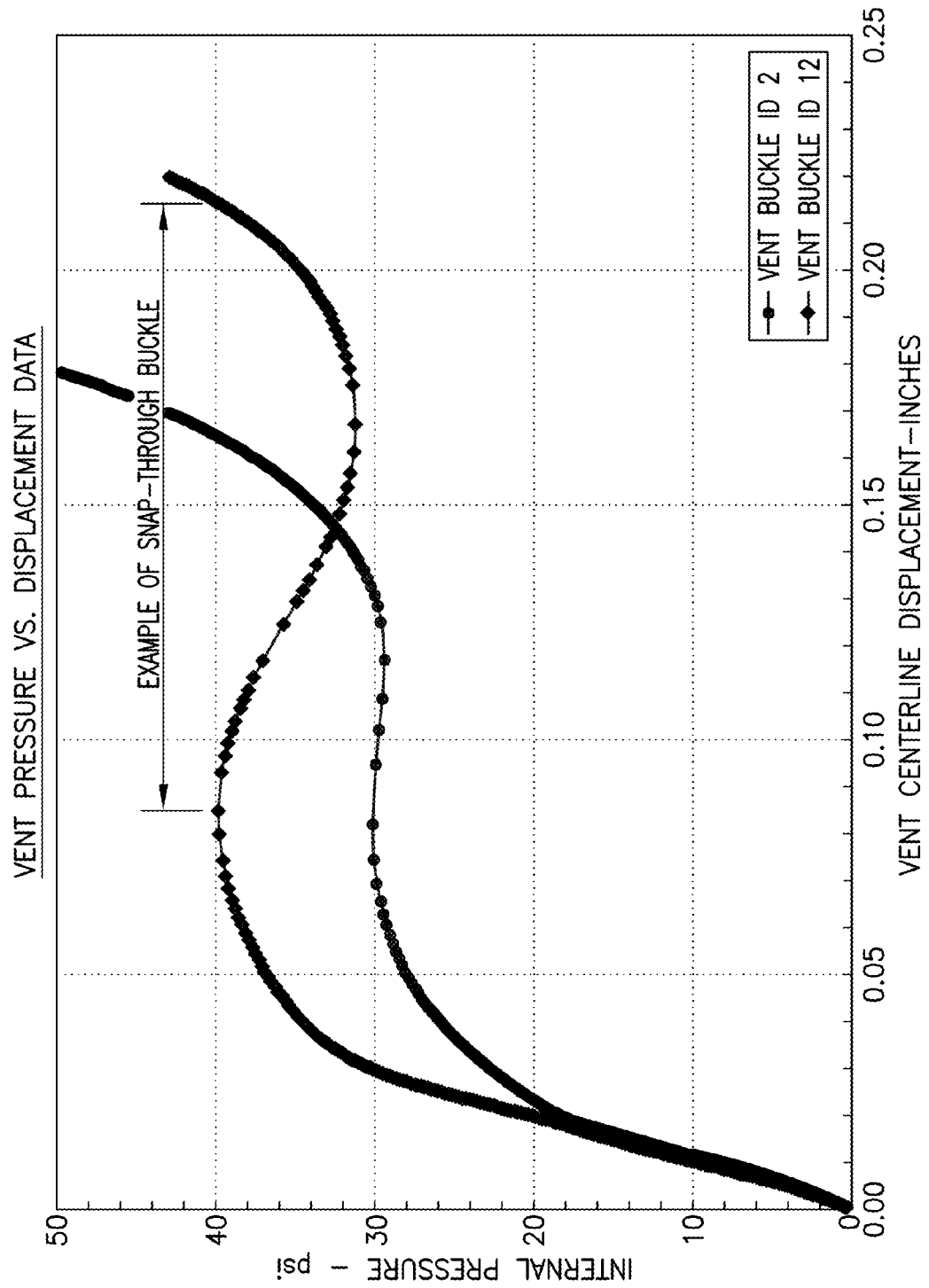
FIG. 46 is a graph depicting internal pressure as a function of displacement for two computer modeled vents in the Examples section.

Referring to FIG. 46, two comparative examples from this vent buckling trial are shown as internal pressure (psi) by vent centerline displacement (inches). With vent buckle trial #2, the panel radius was 0.0450 inches, the panel depth was 0.0500 inches, the countersink depth was 0.0600 inches, and the buckling pressure was 30.2 psi. With vent trial #12, the panel radius was 0.0450 inches, the panel depth was 0.0700 inches, the countersink depth was 0.0800 inches, and the buckling pressure was 39.9 psi. In this comparative example, both samples buckled, but trial #12 performed better as it exhibited snap-through buckling.

Without being bound by a particular theory or mechanism, it is believed that snap through buckling is configured to provide strain energy needed to break/perforate the score line. For example, with ID#2, it tracks closely with ID12 for the first portion of the measured performance (e.g. generally believed to be due to plasticity of the material), however, around 20 PSI the two runs are directed along different pathways. Regarding ID#2, as the sample undergoes further pressurization as the displacement increases, then pressure levels off while displacement continues. In contrast, ID#12 undergoes some initial plasticity with limited displacement 0.075 at ~40 psi (compared with ID#2 which reaches 40 psi at 0.16 inches).

Example 11: Computer Modeling Trials on Vent Variations

FIGS. 41 through 44 depict computer modeling data for the vent configuration having a circumferential countersink equipped with a scored vent portion and an unscored hinge portion. These plots illustrate, for this particular configuration, the relationships between the ratio of the vent opening area (A2) to the vent pressure area (A1+A2), ratio of vent score length (L) to the vent opening area (A2), ratio of the hinge length (c) to the vent opening area (A2), and ratio of the hinge length (c) to the score length (L) are provided below. As depicted in the figures, plot provides an angle (theta) between 90 and 120 degrees. Also, as provided in the plots, for this particular configuration, the hinge length to score length ratio is variable between about 0.2 to 0.65.

Example 12: Computer Modeling on Dome (Acutator) for Current Interrupt Device

Finite element models were generated to determine the impact and relationships of diameter, material strength, vent thickness, and residual thickness on the performance and displacement/snap-through performance characteristics of the dome component (actuator) for the current interrupt device. For this series of FEM models, the dome actuation was evaluated in the absence of other components from the current interrupt device.

Referring to FIG. 55, in this set of FEM experiments, D2, D3, D4, D5, R3, R4, and R5 were kept constant during these trials to understand the impact on buckling pressure when D1, R1, R2 and H1 were varied. Also, is noted that D2–D3=0; D2 and D3 were 1.1275 inches, D4 was 1.2175 inches, D5 was 1.3000 inches, R3=R4, which was 0.0250 inch, R5 was 0.200 inch, H2 was 0.0600 inch, and T1 was 0.0100 inch. The table below depicts the impact in buckling pressure as D1, R1, R2 and H1 were varied over 23 runs. Table 5 for the dome buckle is depicted below, providing the variations between the D1, R1, R2 and H1 parameters and the resulting buckling pressures.

| ID | D1 | R1 | R2 | H1 | Buckle |
|---|---|---|---|---|---|
| 1 | 0.150 | 0.9050 | 0.0350 | 0.0950 | 28.1 |
| 2 | 0.150 | 1.0050 | 0.0350 | 0.0950 | 25.5 |
| 3 | 0.150 | 0.9050 | 0.0450 | 0.0950 | 26.7 |
| 4 | 0.150 | 1.0050 | 0.0450 | 0.0950 | 24.5 |
| 5 | 0.180 | 0.9050 | 0.0350 | 0.0950 | 26.5 |
| 6 | 0.180 | 1.0050 | 0.0350 | 0.0950 | 24.2 |
| 7 | 0.180 | 0.9050 | 0.0450 | 0.0950 | 25.4 |
| 8 | 0.180 | 1.0050 | 0.0450 | 0.0950 | 23.3 |
| 9 | 0.150 | 0.9050 | 0.0350 | 0.1050 | 26.6 |
| 10 | 0.150 | 1.0050 | 0.0350 | 0.1050 | 24.2 |
| 11 | 0.150 | 0.9050 | 0.0450 | 0.1050 | 25.5 |
| 12 | 0.150 | 1.0050 | 0.0450 | 0.1050 | 23.3 |
| 13 | 0.180 | 0.9050 | 0.0350 | 0.1050 | 25.2 |
| 14 | 0.180 | 1.0050 | 0.0350 | 0.1050 | 23.1 |
| 15 | 0.180 | 0.9050 | 0.0450 | 0.1050 | 24.3 |
| 16 | 0.180 | 1.0050 | 0.0450 | 0.1050 | 22.3 |
| 17 | 0.180 | 1.2050 | 0.0550 | 0.1150 | 20.6 |
| 18 | 0.180 | 1.2050 | 0.0650 | 0.1150 | 20.6 |
| 19 | 0.180 | 1.2050 | 0.0450 | 0.1150 | 21.3 |
| 20 | 0.180 | 1.2050 | 0.0650 | 0.1250 | 24.5 |
| 21 | 0.200 | 1.0050 | 0.0450 | 0.1250 | 22.3 |
| 22 | 0.200 | 1.0050 | 0.0550 | 0.1250 | 21.8 |
| 23 | 0.200 | 1.1050 | 0.0550 | 0.1250 | 23.5 |

The variations in parameters (e.g. panel depth, countersink depth) were based on the underlying assumption that the dome actuator was being utilized in an electrical application and that the innards of those applications required certain tolerances. Without being bound by a particular mechanism or theory, it is believed that the minimum distance between the end of the dome prior to actuation and the contact that the component that the dome makes in an actuated (final) position within the product form is at least 4 mm to prevent arching between the materials (at least one of the dome and the contact carrying a current).

Referring to FIG. 56, a graph illustrating an example of snap-through buckling for the dome actuator is provided, depicting dome displacement (inches) as a function of pressure (psi) for ID#19. As shown in FIG. 56, as pressure increases up towards 20 psi, there is not much movement (displacement) in the center of the dome. Upon reaching the 20 psi threshold, snap-through buckling occurs, in which near instantaneous displacement (e.g. with speed akin to the speed of sound in air) of 0.16 inches occurs. Once the dome actuator is fully reversed, no further appreciable displacement occurs, though the dome (e.g. in its actuated position) continues to retain pressure/maintain the hermetic seal of the housing 134 if pressure continues to increase.

Example 13: Computer Modeling on Energy Storage Device Undergoing Pressurization Computer modeling was completed on the overall energy storage device in order to evaluate the escalating pressure in the housing and energy storage device components, including for example the housing (e.g. housing material, strength, thickness, forming), current interrupt device (e.g. dome actuation, fuse disconnect); and pressure vent (e.g. maintaining pressure, buckling initiation, score propagation, size of vent).

Figure 47:
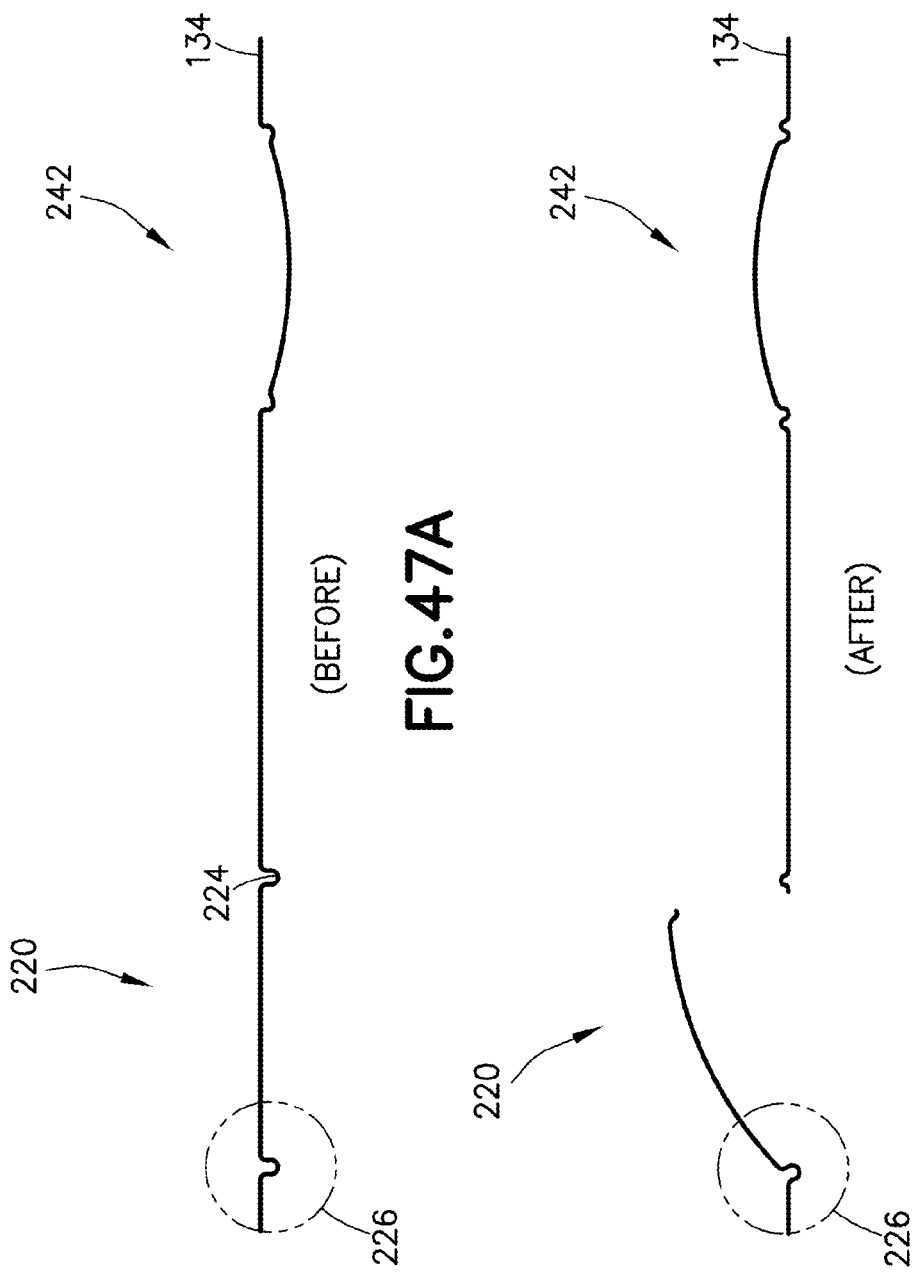
FIGS. 47A and 47B correspond to a cross-sectional view of computer models of an embodiment of an energy storage assembly's response to a pressure event, in accordance with the instant disclosure.

FIGS. 47A and 47B depict, respectively, an example of a computer-modeled "before" and "after" cut-away side line view of the housing of an energy storage device in accordance with the instant disclosure.

As depicted in FIGS. 47A & 47B, the sidewall 134 is configured to house the dome (actuator) of the current interrupt device 242 and vent 220, with countersink and score.

As shown in FIG. 47A, (1) the dome 242 is in its recessed position and (2) the vent is in its intact (e.g. non-perforated or non-vented) position, in accordance with its operating position during the standard range of operating pressure within the housing. In contrast, FIG. 47B depicts the same view as 47A but under a different pressure condition (e.g. exceeding the pressure limit of the dome actuator and the scored vent). As shown in FIG. 47B, the dome has undergone snap-through buckling and the vent has undergone buckle-initiated score perforation, resulting in the propagation of a vent in the vent device/component.

Figure 48:
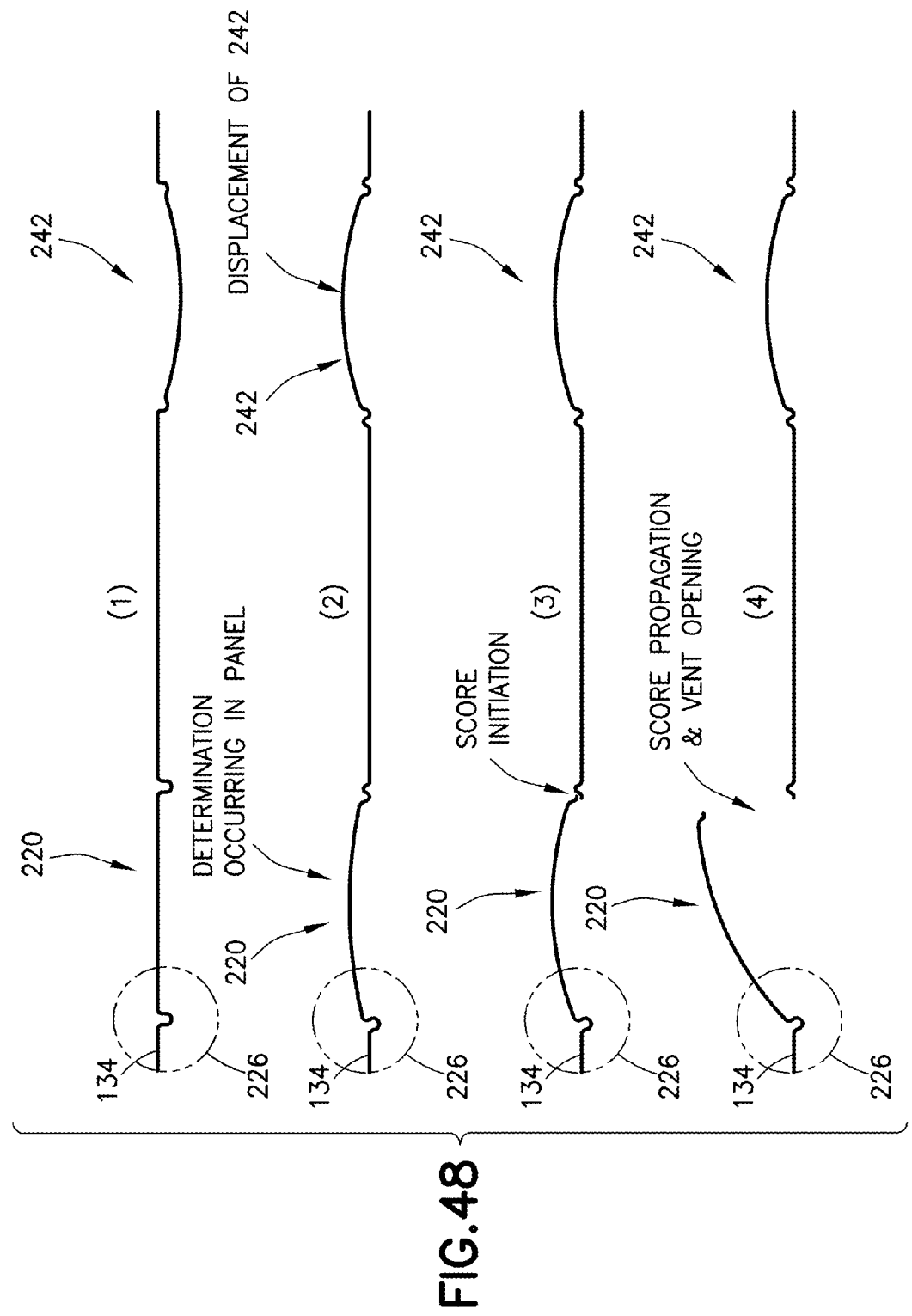
FIG. 48 corresponds to a cross-sectional view of a computer model of an embodiment of an energy storage assembly's response to a pressure event, in accordance with the instant disclosure.
Figure 49:
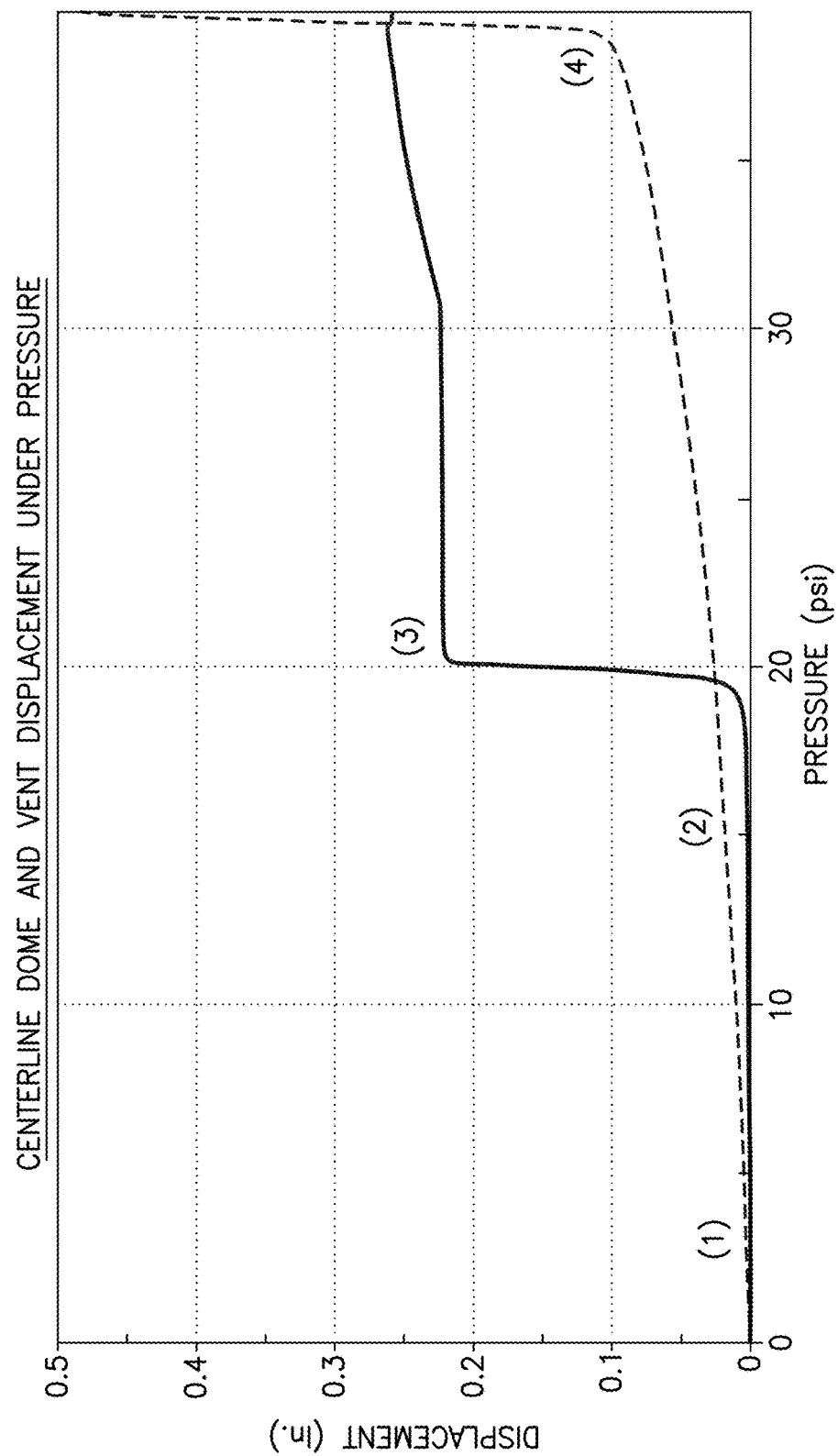
FIG. 49 is a graphical depiction of the events occurring in FIG. 48, the graph depicting the events as displacement (inches) as a function of pressure (psi).

Referring to FIG. 48, the pressurization event in an embodiment of the energy storage device is depicted at different (increasing) pressures. Referring to FIG. 49, the storage device configurations (e.g. FIG. 48 (1)-(4) are depicted as events on the plot depicting displacement (in inches) of the centerlines of the dome actuator and vent as a function of pressure (psi).

Referring to FIG. 49, (1) corresponds to a departure slightly above the normal operating pressures (e.g. 0-5 psi) for an embodiment of an energy storage device. As depicted in FIG. 48 (1), both the dome and the vent device have moved slightly.

Referring to FIG. 49, (2) corresponds to a pressure well above normal operating pressure (e.g. ~15-17 psi) and prior to any operations of the dome actuator actuation/CID actuation) and/or pressure vent) departure slightly above the normal operating pressures (e.g. within CID) or pressure vent. As depicted in FIG. 48 (2), both the dome and the vent device have moved to a greater extent.

Referring to FIG. 49, (3) corresponds to a pressure threshold for the dome actuator to undergo a reversal (e.g. snap-through buckling), while the pressure vent is intact. As depicted in FIG. 48 (3), the dome has reversed/acutated and the vent device has moved to a greater extent.

Referring to FIG. 49, (4) corresponds to a pressure threshold for the pressure vent to open (e.g. via a buckling event to propagate an opening along the scored line). As depicted in FIG. 48 (4), the dome (in reversed/actuated position) has moved again and the vent device has opened.

Example 14: Flame Arrestor Trial

As briefly noted in Example 8, a flame arrestor was tested in accordance with a scored vent shell assembly, pressurized to vent at approximately 70 psi. The flame arrestor was a 30 mesh copper wire that was adhered to the base of the vent. Upon venting, the flame arrestor was maintained in position. With this run, it is noted that the venting gas was not flammable and did not contain corrosive species. Upon evaluation of the flame arrestor, it did not tear or blow through the vent when the vent opened under pressure. However, as a proxy, the selected mesh was successfully tested as a flame arrestor with both natural gas and propane.

Example 15: Computer Modeling Scoring Knife

Figure 50:
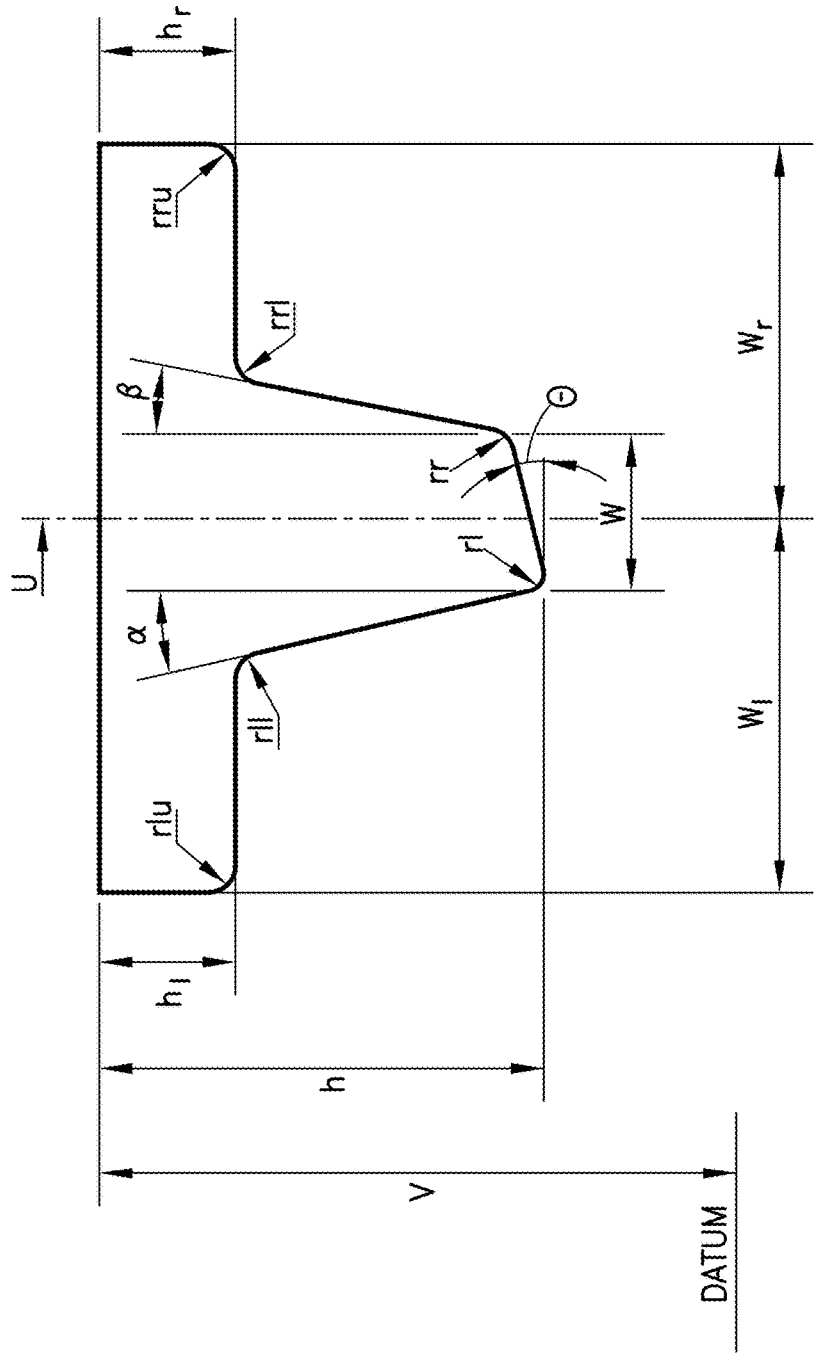
FIG. 50 depicts a typical score knife geometry in parametric format.
Figure 51:
FIG. 51 is a photograph of three different vent propagation modes from the venting trial in the Examples section (i.e. the left picture shows deformation without tearing of the substrate, while the center and right hand pictures both show deformation and tearing of the substrate (center picture, tearing is through the central portion, right picture, tearing is circumferential to the outer perimeter).
Figure 52A:
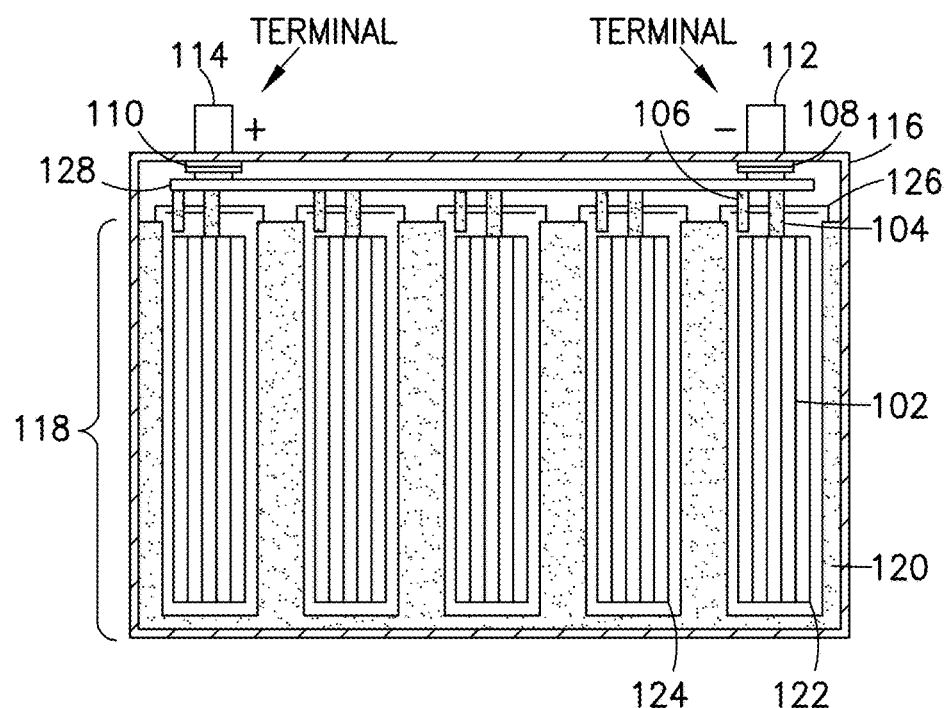
FIG. 52A depicts a cut-away schematic side view of an embodiment of an energy storage assembly in accordance with the instant disclosure, wherein the energy storage devices configured/retained within the energy storage device include individual unsealed li-ion core members.
Figure 52B:
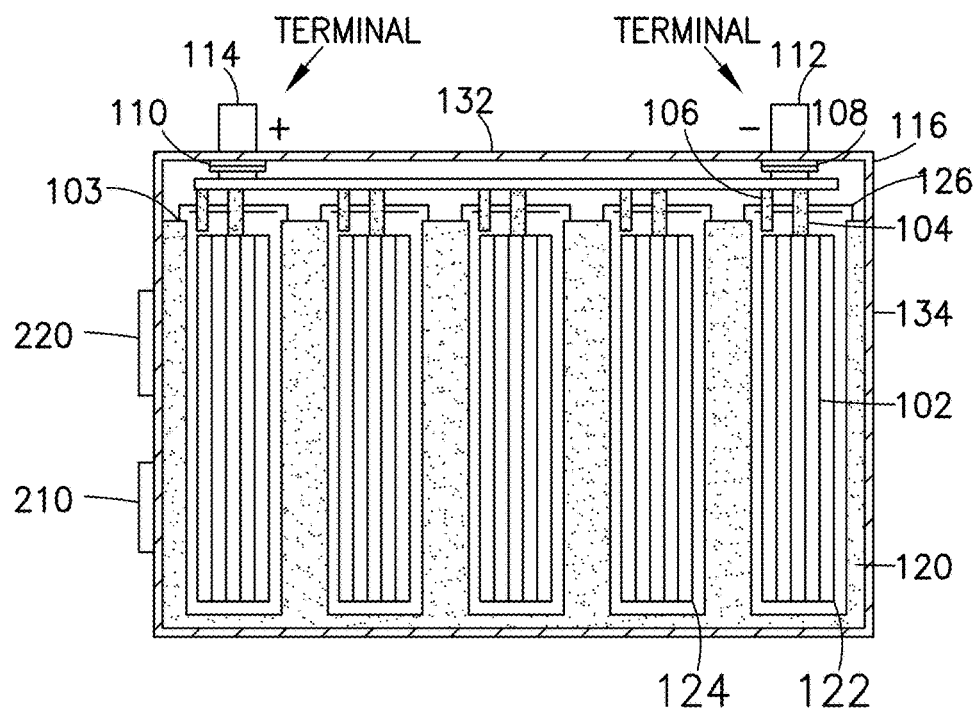
FIG. 52B depicts a cut-away schematic side view of an embodiment of an energy storage assembly in accordance with the instant disclosure, wherein the energy storage devices configured/retained within the energy storage device include individual sealed or unsealed energy storage devices.
Figure 53A:
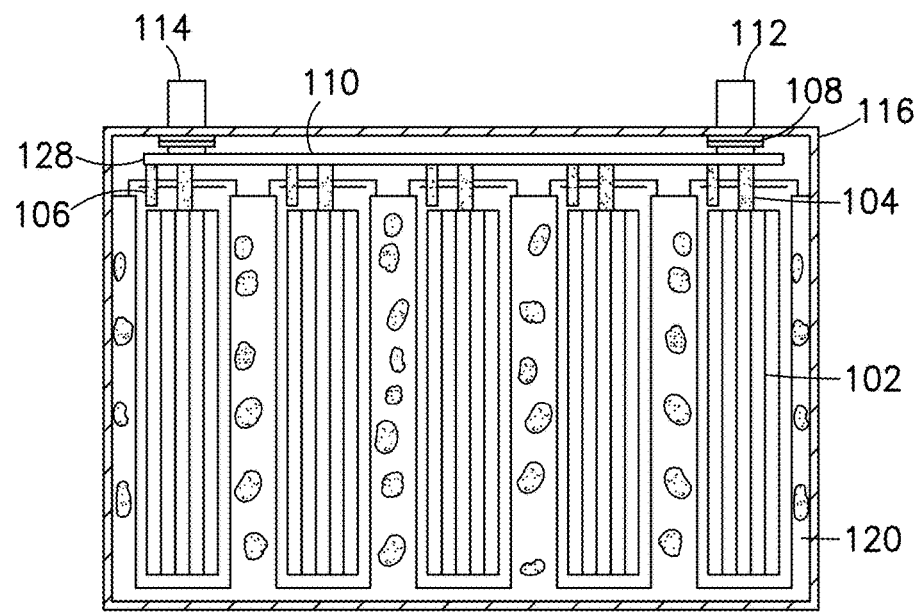
FIG. 53A depicts a cut-away schematic side view of an embodiment of an energy storage assembly in accordance with the instant disclosure, wherein the energy storage devices configured/retained within the energy storage device include individual unsealed li-ion core members.
Figure 53B:
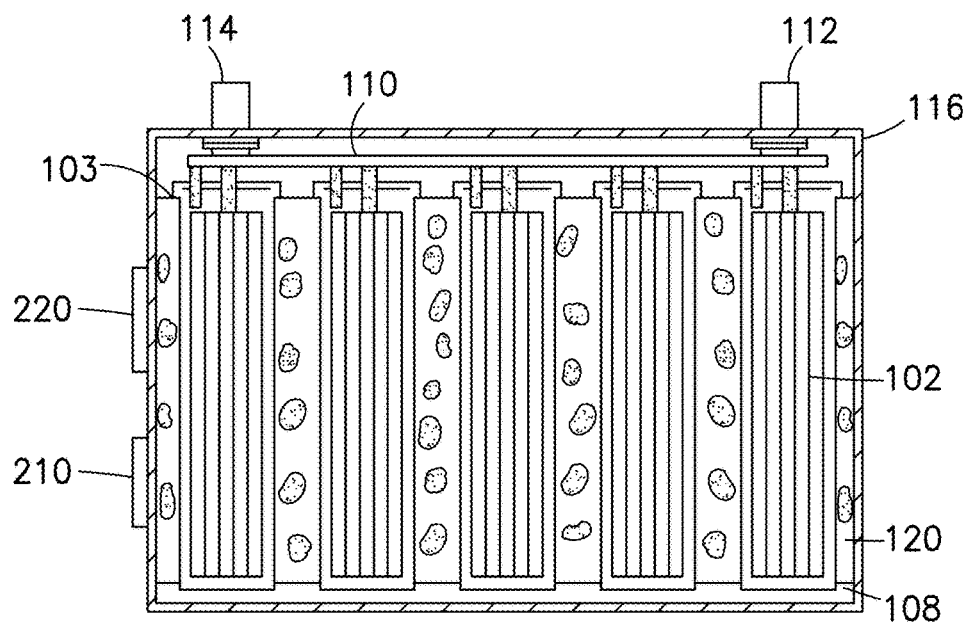
FIG. 53B depicts a cut-away schematic side view of an energy storage assembly in accordance with the instant disclosure, wherein the energy storage devices configured/retained within the energy storage device include individual sealed or unsealed energy storage devices.

FIG. 50 depicts a typical score knife geometry in parametric format. As shown in FIG. 50, the opening forces or pressures are directly related to the score residual. In one or more embodiments of the instant disclosure, the score knife (and/or scoring process) can be varied in order to provide a specifically configured scored portion on the vent component to provide the vent upon pressurization above a pre-determined threshold.

The score residual is configured to provide an appropriate amount of material in order to achieve the desired application. If the residual is too large, opening forces or pressures will be high. If the depth is too shallow, the strength of the vent needed to withstand the applied pressure will be low (e.g. and may vent prematurely).

The draft angle of the score knife is configured to provide an appropriate angle to achieve the desired application in the resulting score. For example, if the draft angle is too small, cracks could form under the knife, leading to leaks in the resulting score within the vent component. If it is too large, the forming load increases, and may make the score line less defined.

In one or more embodiments of the instant disclosure, the score is created with a score knife having a chisel-like geometry (e.g. having radii instead of sharp edges), as depicted in FIG. 50.

REFERENCE NUMBERS product form/device 10
electrical wiring & connections 12
stacking shelf 154 (e.g. for positioning battery assemblies adjacent to/vertically stacked on each other)
battery assembly (e.g. multi-core array, energy storage device) 100
battery cell (e.g. Li-ion core member, li-ion cell, flat stacked member, energy storage member) 102
conductive tab (cathode) 104
conductive tab (anode) 106
cathode bus bar 108
openings (e.g. configured for core member sleeve to fit into, positioned in cathode bus bar) 164
anode bus bar 110
negative terminal 112
positive terminal 114
housing/container (e.g. multi-core enclosure) 116
support structure 120
cylindrical cavities (e.g. positioned in support) 122
openings 126
shared atmosphere 128
battery cell/li-ion core region 118
sleeve (to retain li-ion core member/battery cell)121
sealed sleeve/seal on sleeve (to enclose li-ion core member) 103
openings 126
battery cell top cap 170
battery cell bottom cap 172
monolithic cavity liner
substrate 130
cover/lid 132
body 134
bottom 136
sidewall 138
attachment device (i.e. attach cover to body) 140
seam (e.g. via forming operation) 144
weld 142
attachment area (e.g. upper lip of body) 148
mechanical attachment (e.g. glue, bond, adhesive, screw, snap)
attachment area on body (e.g. via forming operation, locally thin upper rim/upper lip) 160
attachment area to cover (e.g. via forming operation, locally thin perimetrical edge) 162
cover sealant (e.g. assist in creating seal enclosure/closure via forming operation) 156
hole/via portions in cover (e.g. configured to retain battery, configured to enable electrolyte fill of battery and/or electrical connection/wiring to extend in an upward direction from cover) 152
plugs for holes in cover (e.g. metal balls, plugs, gaskets, or seals) 162
flame arrestor 260
vent area 222 (e.g. includes vent and vent attachment component or alternatively, a locally thinned area in the container body configured for venting)
vent 220
score/score pattern 224
countersink 226
buckle initiator 228
vent panel 230
vent rim 232
hinge 234
vent attachment component 236
weld 238
gasket/bond/glue 239
current interrupt device 240
flexible member (e.g. strip lever/leg) 244
connection site for lever/leg/flexible strip to come 248
fuse 250
bridge on fuse 254
short circuit/break in fuse 252
fuse insulator holder 246
fuse insulator 258
fuse holder 256
rivet 168
insulator seal ring 166
vibration sheet 212
insulating sheet 210
displacement device (e.g. dome) 242
partition wall(s) (e.g. between battery cells configured within housing) 300
energy absorbing material 130

While various embodiments of the present invention have been described in detail, it is apparent that modifications and adaptations of those embodiments will occur to those skilled in the art. However, it is to be expressly understood that such modifications and adaptations are within the spirit and scope of the present invention.

What is claimed is:

1. An apparatus comprising:
 (a) a sealed container configured to house a plurality of energy storage devices and enable electrical communication via terminals of the sealed container; and
 (b) a vent located on a periphery of the sealed container, the vent comprising:
  (i) a vent panel;
  (ii) a countersink located adjacent the vent panel;
  (iii) at least one score located in the countersink;
  (iv) a buckling initiator at least partially located on the countersink;
   wherein the buckling initiator is configured to intersect with the at least one score; and
  (v) a hinge portion attached to the vent panel;
   wherein the hinge portion is positioned opposite the buckling initiator;
   wherein the vent panel is configured to move via the hinge.

2. The apparatus of claim 1, wherein the vent is integral with the sealed container.

3. The apparatus of claim 1, wherein the countersink comprises at least one unscored portion.

4. The apparatus of claim 1, wherein the apparatus comprises a support matrix configured to house at least some of the plurality of electrical storage devices.

5. The apparatus of claim 4, wherein the support matrix comprises an energy absorbing material, or a flame arresting material, or both an energy absorbing material and a flame arresting material.

6. The apparatus of claim 4, wherein the support matrix is configured to maintain at least some of the plurality of electrical storage devices in spaced relation from each other.

7. The apparatus of claim 1, wherein at least one of the plurality of electrical storage devices comprises a Li-ion battery.

8. The apparatus of claim 1, wherein the buckling initiator is configured as a score set in a perpendicular direction to the at least one score.

9. The apparatus of claim 1, wherein the hinge portion is an unscored hinge portion.

10. The apparatus of claim 1, wherein the countersink is a circumferential countersink and wherein the at least one score is a circumferential score.

11. The apparatus of claim 10, wherein:
 the circumferential score has a score length;
 the hinge portion has a hinge length; and
 a ratio of the hinge length to score length is from 0.2 to 0.65.

12. The apparatus of claim 1, wherein the apparatus comprises:
 (iv) a current interrupt device comprising a dome actuator.

13. The apparatus of claim 1, wherein the vent panel is configured to move outwardly relative to the periphery of the sealed container, via the hinge.

14. The apparatus of claim 13, wherein the vent panel is a solid geometric shape.

15. The apparatus of claim 14, wherein the vent panel is in the form of a circle.

\* \* \* \* \*